US011709099B2

(12) United States Patent
Ruther et al.

(10) Patent No.: US 11,709,099 B2
(45) Date of Patent: Jul. 25, 2023

(54) METHOD AND SYSTEM FOR CALIBRATING IMAGING SYSTEM

(71) Applicant: Snap-on Incorporated

(72) Inventors: Timothy G. Ruther, Carpentersville, IL (US); Gary F. Stefanik, Elmhurst, IL (US); Robert Hoevenaar, De Weere (NL)

(73) Assignee: Snap-On Incorporated, Kenosha, WI (US)

( * ) Notice: Subject to any disclaimer, the term of this patent is extended or adjusted under 35 U.S.C. 154(b) by 385 days.

(21) Appl. No.: 16/459,283

(22) Filed: Jul. 1, 2019

(65) Prior Publication Data

US 2021/0003453 A1   Jan. 7, 2021

(51) Int. Cl.
*G01J 5/02* (2022.01)
*G01J 5/08* (2022.01)
(Continued)

(52) U.S. Cl.
CPC .......... *G01J 5/0275* (2013.01); *G01J 5/0265* (2013.01); *G01J 5/07* (2022.01); *G01J 5/0893* (2013.01);
(Continued)

(58) Field of Classification Search
CPC .................................................... H04N 5/332
See application file for complete search history.

(56) References Cited

U.S. PATENT DOCUMENTS 5,133,605 A    7/1992 Nakamura
5,370,359 A    12/1994 Sadegh et al.
(Continued)

FOREIGN PATENT DOCUMENTS

CN    107930045 A    4/2018
DE    102014226342 A1   6/2016
(Continued)

OTHER PUBLICATIONS

Mastercool Inc.; Instruction Manual Infrared Thermometer; 52224-A-INST-INTL; English text within portions 1 to 3 on p. 1 of 2 total pages; Mar. 7, 2016.
(Continued)

*Primary Examiner* — Marcus H Taningco
(74) *Attorney, Agent, or Firm* — McDonnell Boehnen Hulbert & Berghoff LLP

(57) ABSTRACT

A method includes capturing and scaling VLC and an IAS outputs to generate a scaled VLC output and a scaled thermal output (STO), aligning the scaled VLC output to the STO to generate an aligned image based on the scaled VLC output and the STO, determining alignment value(s) based on the aligned image, a laser pointer outputting a light beam to produce a laser dot on a target, and capturing a further output of the VLC. The method includes displaying the further output of the VLC (including a representation of the laser dot (RLD)), and an alignment marker, shifting the alignment marker and/or the RLD to a common position; determining coordinate(s) of the output of the IAS based on coordinate(s) of the further output of the VLC where the alignment marker and the RLD are shown at the common position; and storing the coordinate(s) of the output of the IAS.

27 Claims, 31 Drawing Sheets

(51) Int. Cl.
  *G01J 5/07* (2022.01)
  *G01J 5/53* (2022.01)
  *H04N 23/11* (2023.01)
  *G01J 5/80* (2022.01)

(52) U.S. Cl.
  CPC ............... *G01J 5/53* (2022.01); *H04N 23/11* (2023.01); *G01J 5/80* (2022.01)

(56) References Cited

U.S. PATENT DOCUMENTS

| | | | |
|---|---|---|---|
| 5,782,128 | A | 7/1998 | Barjesteh et al. |
| 6,253,436 | B1 | 7/2001 | Barjesteh et al. |
| 6,324,884 | B1 | 12/2001 | Barjesteh et al. |
| 6,619,099 | B2 | 9/2003 | Barjesteh |
| 6,647,761 | B2 | 11/2003 | Barjesteh |
| 7,199,366 | B2 | 4/2007 | Hahn et al. |
| 8,374,438 | B1 | 2/2013 | Wagner |
| 10,565,450 | B2 | 2/2020 | Yoshida et al. |
| 10,965,889 | B2 | 3/2021 | Stuart et al. |
| 11,032,492 | B2 | 6/2021 | McManus et al. |
| 2005/0117781 | A1 | 6/2005 | Aoyama |
| 2008/0056329 | A1 | 3/2008 | Smith et al. |
| 2009/0050806 | A1* | 2/2009 | Schmidt ............ H04N 5/23212 250/332 |
| 2009/0065695 | A1* | 3/2009 | DeMarco ............ G01J 5/0215 250/330 |
| 2011/0304766 | A1* | 12/2011 | Bergqvist ................ G03B 3/04 348/357 |
| 2012/0027045 | A1 | 2/2012 | McLellan et al. |
| 2013/0050453 | A1* | 2/2013 | Bergstrom ............. H04N 5/332 348/61 |
| 2013/0235538 | A1 | 9/2013 | Hashimoto et al. |
| 2014/0098238 | A1 | 4/2014 | Boulanger et al. |
| 2014/0247365 | A1 | 9/2014 | Gardner et al. |
| 2014/0313343 | A1 | 10/2014 | Frank et al. |
| 2014/0346359 | A1 | 11/2014 | Holliday |
| 2015/0304636 | A1 | 10/2015 | Rhead et al. |
| 2016/0041039 | A1 | 2/2016 | Olsson |
| 2016/0215910 | A1 | 7/2016 | Hrncir et al. |
| 2016/0334284 | A1* | 11/2016 | Kaplun Mucharrafille ................ G01K 15/00 |
| 2017/0012069 | A1* | 1/2017 | Rudmann ......... H01L 27/14687 |
| 2017/0175801 | A1 | 6/2017 | Mickelsen et al. |
| 2017/0178898 | A1 | 6/2017 | Kang et al. |
| 2018/0058567 | A1 | 3/2018 | Engel et al. |
| 2020/0055226 | A1 | 2/2020 | Polzer |
| 2021/0004970 | A1 | 1/2021 | Ruther et al. |

FOREIGN PATENT DOCUMENTS

| | | |
|---|---|---|
| JP | 2004525583 A | 8/2004 |
| JP | 2006506728 A | 2/2006 |
| JP | 2009134718 A | 6/2009 |
| JP | 2009134718 A5 | 7/2009 |
| KR | 102119339 B1 | 6/2020 |
| RU | 2730727 C1 | 8/2020 |
| WO | 2006060746 A2 | 6/2006 |

OTHER PUBLICATIONS

Mastercool Inc.; Circular Laser Infrared Thermometer—Reads Real-Time Maximum (MAX) data; English text on p. 1 of 3 total pages; Feb. 28, 2018.

Mastercool Inc.; Multi-Laser Infrared Thermometer; 52224-D; 1 page; Dec. 19, 2014.

Mastercool Inc.; 12:1 Multi-Laser Infrared Thermometer, Model #-52224-D, English text on pp. 2-3 of 14 total pages; Oct. 18, 2018.

Mastercool Inc.; 52225-A, Dual Temp Infrared Thermometers Operating Instructions; English text on p. 1 of 2 total pages; Nov. 6, 2015.

Mastercool Inc.; Ultra Temp Dual Laser Thermometer Operating Instructions; 52225-B-INSTINT; English text on p. 1 of 2 total pages; Aug. 23, 2012.

Mastercool Inc.; 52226 Dual Temp Infrared Thermometer, Operating Instructions; English text on p. 1 of 2 total pages; Nov. 3, 2006.

Mastercool Inc.; Thermal Imaging Camera; 52325; 1 page; Apr. 3, 2018.

Mastercool Inc.; 52325 Thermal Imaging Camera; 2 total pages; Sep. 14, 2018.

Snap-On Incorporated; Infrared Thermometer (Blue-Point) RTEMPB7; downloaded from the world wide web at shop.snapon.com/product/Infrared-Thermometers/Infrared-Thermometer-(Blue-Point@)/RTEMPB7; two pages plus two images of RTEMPB7 components captured Mar. 19, 2019.

Flir Systems Inc.; FlirOne Quick Start, User Guide, Second Generation for Apple iOS; 11 total pages; Nov. 9, 2015.

Heimann Sensor GMBH; Boston Electronics; Infrared Detector Arrays Low Cost Thermal Imaging; 28 total pages; Feb. 14, 2017.

Heimann Sensor GMBH; Specifications for Thermopilearrays HTPA 8×8, HTPA 16×16 and HTPA 32×31; Rev. 12: Aug. 3, 2010 Fg; 17 total pages; Aug. 3, 2010.

Heimann Sensor GMBH; HTPA Assortment, 1 page; Feb. 3, 2017.

Gruner, Klaus-Dieter; Raytek GmbH; Principles of Non-Contact Temperature Measurement; 55514 Rev.B; 32 total pages; Dec. 2003.

Mastercool, Inc.; HVAC Products; downloaded from world wide web at https://www.mastercool.com/product-category/hvac-products/ in Jun. 2019; 5 total pages.

Mastercool, Inc., Thermometers specification sheet including 52224-A Infrared Thermometer w/Laser, 52224-CC Infrared Thermometer with Circular Laser, 52225-A Dual Temp Plus Infrared Thermometer, 52225-B Ultra Temp Dual Laser Thermometer; 2 total pages; Jan. 24, 2019.

Melexis NV, MLX90640 32×24 IR array data sheet, Revision 11, 60 total pages; Aug. 3, 2018.

Heimann Sensor GMBH; HTPA 8×8d Infrared Thermopile Array Sensor; 1 page; Rev. 03, Feb. 15, 2016.

Heimann Sensor GMBH; HTPA 32×32d Infrared Thermopile Array Sensor; 1 page; Rev. 03, Feb. 15, 2016.

Heimann Sensor GMBH; HTPA 80×64d Infrared Thermopile Array Sensor, 1 page; Rev. 08, Feb. 14, 2017.

U.S. Appl. No. 16/459,233, filed Jul. 1, 2019, inventors: Timothy G. Ruther, Gary F. Stefanik, and Robert Hoevenaar.

U.S. Appl. No. 16/459,315, filed Jul. 1, 2019, inventors: Timothy G. Ruther, Gary F. Stefanik, and Robert Hoevenaar.

U.S. Appl. No. 16/459,340, filed Jul. 1, 2019, inventors: Timothy G. Ruther, Gary F. Stefanik, and Robert Hoevenaar.

* cited by examiner

SECTION A-A

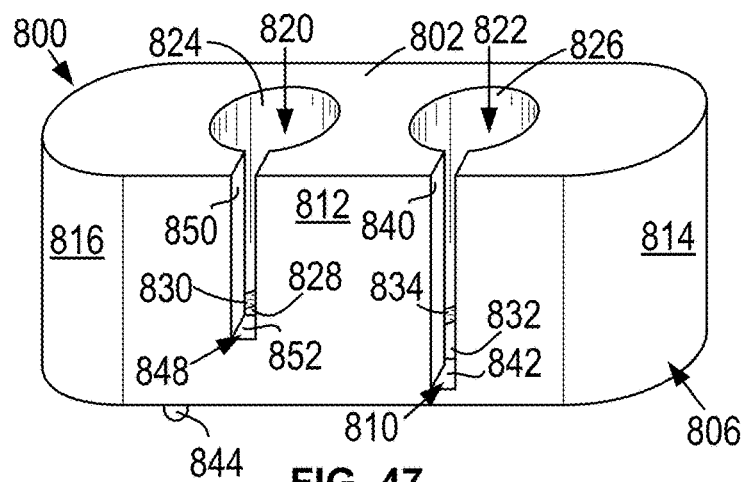
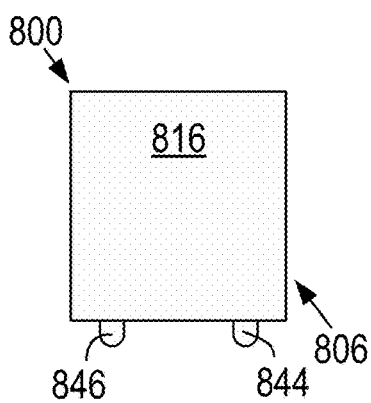
FIG. 47    FIG. 48
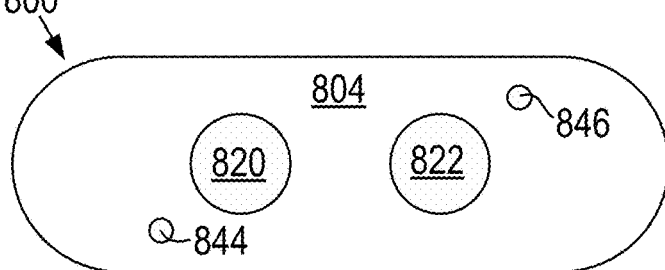
FIG. 49
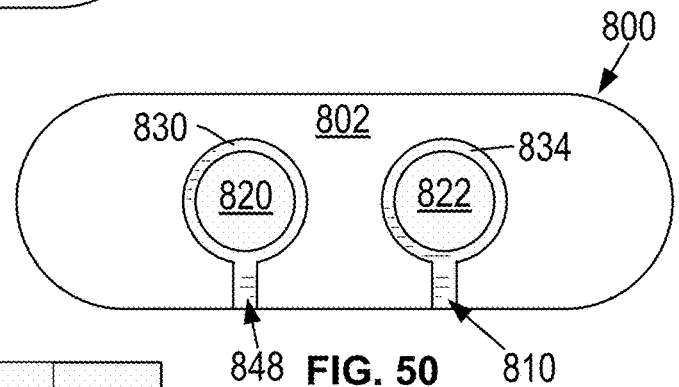
FIG. 50
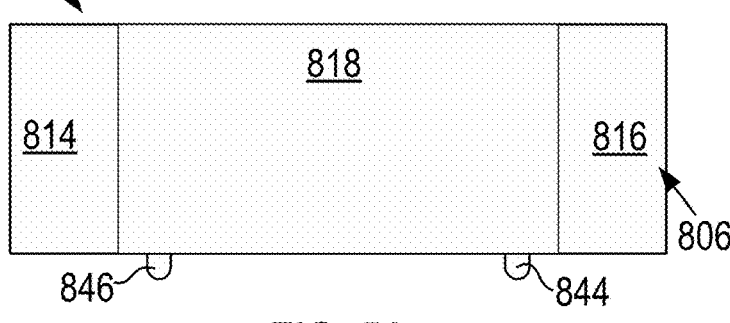
FIG. 51
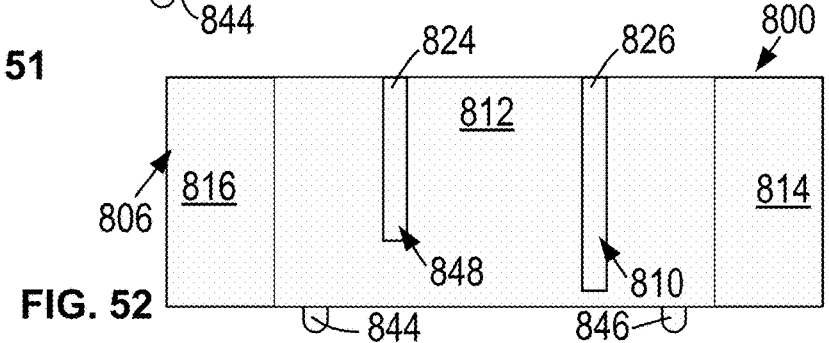
FIG. 52

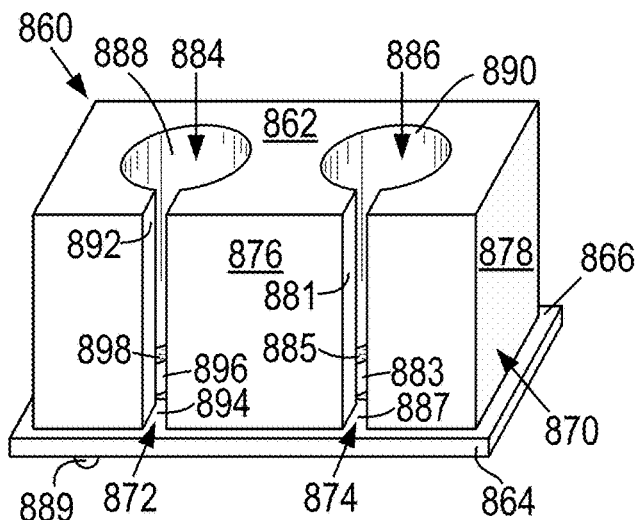
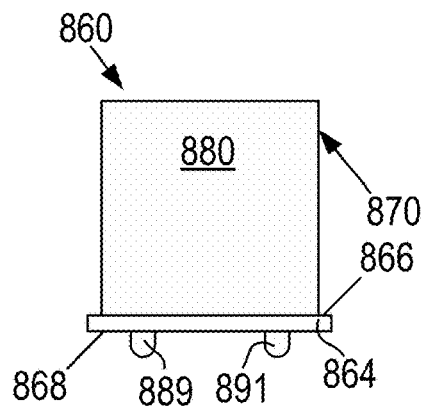
FIG. 53
FIG. 54
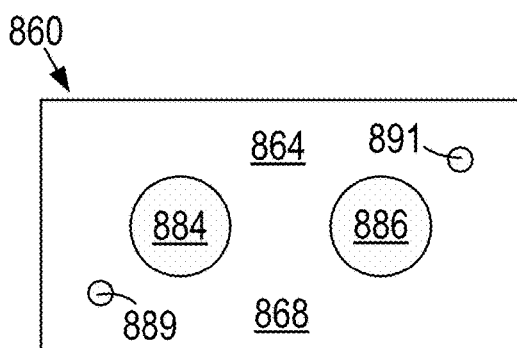
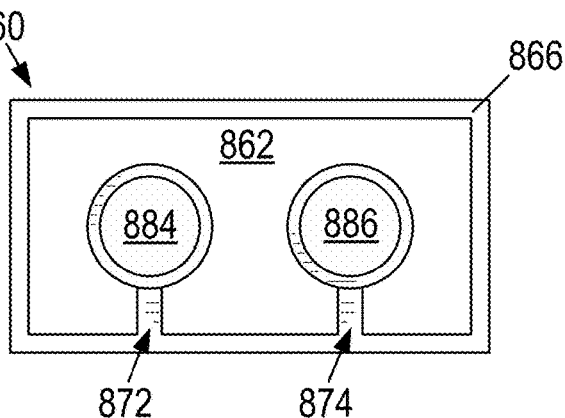
FIG. 55
FIG. 56
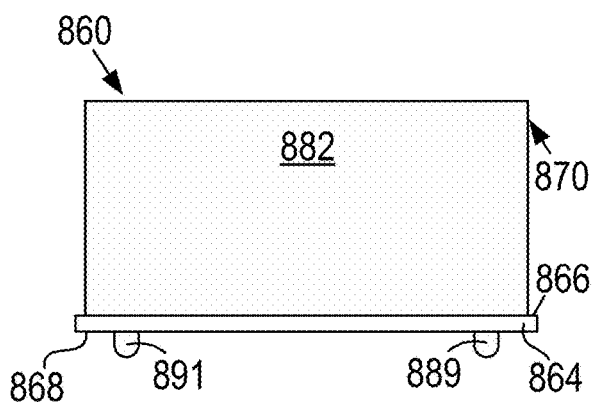
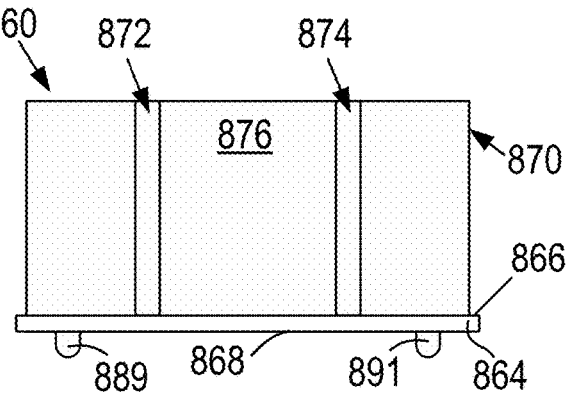
FIG. 57
FIG. 58

METHOD AND SYSTEM FOR CALIBRATING IMAGING SYSTEM

BACKGROUND

To assist repair personnel, technicians, or other individuals, some manufacturers build and sell imaging systems having an infrared array sensor (IAS) and a visible light camera (VLC) capable of generating a thermal image, a visible light image, and a blended image based on the thermal and visible light images. Those or other manufacturers may build devices having visible light camera, an infrared spot sensor, and a laser pointer for displaying a laser dot on a target. Those manufacturers can manually align the laser pointer with the infrared spot sensor so that the infrared spot sensor can be used to calculate a surface temperature of the target. The temperatures measured using the infrared spot sensor can be displayed by the system to indicate a surface temperature of a specific section of the target.

Manual alignment of a laser pointer with an infrared spot sensor can make use of some sort of angular rotation freedom to aim the laser pointer and some sort of locking mechanism or material, such as an epoxy glue, to reliably maintain the relative angle between the laser pointer and the infrared spot sensor. Current laser-based thermal temperature sensors typically use a separate elongated aiming device and epoxy to position a laser pointer in an attempt to aim laser light output from the laser pointer towards a center of a thermal target detected by an infrared spot sensor mounted on a printed circuit board. Such devices are precisely aligned, but only at a given distance from the target due to parallax circumstances. The manual alignment of the laser pointer with the infrared spot sensor is labor intensive in both time and cost, and may be prone to misalignment if the system is moved, dropped or otherwise mechanically shocked.

OVERVIEW

In a first implementation, a method is provided. The method comprises capturing output of a visible light camera (VLC) and output of an infrared array sensor using a system including the VLC, the infrared array sensor, a laser pointer, a memory, and a display. The method includes scaling the output of the VLC and the output of the infrared array sensor to generate a scaled VLC output and a scaled thermal output. The method also includes aligning the scaled VLC output to the scaled thermal output to generate an aligned image based on the scaled VLC output and the scaled thermal output. The method also includes determining one or more alignment values based on the aligned image. Additionally, the method includes outputting, by the laser pointer, a light beam to produce a laser dot on a target and then capturing a further output of the VLC. The further output of the VLC includes a representation of the laser dot. Even more, the method includes displaying, on the display, the further output of the VLC, and an alignment marker. Furthermore, the method includes shifting the alignment marker or the representation of the laser dot so that the alignment marker and the representation of the laser dot are shown at a common position on the display. Furthermore still, the method includes determining one or more coordinates of the output of the infrared array sensor based on one or more coordinates of the further output of the VLC where the alignment marker and the representation of the laser dot are shown at the common position on the display. Finally, the method includes storing in the memory the one or more coordinates of the output of the infrared array sensor to calibrate the system based on a position of the laser pointer relative to the infrared array sensor.

In a second implementation, a computing system is provided. The computing system comprises one or more processors configured to capture output of a VLC and output of an infrared array sensor using a system including the VLC, the infrared array sensor, a laser pointer, a memory, and a display. The one or more processors are also configured to scale the output of the VLC and the output of the infrared array sensor to generate a scaled VLC output and a scaled thermal output. The one or more processors are also configured to align the scaled VLC output to the scaled thermal output to generate an aligned image based on the scaled VLC output and the scaled thermal output. Additionally, the one or more processors are also configured to determine one or more alignment values based on the aligned image. Moreover, the one or more processors are also configured to output, by the laser pointer, a light beam to produce a laser dot on a target and then capturing a further output of the VLC. The further output of the VLC includes a representation of the laser dot. Moreover, the one or more processors are also configured to display, on the display, the further output of the VLC, and an alignment marker. Furthermore, the one or more processors are configured to shift the alignment marker or the representation of the laser dot so that the alignment marker and the representation of the laser dot are shown at a common position on the display. Furthermore still, the one or more processors are configured to determine one or more coordinates of the output of the infrared array sensor based on one or more coordinates of the further output of the VLC where the alignment marker and the representation of the laser dot are shown at the common position on the display. Finally, the one or more processors are also configured to store in the memory the one or more coordinates of the output of the infrared array sensor to calibrate the system based on a position of the laser pointer relative to the infrared array sensor.

In a third implementation, a computer-readable medium is provided. The computer readable medium stores thereon instructions executable by one or more processors to cause a computing system to perform functions. The functions include capturing output of a visible light camera (VLC) and output of an infrared array sensor using a system including the VLC, the infrared array sensor, a laser pointer, a memory, and a display. The functions also include scaling the output of the VLC and the output of the infrared array sensor to generate a scaled VLC output and a scaled thermal output. Moreover, the functions include aligning the scaled VLC output to the scaled thermal output to generate an aligned image based on the scaled VLC output and the scaled thermal output. The functions also include determining one or more alignment values based on the aligned image. Additionally, the functions include outputting, by the laser pointer, a light beam to produce a laser dot on a target and then capturing a further output of the VLC. The further output of the VLC includes a representation of the laser dot. Even more, the functions include displaying, on the display, the further output of the VLC, and an alignment marker. Furthermore, the functions include shifting the alignment marker or the representation of the laser dot so that the alignment marker and the representation of the laser dot are shown at a common position on the display. Furthermore still, the functions include determining one or more coordinates of the output of the infrared array sensor based on one or more coordinates of the further output of the VLC where the alignment marker and the representation of the laser dot are shown at the common position on the display. Finally, the functions also include storing in the memory the one or more coordinates of the output of the infrared array sensor to calibrate the system based on a position of the laser pointer relative to the infrared array sensor.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, FIG. 53, FIG. 54, FIG. 55, FIG. 56, FIG. 57, FIG. 58 show component aligners in accordance with example implementations described herein.

DETAILED DESCRIPTION

I. Introduction

This description describes several example implementations that pertain to apparatus and systems that include components that are to be aligned. For at least some of the example implementations, the apparatus and systems pertain to an imaging system, such as an imaging system having an infrared array sensor, a visible light camera, and a laser pointer. In some instances, the imaging system is referred to as a thermal imaging system as the infrared array sensor can function as a thermal camera. An apparatus or system with dual cameras, such as a thermal camera and a visible light camera, are subject to parallax problems and misalignment of images captured by the dual cameras.

Figure 6:
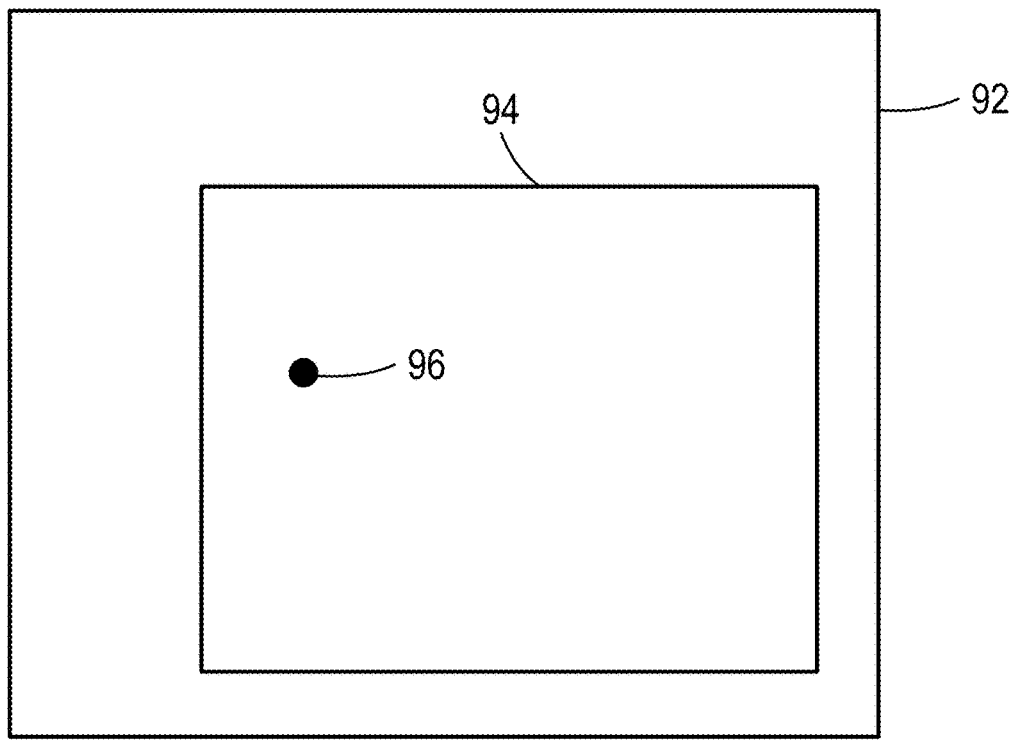
FIG. 6 illustrates aspects output by an imaging system requiring alignment in accordance with example implementations described herein.

FIG. 6 illustrates outputs of components of the aforementioned apparatus and systems that require alignment. In particular, FIG. 6 shows representations of a visible light image 92 output by a visible light camera, a thermal image 94 output by an infrared array sensor, and a laser dot 96 generated by the laser pointer and captured as part of the visible light image 92 output by the visible light camera. The laser dot 96 represents an incidental location of a laser output by the laser pointer relative to the visible light image 92 and the thermal image 94. As shown in FIG. 6, none of the visible light image 92, the thermal image 94, and the laser dot 96 are centered or aligned, which can represent a typical misalignment that may be seen as a function of normal, random variation within a manufacturing environment.

The visible light and thermal images can be aligned with reasonable accuracy. For example, in at least some implementations, a graphical slide control, generated on a display, is operable to slide the visible light image in alignment with the thermal image so that lines representing an outline of a target are not offset from an outline of the target in a thermal image. Sliding the visible light image can include mathematically positioning visible light image in alignment with the thermal image. Once the visible light and thermal images are aligned, any position in the thermal image can be mapped to the visible light image. Depending on a size of the infrared array sensor and the visible light camera, one of more outputs of the infrared array sensor and the visible light camera can be scaled prior to alignment of the visible light and thermal images.

Moreover, with the visible light camera and the infrared array sensor located a known distance away from a target surface, the laser dot 96 shown in the visible light image 92 can be identified and correlated to a position on the visible light image 92, and, therefore the thermal image as well. The target surface can be a surface of a blackbody. Once a position (e.g., a pinpoint) on the thermal image has been identified, the position can be saved and used to develop a tight, target area that correlates to the incidental positon of the laser pointer. The target area can then be used in conjunction with the laser pointer in order to operate as a laser thermometer. Thus, the alignment can be done without aiming or calibrating the laser pointer mechanically. The stored relative positions of the visible light image where the laser dot 96 is shown and of the thermal image can be saved. Storing the relative positions can occur during a factory calibration of the thermal imaging system to perform alignment in software rather than in hardware.

A component aligner can be used to provide a known angular relationship between the laser pointer and the infrared array sensor, and the component aligner can be affixed to a substrate along with the visible light camera with a known angular relationship. Additionally, the component aligner provides for calibrating the laser pointer and the infrared array sensor so that that an output of the laser pointer is associated with a specific, position within a matrix of the infrared array sensor. That position can be defined as an area of the matrix to be used for pinpoint temperature measurements that are associated with a position of the output of the laser within the matrix of the infrared array sensor. This position can vary randomly from unit to unit for each thermal imaging system manufactured and can be stored as a calibration value in a memory.

In some implementations, the component aligner includes a base and a top opposite the base. The component aligner also includes a body having one or more exterior wall surfaces extending from the base to the top, a first bore configured for fixed placement of a first component, and a second bore configured for fixed placement of a second component. The first bore extends between and through both the top and the base. The first bore is defined at least in part by a first interior wall surface of the body. The second bore extends between and through both the top and the base. The second bore is defined at least in part by a second interior wall surface of the body. The component aligner also includes a first slot within the body. The first slot is open at the first interior wall surface and at the top.

In other implementations, the component aligner includes a base having a first side of the base and a second side of the base opposite the first side of the base. The apparatus also includes a first wall including a first end of the first wall and a second end of the first wall. The first wall extends from the second side of the base. The first end of the first wall is adjacent the second side of the base and opposite the second end of the first wall. The first wall includes a first interior wall surface defining a first bore configured for fixed placement of a first component. The apparatus also includes a second wall including a first end of the second wall and a second end of the second wall. The second wall extends from the second side of the base. The first end of the second wall is adjacent the second side of the base and opposite the second end of the second wall. The second wall includes a second interior wall surface defining a second bore configured for fixed placement of a second component.

In accordance with at least some of the example implementations, the first and second components include an infrared array sensor and a laser pointer. Those components are used in conjunction with a visible light camera (VLC). Installation of the first and second components within the first and second bores aligns the first and second components with each other.

An apparatus including a VLC, an infrared array sensor, a laser pointer, and a display can be configured to display a blended picture-in-picture based on outputs of the VLC and the infrared array sensor. This apparatus can also display an output of the VLC with a laser dot centered on the display and pointing to a portion of a target shown on the display. Moreover, the apparatus can also display a temperature indicative of a surface temperature of the portion of a target pointed to by the laser. For this apparatus or a similarly-equipped apparatus, it is desirable to align an output of the VLC with the output of the infrared array sensor, and to align the laser pointer with the infrared array sensor. An output of the visible light camera can be shifted so that the pointer is shown in the center of the display.

In an example implementation, the infrared array sensor can, but need not necessarily, be a 32×32 infrared array sensor having a 33° field-of-view, and the visible light camera can, but need not necessarily, be a 640×480 VLC having a 59.9° horizontal field-of-view and a 46.7° vertical field-of-view. In accordance with at least some of these implementations, a display of the apparatus can include a 240×240 pixels liquid crystal display (LCD) arranged in a portrait mode, the VLC and the infrared array sensor are vertically aligned with the VLC rotated by 90°, and the output of the infrared array sensor is upscaled by a factor of 5 to 160×160 and shown in the center of the 240×240 pixels LCD. A person skilled in the art will understand that other examples and arrangements of the infrared array sensor, VLC, and/or the display for use in the other example implementations are also possible.

The example implementations provide for aligning a laser pointer with a thermal image by using a visible light image as a reference to the thermal image. Such implementations remove the requirement for aiming the output of the laser pointer to a specific point of the infrared array sensor. Accordingly, problems associated with random variation in the relative rotational positions of the infrared array sensor, the laser pointer, and the visible light camera are mitigated.

II. Example Apparatus and Systems

Figure 1:
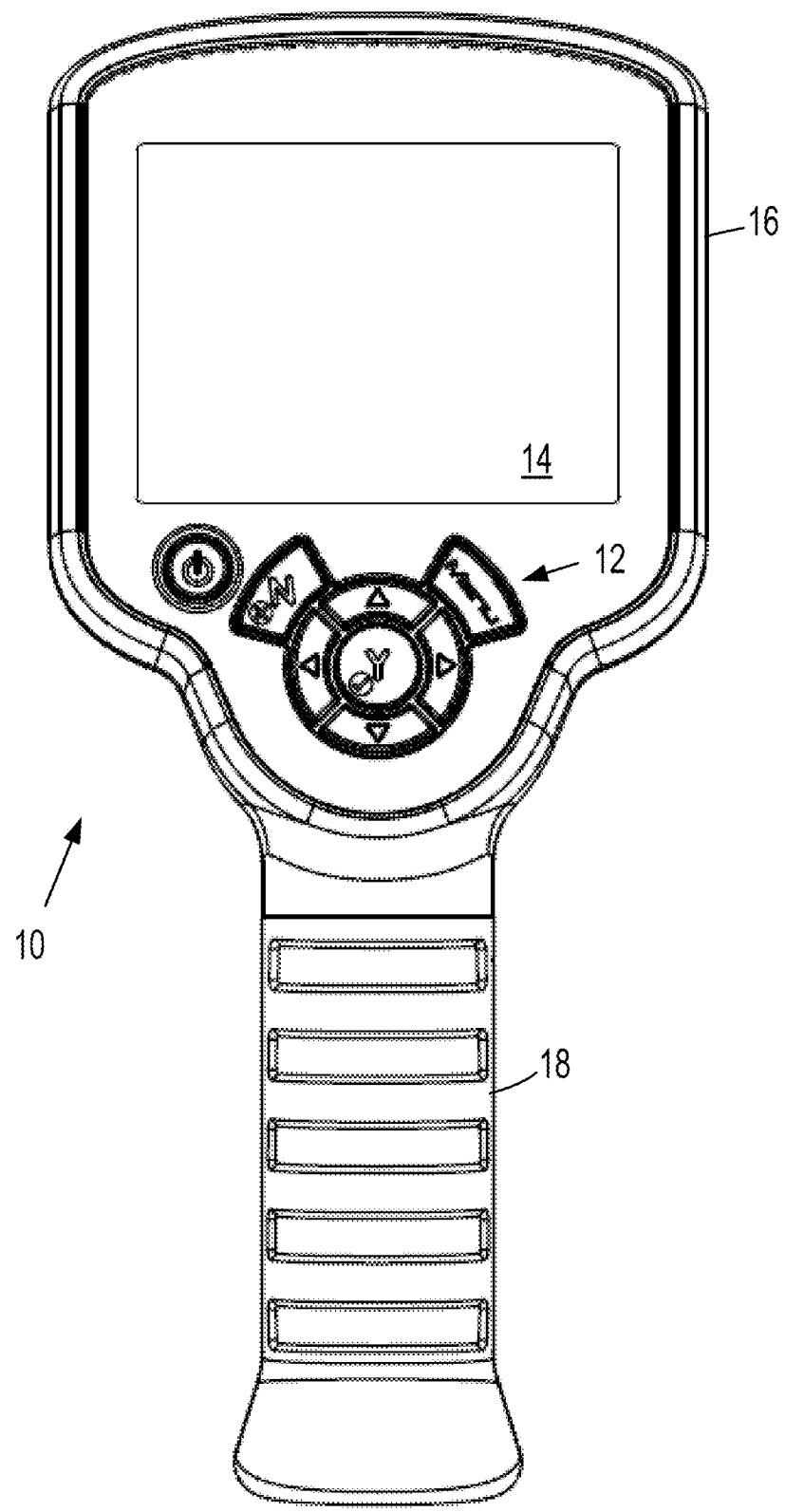
FIG. 1, FIG. 2, and FIG. 3 show an imaging system in accordance with example implementations described herein.

FIG. 1 shows an imaging system 10 in accordance with at least some of the example implementations. The imaging system 10 includes user interface components 12, a display 14, a housing 16, and a handle 18. The user interface components 12 include an on/off button, a no button, a yes button, a move left button, a move up button, a move right button, a move down button, and a menu button. The handle 18 can, but need not necessarily, be a part of the housing 16.

Figure 2:
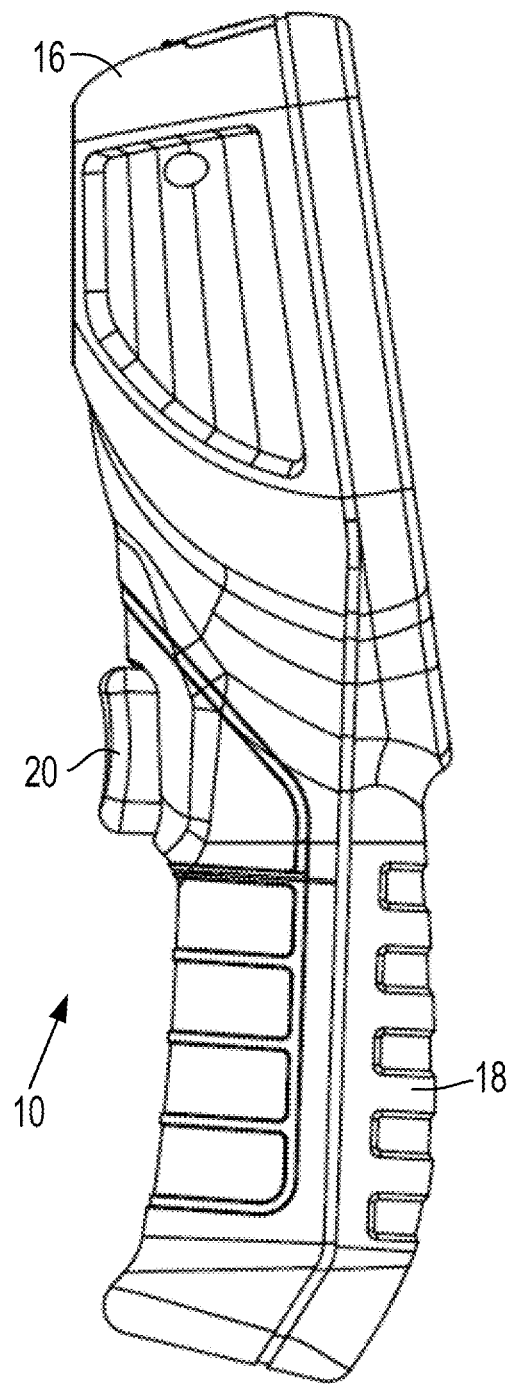

FIG. 2 shows the imaging system 10 including the housing 16, the handle 18, and a user interface component 20. The user interface component 20 is a trigger button configured to trigger capture of an image or video. The user interface component 20 can be configured to trigger stopping capture of the video.

Figure 3:
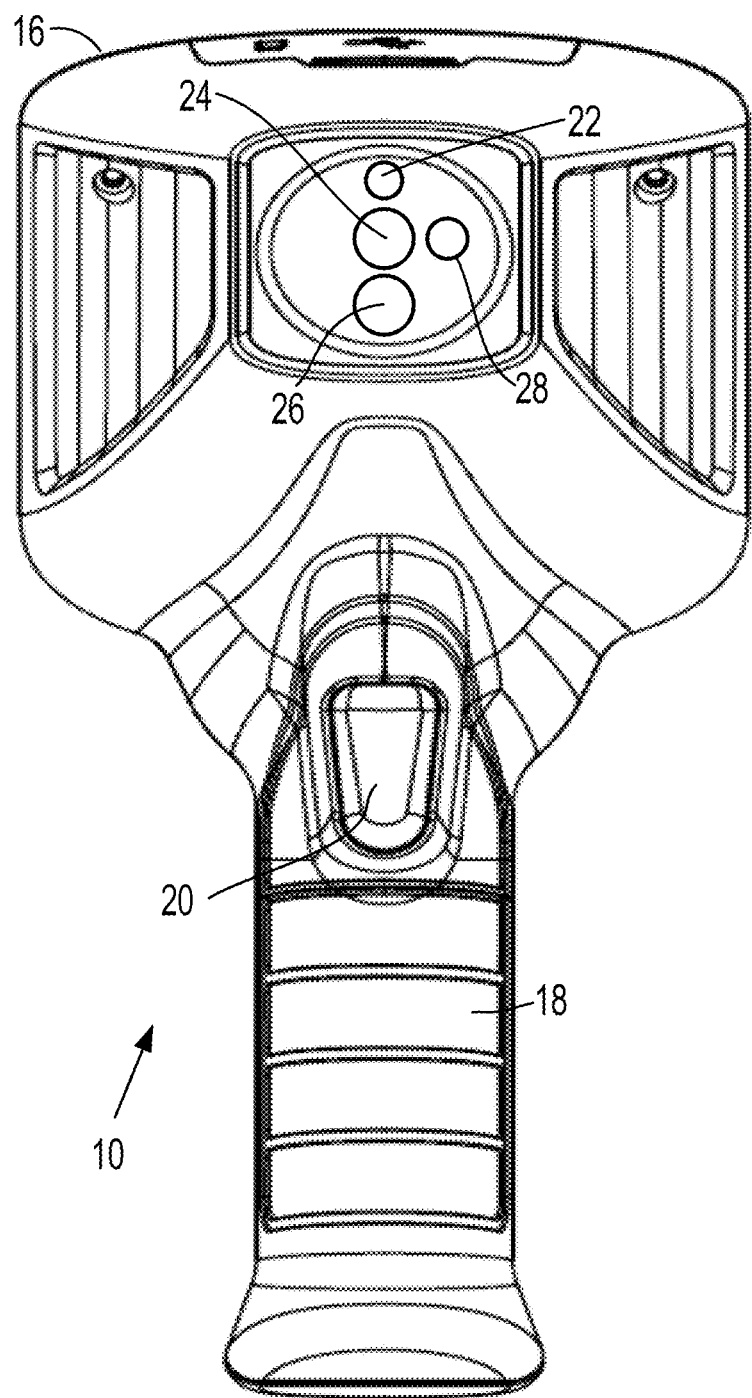

FIG. 3 also shows the imaging system 10, the housing 16, the handle 18, the user interface component 20, as well as a laser pointer window 22, a thermal imager window 24, a visible light window 26, and a light 28. The imaging system 10 can include a component aligner to align components. As an example, the component aligner can align a laser pointer and an infrared array sensor to each other and with respect to the laser pointer window 22 and the thermal imager window 24, respectively.

An image captured by the imaging system 10 can include a visible light image or a thermal image. The imaging system 10 can generate a blended image based on the visible light and thermal images. Similarly, a video captured by the imaging system 10 can include a visible light video or a thermal video. The imaging system 10 can generate a blended video based on the visible light and thermal videos.

Figure 4:
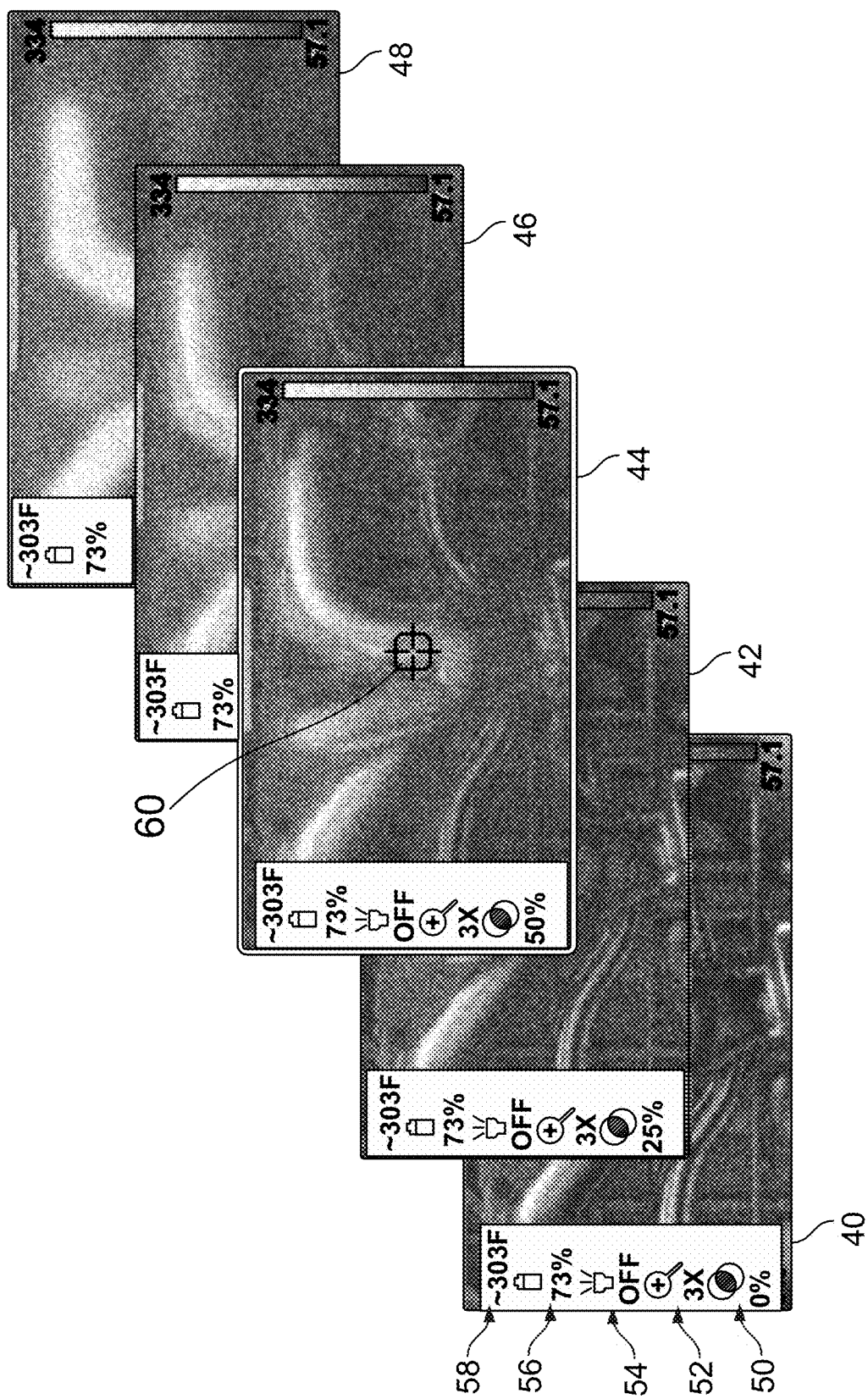
FIG. 4 shows blended images in accordance with example implementation described herein.

FIG. 4 shows blended image 40, 42, 44, 46, 48. The imaging system 10 can generate the blended images from a visible light image and a thermal image. The blended image 40, 42, 44, 46, 48 can be displayed on the display 14. One or more icons can overlay an image displayed on the display. For example, an opacity setting icon 50, a zoom icon 52, a light status icon 54, a battery state-of-charge icon 56, and/or a temperature icon 58 can be overlaid upon the blended image 40, 42, 44, 46, 48.

For the blended image 40, the opacity setting icon 50 indicates 0% to represent the blended image 40 is based on 100% of a visible light image and 0% of a related thermal image. For the blended image 42, an opacity setting icon indicates 25% to represent the blended image 42 is based on 75% of a visible light image and 25% of a related thermal image. For the blended image 44, an opacity setting icon indicates 50% to represent the blended image 44 is based on 50% of a visible light image and 50% of a related thermal image. For the blended image 46, an opacity setting icon (not shown) could indicate 75% to represent the blended image 46 is based on 25% of a visible light image and 75% of a related thermal image. For the blended image 48, an opacity setting icon (not shown) could indicate 100% to represent the blended image 48 is based on 0% of a visible light image and 100% of a related thermal image. Alternatively, for an opacity value other than 0%, the opacity value can represent a percentage of the intensity detected for each pixel of the thermal image with the intensity detected for each pixel of the visible light image at 100% or another fixed percentage.

The zoom icon 52 can be switched to match a zoom setting (such as 1X, 2X, or 3X) of a visible light camera or a thermal image camera. The light status icon 54 can be switched to indicate whether the light 28 is on or off. The battery state-of-charge icon 56 can be switched to indicate an integer or decimal percentage closest to a percentage value of state-of-charge of a battery of a power supply in the imaging system 10 with respect to when that battery is fully charged. The temperature icon 58 can indicate a temperature detected at a portion of an image subject shown at and/or within a target shown on a thermal or blended image.

The display 14 can display a target on an object shown in an image. For a thermal or blended image, the target can indicate a particular location on the object shown in the image at which a temperature is indicated by a temperature icon, such as the temperature icon 58. In accordance with an example implementation, a target can include a cross-hair, such as a cross-hair 60 on the blended image 44. In accordance with another example implementation, a target can include a dot generated by a laser pointer within the imaging system 10. An output of the laser pointer can pass through the laser pointer window 22.

Figure 5:
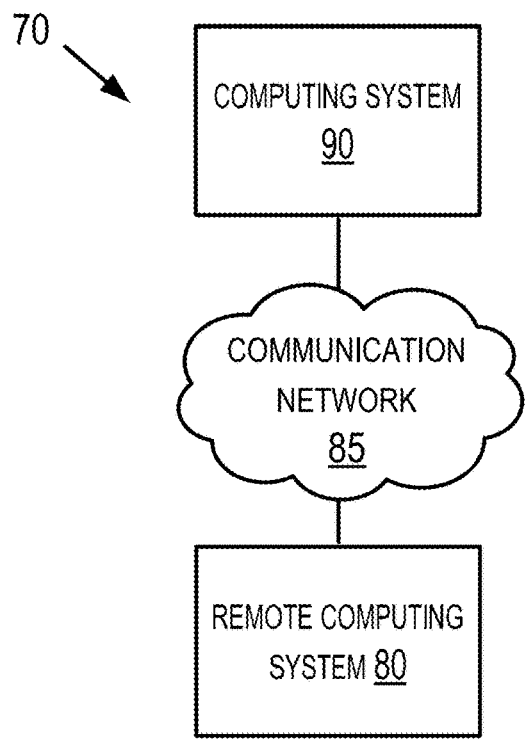
FIG. 5 is a block diagram of a system in accordance with example implementations described herein.

Next, FIG. 5 shows a system 70 including a remote computing system 80, a communication network 85 and a computing system 90. The communication network 85 can include one or more network components and one or more communication networks. A network component, such as a switch or gateway, can operatively couple two or more communication networks of the communication network 85 together. Other examples of a network component within the communication network 85 include: an access point, an antenna, a base station, a hub, a modem, a network cable, a network interface card, a relay, a receiver, a router, a transceiver, and/or a transmitter.

The communication network 85 is configured to carry communications. For example, the communication network 85 can be configured to carry communications from the computing system 90 to the remote computing system 80 and/or vice versa. Carrying the communications over the communication network 85 can occur over a wire and/or by radio.

In some implementations, the communication network 85 or at least a portion of the communication network 85 includes a local area network (LAN) and/or a wide area network (WAN). In some of those implementations, the LAN and/or WAN carries data using packet-switched and/or circuit-switched technologies. The LAN and/or WAN can include an air interface or a wire to carry the data.

In some implementations, the communication network 85 or at least a portion of the communication network 85 is configured to carry out communications using a Transmission Control Protocol (TCP) and the Internet Protocol (IP). Accordingly, the communication network 85 or at least a portion of the communication network 85 can be part of the communication network commonly referred to as the Internet and/or include a network component providing access to data stored on the World Wide Web. As an example, the communication network 85 can provide the computing system 90 with a path to the remote computing system 80 in order to retrieve data, such as a web page, from the remote computing system 80. As another example, the communication network 85 can provide the computing system 90 with a path to the remote computing system 80 in order to store data at the remote computing system 80, such as an image generated at the computing system 90.

In accordance with an example implementation, the computing system 90 can include the imaging system 10. In accordance with that example implementation and/or another implementation, the remote computing system 80 can include a server.

Figure 7:
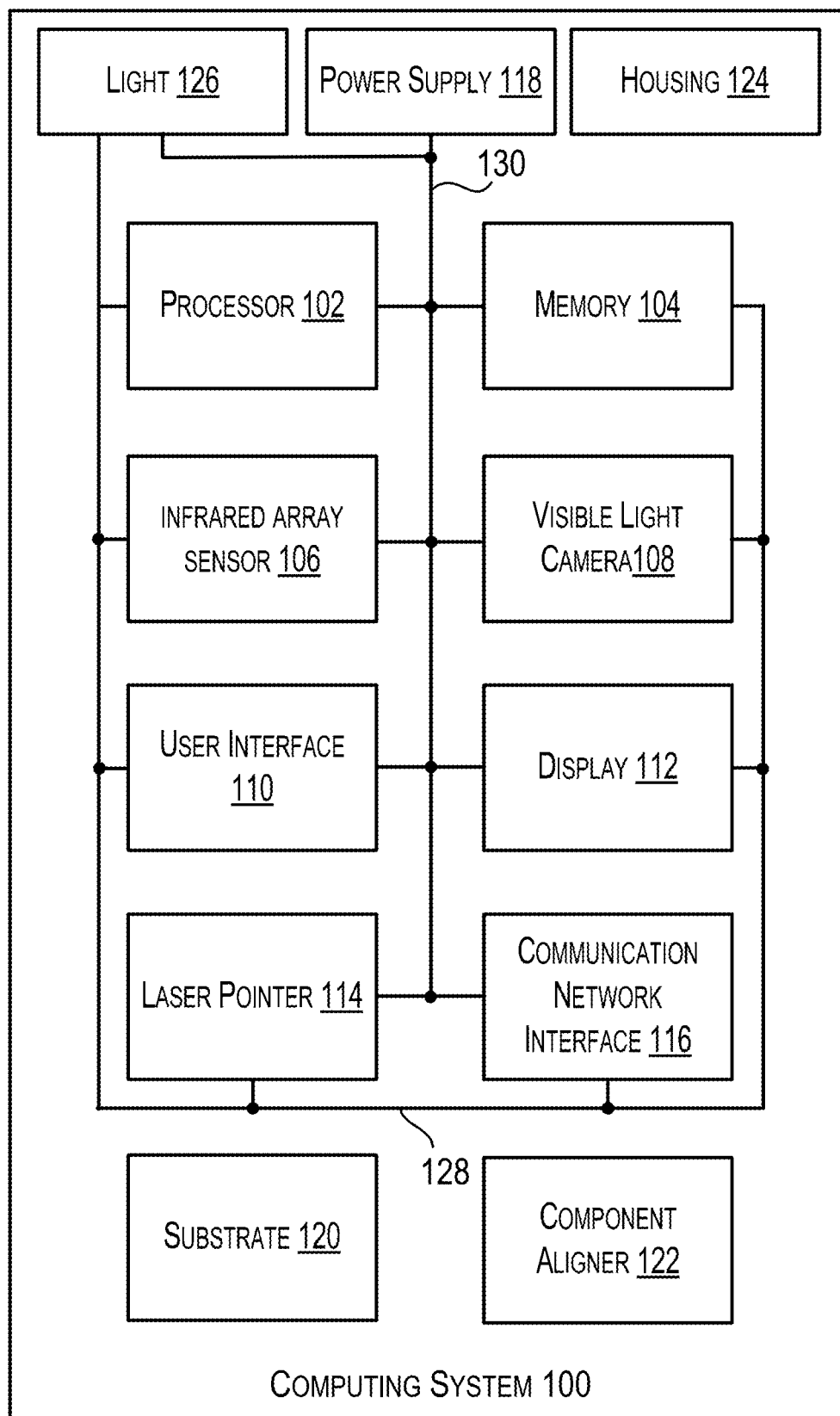
FIG. 7 is a block diagram of a computing system in accordance with example implementations described herein.

FIG. 7 is a block diagram of a computing system 100 including a processor 102, a memory 104, an infrared array sensor 106, a visible light camera 108, a user interface 110, a display 112, a laser pointer 114, a communication network interface 116, a power supply 118, a substrate 120, a component aligner 122, a housing 124, and/or a light 126. The computing system 100 can also include a data bus 128 to operatively couple the processor 102, the memory 104, the infrared array sensor 106, the visible light camera 108, the user interface 110, the display 112, the laser pointer 114, the communication network interface 116, and/or the light 126 to each other. The computing system 100 can also include an electrical circuit 130 to couple the power supply 118 to the processor 102, the memory 104, the infrared array sensor 106, the visible light camera 108, the user interface 110, the display 112, the laser pointer 114, the communication network interface 116, and/or the light 126. As discussed further below, the memory 104 can include a non-volatile memory.

In accordance with an example implementation, the imaging system 10 can include and/or be configured like the computing system 100. In accordance with another example implementation, the computing system 90 can include and/or be configured like the computing system 100. The component aligner 122 can, but need not necessarily, be configured like a component aligner described in section III of this description. Section IV of this description describes other components that can be included within example implementations of the computing system 100.

In accordance with the example implementations, the component aligner 122 is configured to hold two components in alignment at an early production level, such as a production level when a substrate (e.g., a printed circuit board) is being populated with components. The component aligner 122 holds the two components in place while the two components are soldered to the substrate. No further mechanical positioning of the two components is necessary. The processor 102 can be configured to perform a calibration process that allows for performing pinpoint temperature measurements based on where an output of the laser pointer 114 contacts a surface of a target. The two components installed into the component aligner 122 can include two angular position-sensitive components, such as the infrared array sensor 106 and the laser pointer 114. In at least some implementations, the component aligner 122 can hold those two components in a parallel alignment such that the output of the laser pointer 114 is in a known position relative to the infrared array sensor 106, such as within the field-of-view of the infrared array sensor 106. In other words, the component aligner 122 prevents angular rotation of the components installed within the component aligner 122.

The component aligner 122 can include a bore and a slot open to the bore such that a tab of a component can be installed into the slot as the component is being installed into the bore. Rotation of the component installed into the bore can be limited by an amount of angular rotation the tab is permitted to move, if at all, within the slot. The slots of a component aligner can allow more tolerance in the size of components to be installed into the component aligner since the slot permits the wall of a component aligner to expand.

Figure 8:
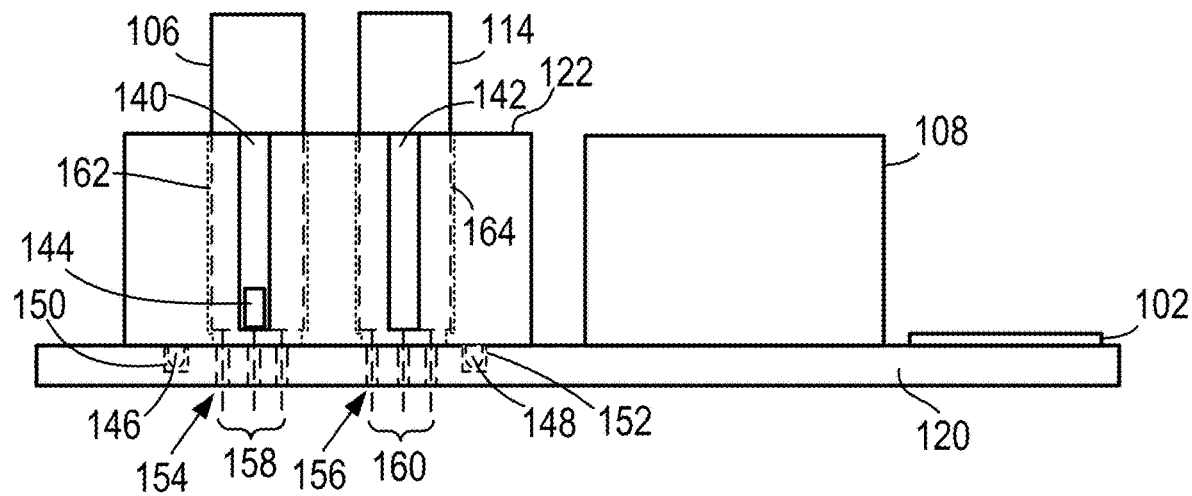
FIG. 8 is an elevation view of aspects of the computing system shown in FIG. 7 in accordance with example implementations described herein.

Next, FIG. 8 shows an elevation view of aspects of the computing system 100 in accordance with an example implementation. This elevation view shows the substrate 120 and components of the computing system 100 on and/or in the substrate 120. In particular, elevation view of FIG. 8 shows the processor 102, the infrared array sensor 106, the visible light camera 108, the laser pointer 114, and the component aligner 122. The substrate 120 is shown to include holes 150, 152, 154, 156. The holes 150, 152 are shown as extending only partly into the substrate 120, but could be through-holes. The holes 154, 156 are shown as through-holes that extend completely through the substrate 120. The holes 154 can, but need not necessarily, include a number of holes equal to a number of electrical pins 158 extending from an enclosure of the infrared array sensor 106. Likewise, the holes 156 can, but need not necessarily, include a number of holes equal to a number of electrical pins 160 extending from an enclosure of the visible light camera 108.

In the example implementation shown in FIG. 8, the component aligner 122 is shown with a slot 140, a slot 142, a protrusion 146, a protrusion 148, a bore 162, and a bore 164. The infrared array sensor 106 is disposed within the bore 162 such that a tab 144 of the infrared array sensor 106 is disposed within the slot 140. The tab 144 being disposed within the slot 140 provides for the infrared array sensor 106 being installed within the component aligner 122 with a given orientation and can prevent the infrared array sensor 106 from rotating at all or rotating beyond a minimal amount based on any gap between the tab 144 and walls that define the slot 140.

The laser pointer 114 is disposed within the bore 162. The laser pointer 114 can, but need not necessarily, include a tab to disposed within the slot 142 such that the laser pointer 114 is positioned in a particular orientation and to prevent the laser pointer 114 from rotating at all or rotating beyond a minimal amount based on any gap between a tab on the laser pointer 114 and walls that define the slot 142.

Figure 9:
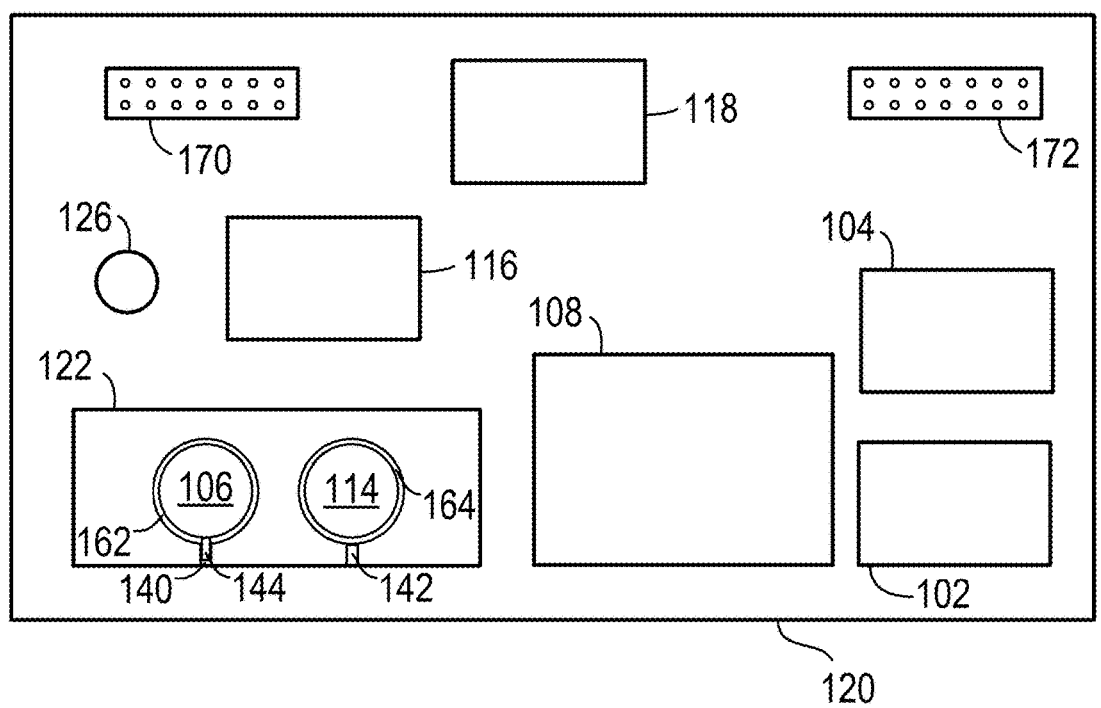
FIG. 9 is a plan view of aspects of the computing system shown in FIG. 7 in accordance with example implementations described herein.

Next, FIG. 9 shows a plan view of aspects of the computing system 100 in accordance with an example implementation. The plan view shows the substrate 120 and the following components disposed on the substrate 120: the processor 102, the memory 104, the infrared array sensor 106, the visible light camera 108, the laser pointer 114, the communication network interface 116, the power supply 118, the component aligner 122, the light 126, a connector 170, and a connector 172. In accordance with this implementation, the connector 170 could be used to operatively connect the user interface 110 to the substrate 120, and the connector 172 could be used to operatively connect the display 112 to the substrate 120. FIG. 9 also shows a top view of the slot 140 with the tab 144 disposed within the slot 140, as well as the slot 142, the bore 162, and the bore 164. The substrate 120 can include the data bus 128 and the electrical circuit, both shown in FIG. 7.

III. Example Component Aligners

In accordance with a first example implementation, the component aligner 122 includes a base having a first side of the base and a second side of the base opposite the first side of the base. The component aligner also includes a first wall including a first end of the first wall and a second end of the first wall. The first wall extends from the second side of the base. The first end of the first wall is adjacent the second side of the base and opposite the second end of the first wall. The first wall includes a first interior wall surface defining a first bore configured for fixed placement of a first component. The component aligner also includes a second wall including a first end of the second wall and a second end of the second wall. The second wall extends from the second side of the base. The first end of the second wall is adjacent the second side of the base and opposite the second end of the second wall. The second wall includes a second interior wall surface defining a second bore configured for fixed placement of a second component.

In at least some of the first example implementations of the component aligner 122, a portion of the first wall is a portion of the second wall.

In at least some of the first example implementations of the component aligner 122, a portion of the first wall surrounds an entire cross section of the first bore, and a portion of the second wall surrounds an entire cross section of the second bore. In at least some of aforementioned implementations, the first wall does not contact the second wall.

In at least some of the first example implementations of the component aligner 122, at least a portion of the first wall is cylindrical, rectangular, elliptical, oval, or stadium-shaped, and/or at least a portion of the second wall is cylindrical, rectangular, elliptical, oval, or stadium-shaped.

In at least some of the first example implementations of the component aligner 122, a first portion of the second side of the base provides a first ledge within the first bore, and/or a second portion of the second side of the base provides a second ledge within the second bore.

In at least some of the first example implementations of the component aligner 122, the first side of the base is flat, the first ledge has a top surface of the first ledge, the second ledge has a top surface of the second ledge, and the top surface of the first ledge, rather than the top surface of the second ledge, is closer to the first side of the base.

In at least some of the first example implementations of the component aligner 122, the component aligner 122 further includes a first component including a first lens and a second component including a second lens. The first component is fixedly disposed within the first bore and the second component is fixedly disposed within the second bore.

In at least some of the first example implementations of the component aligner 122, the first bore includes a first portion of the first bore and a second portion of the first bore. The first portion of the first bore extends from the second end of the first wall to the top surface of the first ledge. The second portion of the first bore extends from the first side of the base to the top surface of the first ledge. A cross-section of the first portion of the first bore is larger than a cross-section of the second portion of the first bore. Additionally, the second bore includes a first portion of the second bore and a second portion of the second bore. The first portion of the second bore extends from the second end of the second wall to the top surface of the second ledge. The second portion of the second bore extends from the first side of the base to the top surface of the second ledge. A cross-section of the first portion of the second bore is larger than a cross-section of the second portion of the second bore.

In at least some of the first example implementations of the component aligner 122, at least a portion of the first bore is tapered and/or at least a portion of the second bore is tapered. A bore in the component aligner 122 tapered such that a cross-section of the bore is larger near the top of the bore than away from the top of the bore eases installation of a component into the bore. As the precision of components increases, an amount of taper needed to ease installation of those components decreases.

In at least some of the first example implementations of the component aligner 122, the component aligner 122 also includes the first component and the first component is fixedly placed within the first bore. Additionally, the component aligner 122 includes the second component and the second component is fixedly placed within the second bore. In at least some of the aforementioned implementations, a longitudinal centerline of the first component is parallel to a longitudinal centerline of the second component. In at least some other implementations, a longitudinal centerline of the first component and a longitudinal centerline of the second component intersect at a given distance away from an end of the first component and/or from an end of the second component.

In at least some of the first example implementations of the component aligner 122, the component aligner 122 also includes a first slot within the first wall. The first slot is open at the first interior wall surface and at the second end of the first wall. In at least some of the aforementioned implementations, the component aligner 122 also includes the first component. The first component is fixedly placed within the first bore and the first component includes a tab disposed within the first slot.

In at least some of the first example implementations of the component aligner 122, the component aligner 122 also includes a first slot within the first wall. The first slot is open at the first interior wall surface and at the second end of the first wall. In at least some of the aforementioned implementations, the first wall includes a first exterior wall surface of the first wall, and the first slot is further open at the first exterior wall surface of the first wall.

In at least some of the first example implementations of the component aligner 122, the component aligner 122 also includes a first slot within the first wall. The first slot is open at the first interior wall surface and at the second end of the first wall. In at least some of the aforementioned implementations, the component aligner 122 also includes a second slot within the second wall. The second slot is open at the second interior wall surface and at the second end of the second wall. In at least some of the aforementioned implementations, the component aligner 122 also includes the second component. The second component is fixedly placed within the second bore. The second component includes a tab disposed within the second slot.

In at least some of the first example implementations of the component aligner 122, the component aligner 122 also includes a first slot within the first wall. The first slot is open at the first interior wall surface and at the second end of the first wall. In at least some of the aforementioned implementations, the second wall includes a first exterior wall surface of the second wall, and the second slot is further open at the first exterior wall surface of the second wall.

In at least some of the first example implementations of the component aligner 122, the component aligner 122 is part of an apparatus. The component aligner 122 also includes a first slot within the first wall. The first slot is open at the first interior wall surface and at the second end of the first wall. In at least some of the aforementioned implementations, the apparatus includes a least a first side of the apparatus and a second side of the apparatus that is distinct from the first side of the apparatus. The first slot is disposed on the first side of the apparatus and the second slot is disposed on the second side of the apparatus.

In at least some of the first example implementations of the component aligner 122, the component aligner 122 also includes a substrate, and one or more protrusions extending from a surface of the first side of the base into a respective hole within the substrate.

In at least some of the first example implementations of the component aligner 122, the component aligner 122 also includes a substrate. The component aligner 122 is disposed on the substrate. The component aligner 122 also includes the first component, the second component, and a display configured to display a first image captured by a visible light camera, a second image captured by use of the second component, or a blended image based on the first image and the second image. The first component is fixedly placed within the first bore. The second component is fixedly placed within the second bore. In at least some of the aforementioned implementations, the first component includes a laser pointer and the second component includes an infrared array sensor. Additionally, the infrared array sensor has a field of view and the first bore and the second bore can be configured so that an output of the laser pointer exists within the field of view.

In at least some of the first example implementations of the component aligner 122, the first interior wall surface includes an upper end of the first interior wall surface, and the second interior wall surface includes an upper end of the second interior wall surface. Additionally, a portion of the first wall is tapered from the second end of the first wall to the upper end of the first interior wall surface or a portion of the second wall is tapered from the second end of the second wall to the upper end of the second interior wall surface.

Figure 10:
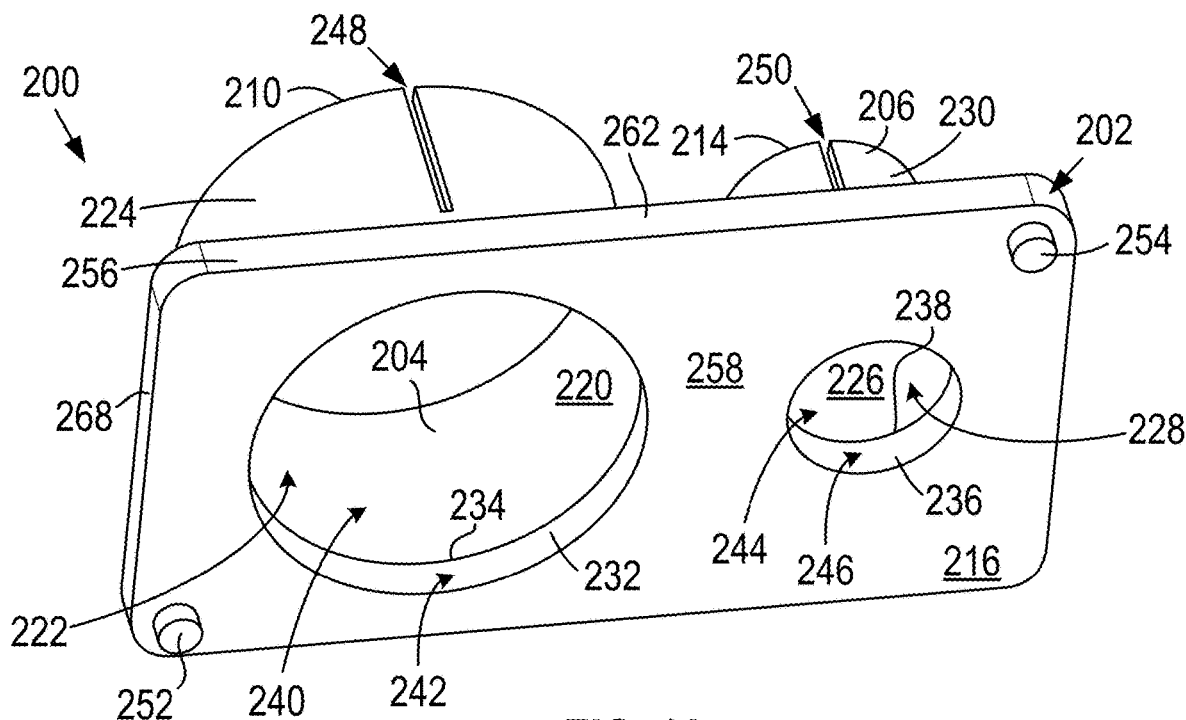
Figure 11:
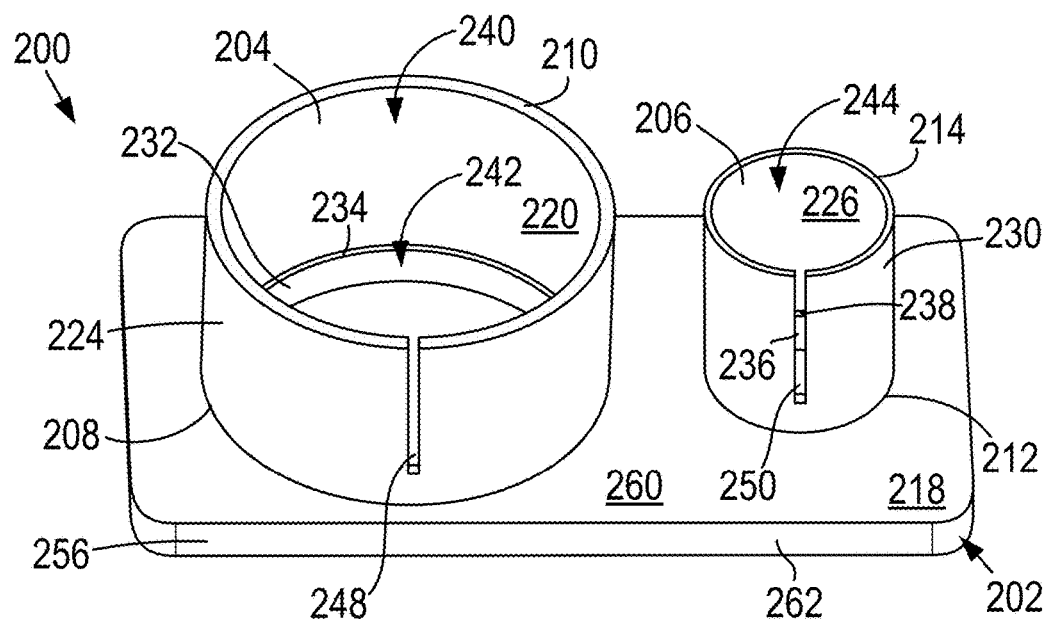
Figure 12:
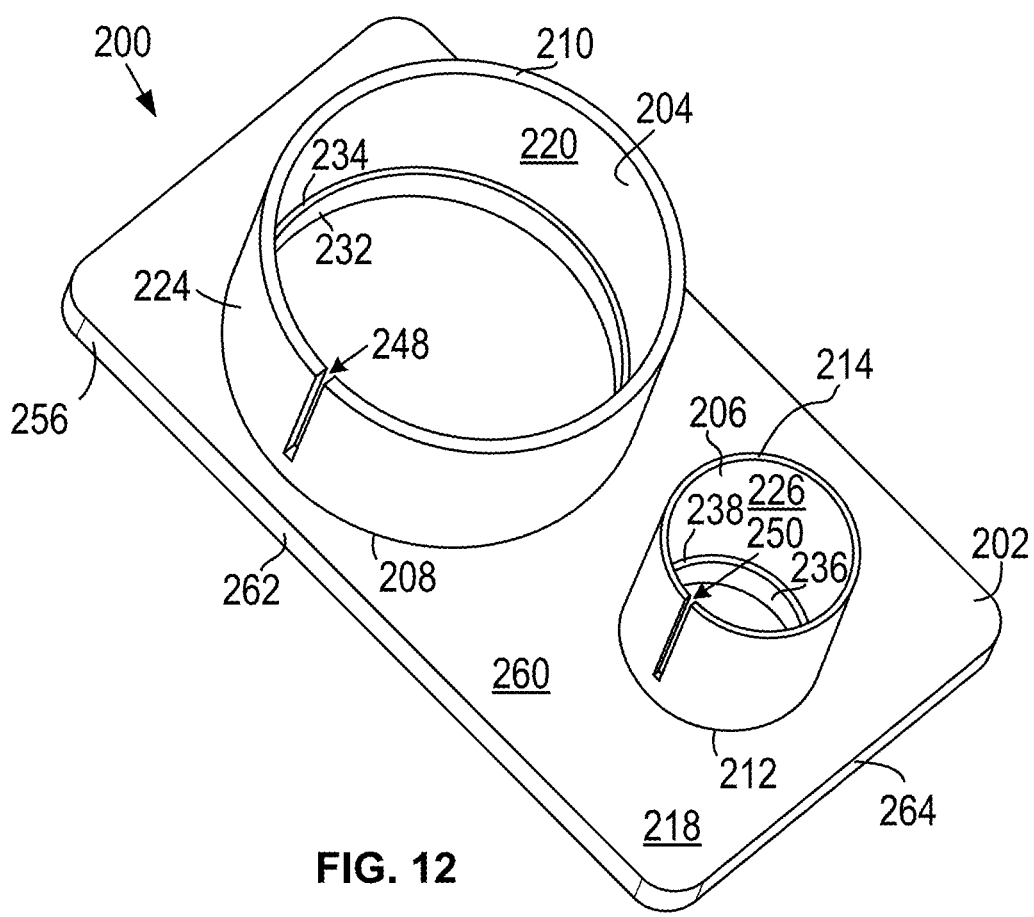
Figure 13:
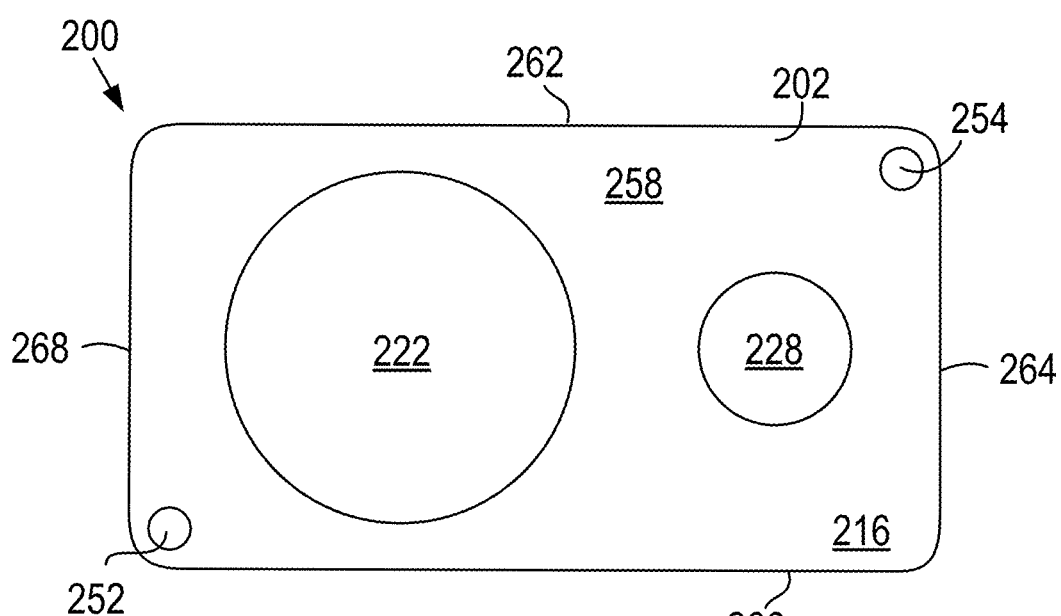
Figure 14:
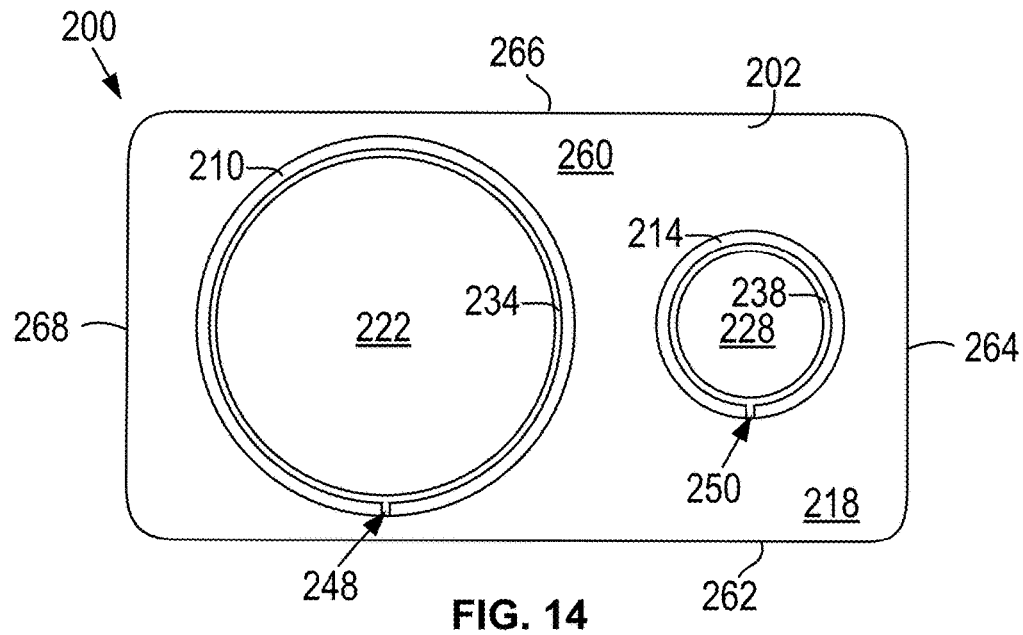

FIG. 10, FIG. 11, FIG. 12, FIG. 13, and FIG. 14 show multiple views of a component aligner 200 in accordance with an example implementation. In particular, FIG. 10, FIG. 11 and FIG. 12 show perspective views, FIG. 13 shows a bottom view, and FIG. 14 shows a top view. The component aligner 200 includes a base 202, a first wall 204, and a second wall 206. The first wall 204 includes a first end 208 and a second end 210. The second wall 206 includes a first end 212 and a second end 214. The base 202 includes a first side 216 and a second side 218. The first wall 204 and the second wall 206 extend from the second side 218 of the base 202. The first end 208 of the first wall 204 is adjacent to the second side 218 of the base 202 and opposite the second end 210 of the first wall 204. The first end 212 of the second wall 206 is adjacent to the second side 218 of the base 202 and opposite the second end 214 of the second wall 206. The first side 216 of the base 202 includes a surface 258 of the base 202. The second side 218 of the base 202 includes a surface 260 of the base 202. The first side 216 is opposite the second side 218. In this example implementation, the first wall 204 and the second wall 206 do not directly contact one another or having any common portion that is part of both the first wall 204 and the second wall 206.

A first bore 222 passes through the base 202 and is defined, in part, by the first wall 204. The first wall 204 includes an interior wall surface 220 and an exterior wall surface 224. The interior wall surface 220 defines a first portion 240 of the first bore 222. The first bore 222 is configured for fixed placement of a first component. A second bore 228 passes through the base 202 and is defined, in part, by the second wall 206. The second wall 206 includes an interior wall surface 226 and an exterior wall surface 230. The interior wall surface 226 defines a first portion 244 of the second bore 228. The second bore 228 is configured for fixed placement of a second component.

The first portion 240 of the first bore 222 can be referred to as an upper portion of the first bore 222. The first bore 222 also includes a second portion 242 of the first bore 222. The first portion 240 of the first bore 222 extends from second end 210 of the first wall 204 to a top surface 234 of a ledge 232. The second portion 242 of the first bore 222 extends from the first side 216 of the base 202 to the top surface 234 of the ledge 232. A cross section of the first portion 240 of the first bore 222 is larger than a cross section of the second portion 242 of the first bore 222. A size of the cross section of the first portion 240 of the first bore 222 can permit a component to be disposed into the first bore 222, but the ledge 232 can prevent the component from passing entirely through the second portion 242 of the first bore 222. At least a portion of electrical leads of a component disposed in the first bore 222 can pass through the second portion 242 of the first bore 222 so that those leads can contact the substrate 120.

The first portion 244 of the second bore 228 can be referred to as an upper portion of the second bore 228. The second bore 228 also includes a second portion 246 of the second bore 228. The first portion 244 of the second bore 228 extends from second end 214 of the second wall 206 to a top surface 238 of a ledge 236. The second portion 246 of the second bore 228 extends from the first side 216 of the base 202 to the top surface 238 of the ledge 236. A cross section of the first portion 244 of the second bore 228 is larger than a cross section of the second portion 246 of the second bore 228. A size of the cross section of the first portion 244 of the second bore 228 can permit a component to be disposed into the second bore 228, but the ledge 236 can prevent the component from passing entirely through the second portion 246 of the second bore 228. At least a portion of electrical leads of a component disposed in the second bore 228 can pass through the second portion 246 of the second bore 228 so that those leads can contact the substrate 120.

In some implementations, a distance from the top surface 234 of the ledge 232 to the first side 216 of the base 202 is equal to a distance from the top surface 238 of the ledge 236 to the first side 216 of the base 202. In other implementations, the distance from the top surface 234 of the ledge 232 to the first side 216 of the base 202 is greater than or less than a distance from the top surface 238 of the ledge 236 to the first side 216 of the base 202. In these latter implementations, the components to be installed into the first bore 222 and the second bore 228 may have different heights, but have sub-components such as a lens that are preferably disposed at a common distance above the first side 216 of the base 202. Accordingly, a shorter component can be installed within the bore having a top surface of a ledge further away from first side 216 of the base 202, and a longer component can be installed within the bore having a top surface of a ledge closer to the first side 216 of the base 202. In some implementations, a lens of a component can be within the bore of the component aligner 200 or outside of the bore of the component aligner even though another portion of the component with the lens is disposed within the bore.

The component aligner 200 includes a protrusion 252 and a protrusion 254, both extending from the first side 216 of the base 202 and/or the surface 258 of the base 202. The protrusions 252, 254 are configured for placement within holes within a substrate, such as the holes 150, 152 within the substrate 120. The protrusions 252, 254 can keep the component aligner 200 from sliding across the substrate 120 once the protrusions 252, 254 are disposed within the holes 150, 152. In some implementations, the protrusions 252, 254 are arranged non-symmetrically on the first side 216 and/or the surface 258 of the base 202 so that the protrusions 252, 254 cannot be improperly installed into the holes 150, 152 and to improve the likelihood that the component aligner 200 is properly attached to the substrate 120. In some implementations, the component aligner 200 includes a different quantity of protrusions on the first side 216 and/or surface 258 of the base 202. In yet other implementations, no protrusions extend from the first side 216 and/or surface 258.

In some implementations, the first side 216 of the base 202, other than protrusions 252, 254 extending from the first side 216 of the base 202 is flat. In some implementations, a portion of the base 202 is tapered from the first side 216 of the base 202 to the ledge 232 and/or a portion of the base 202 is tapered from the first side 216 of the base 202 to the ledge 236. Those tapered portions of the base can ease removal of the component aligner 200 from a mold in which the component aligner 200 is formed.

The base 202 includes a wall 256 extending from the first side 216 of the base 202 to the second side 218 of the base 202. The wall 256 includes sides 262, 264, 266, 268.

A wall of a component aligner can include a slot. The slot provides a location to place a tab of a component installed within a bore defined at least in part by the wall. The wall prevents or limits an amount of rotation of the component installed within the bore. In some example implementations, the slot within a wall can be open at an interior wall surface of the wall including the slot. The slot can also be open at end of the wall, such as the top end of the wall including the slot. In at least some of the implementations, the slot is also open at an exterior wall surface of the wall including the slot.

The first wall 204 includes a slot 248. The slot 248 is open at the interior wall surface 220, the second end 210 of the first wall 204, and at the exterior wall surface 224. Similarly, the second wall 206 includes a slot 250. The slot 250 is open at the interior wall surface 226, the second end 214 of the second wall 206, and at the exterior wall surface 230. As shown in FIG. 10, the slot 248 and the slot 250 are on a common side of the component aligner 200, namely, a side of the component aligner 200 including the side 262. In other implementations, a slot in the first wall 204 and a slot in the second wall 206 are on different sides of the component aligner 200.

A component aligner, such as the component aligner 200 or any other component aligner described in this description, can, but need not necessarily, be made from a high-temperature thermoplastic, such as a polyamide 46 (e.g., STANYL® Nylon 46 TE250F6). Other examples of material(s) used to make the component aligner 200 or any other component aligner described in this description are also possible.

Figure 15:
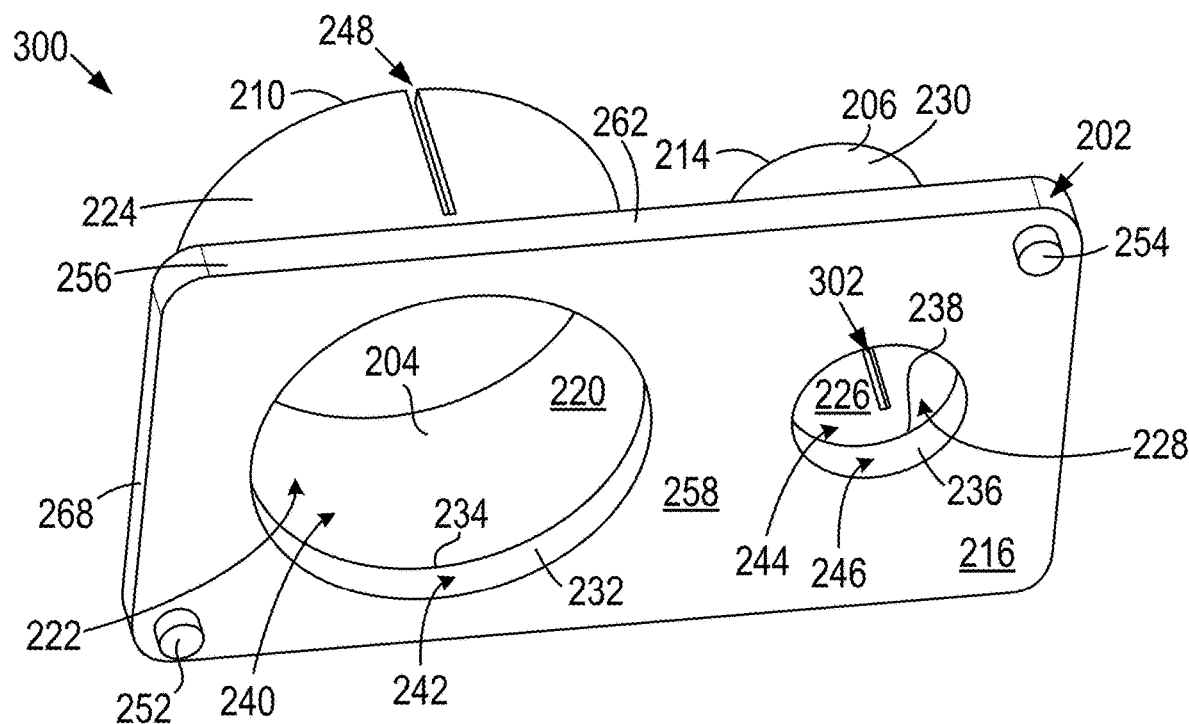
Figure 16:
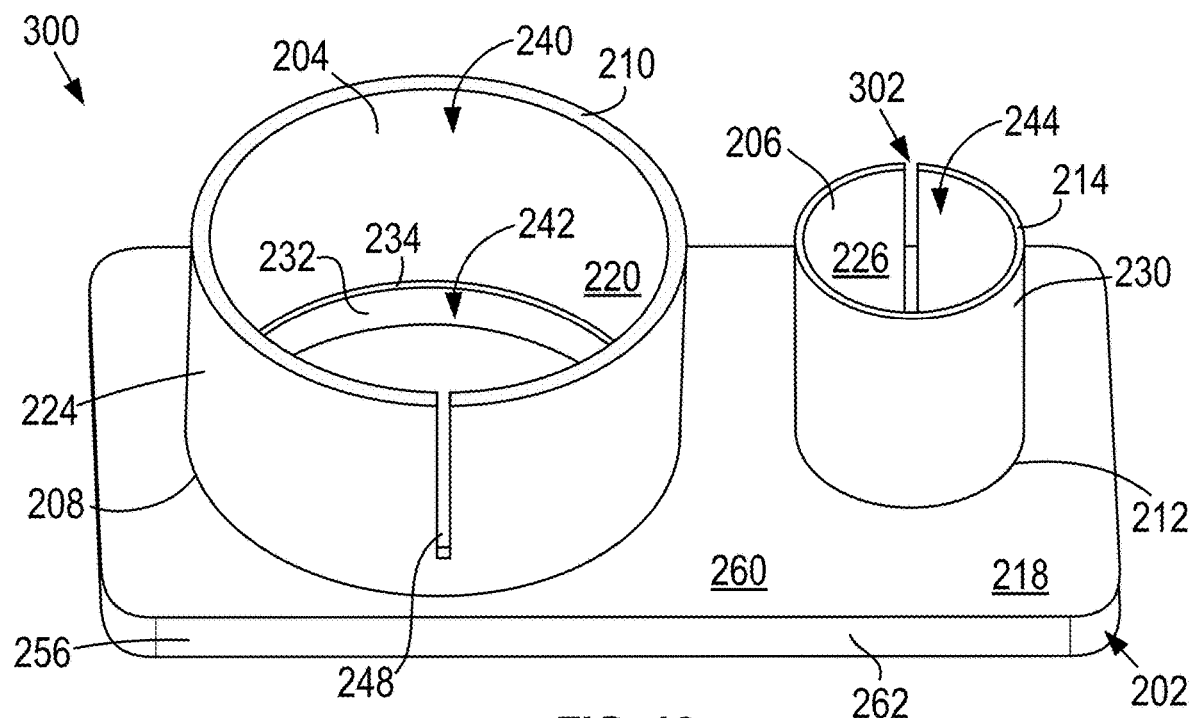
Figure 17:
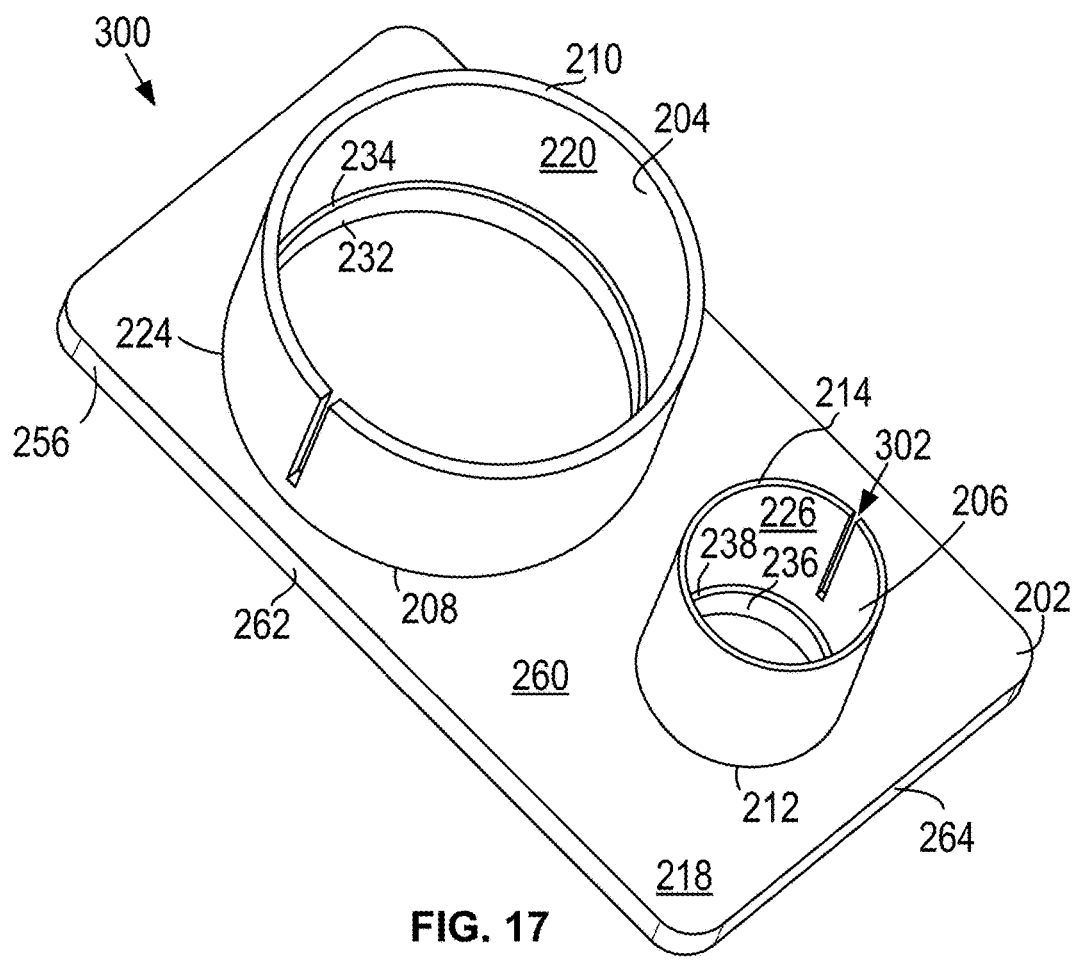
Figure 18:
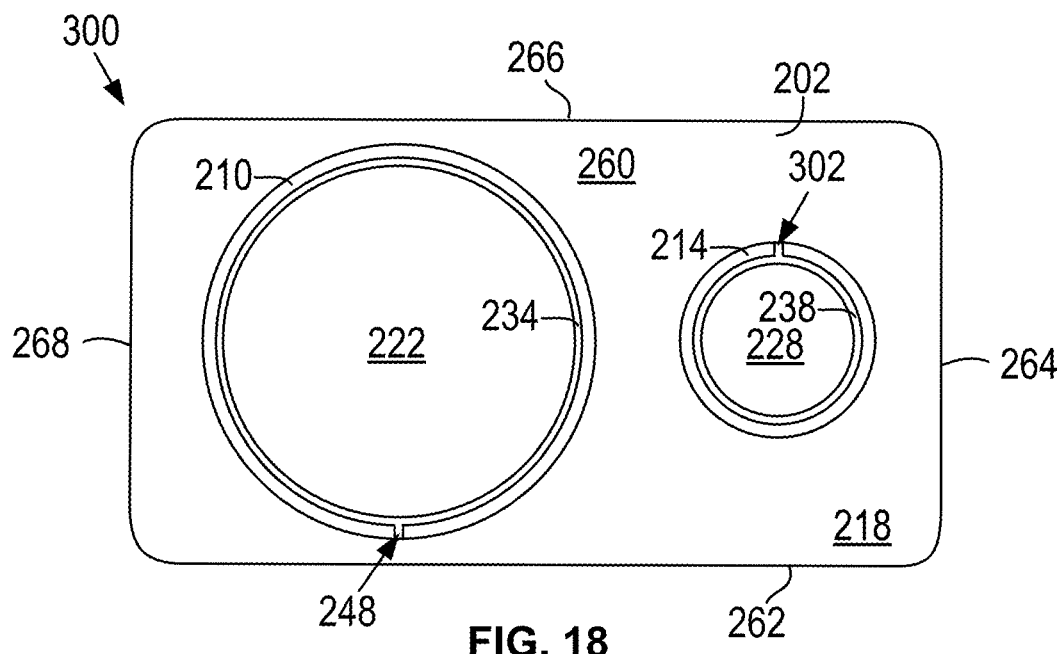

Next, FIG. 15, FIG. 16, FIG. 17, and FIG. 18 show multiple views of a component aligner 300 in accordance with an example implementation. In particular, FIG. 15, FIG. 16 and FIG. 17 show perspective views, and FIG. 18 shows a top view. The component aligner 300 is a variation of the component aligner 200. In this variation, the second wall 206 includes a slot 302 instead of the slot 250. Unlike the slots 248 and 250 that are on the same side of the component aligner 200, the slots 248, 302 are on different sides of the component aligner 300. A bottom view of the component aligner 300 is identical to the bottom view of the component aligner 200 shown in FIG. 13.

An advantage of having slots on different sides of the component aligner 300 is that components having tabs can be disposed within the component aligner 300 in an orientation in which the tabs are disposed on different sides of the component aligner 300. An example orientation can include an orientation in which the tabs need to be located on different sides of the component aligner 300 so that electrical voltage supply leads of the components disposed within the first bore 222 and the second bore 228 are arranged to make contact with a common printed circuit on the substrate 120.

Figure 19:
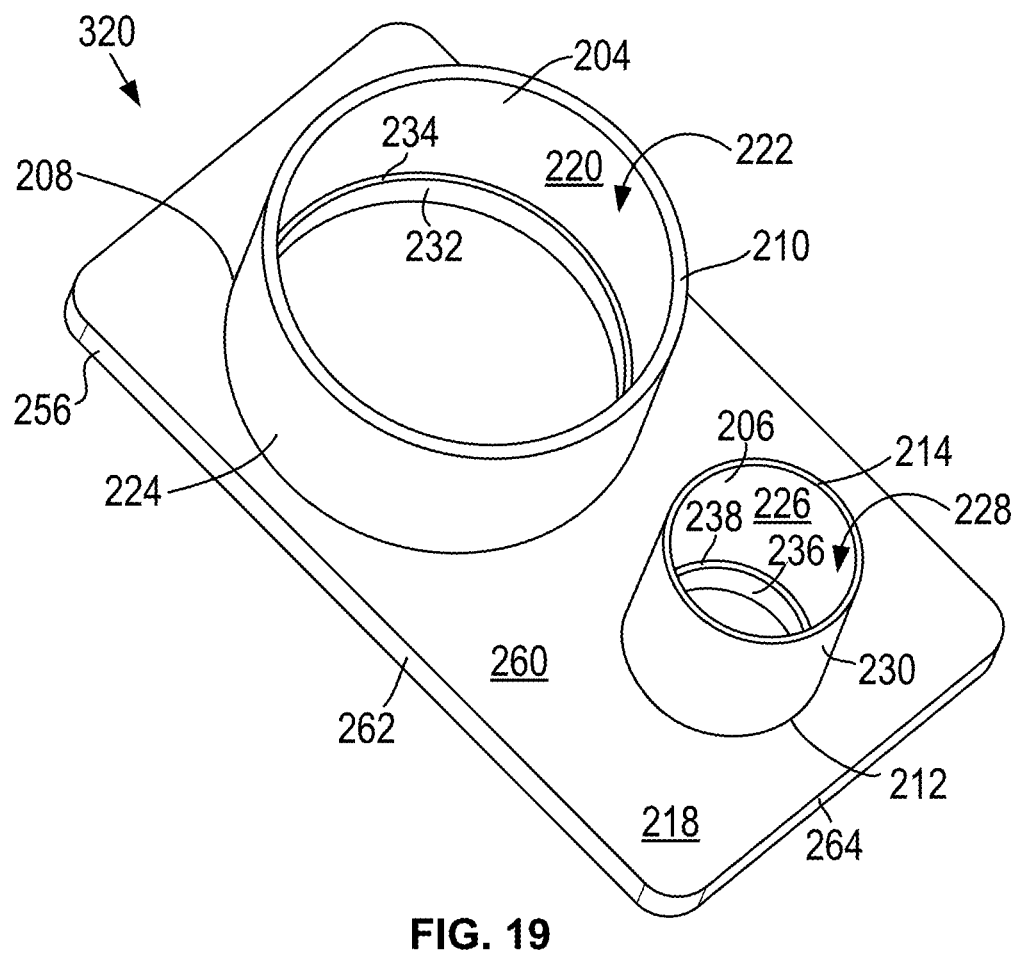

Next, FIG. 19 shows a component aligner 320 in accordance with an example implementation. The component aligner 320 is another variation of the component aligner 200. In this variation, the first wall 204 and the second wall 206 do not include any slots, such as the slots 248, 250 shown in FIG. 10, FIG. 11, and FIG. 12. A bottom view of the component aligner 320 is identical to the bottom view of the component aligner 200 shown in FIG. 13. A top view of the component aligner 320 is identical to the top view of the component aligner 200 shown in FIG. 14 except that the component aligner 320 does not include the slots 248, 250.

For walls made of the same size (e.g., thickness) and the same material, the first wall 204 and the second wall 206 of the component aligner 320 are stronger than the first wall 204 and the second wall 206 of an embodiment in which the first wall 204 and the second wall 206 includes a slot that extends at least partially extending therein. Since the first wall 204 and the second wall 206 of the component aligner 320 do not include any slots, components installed in the first bore 222 and the second bore 228 are not subject to dust or other materials that might otherwise pass through a slot in the first wall 204 and the second wall 206 and accumulate on electrical pins of the components installed in the first bore 222 and the second bore 228.

Figure 20:
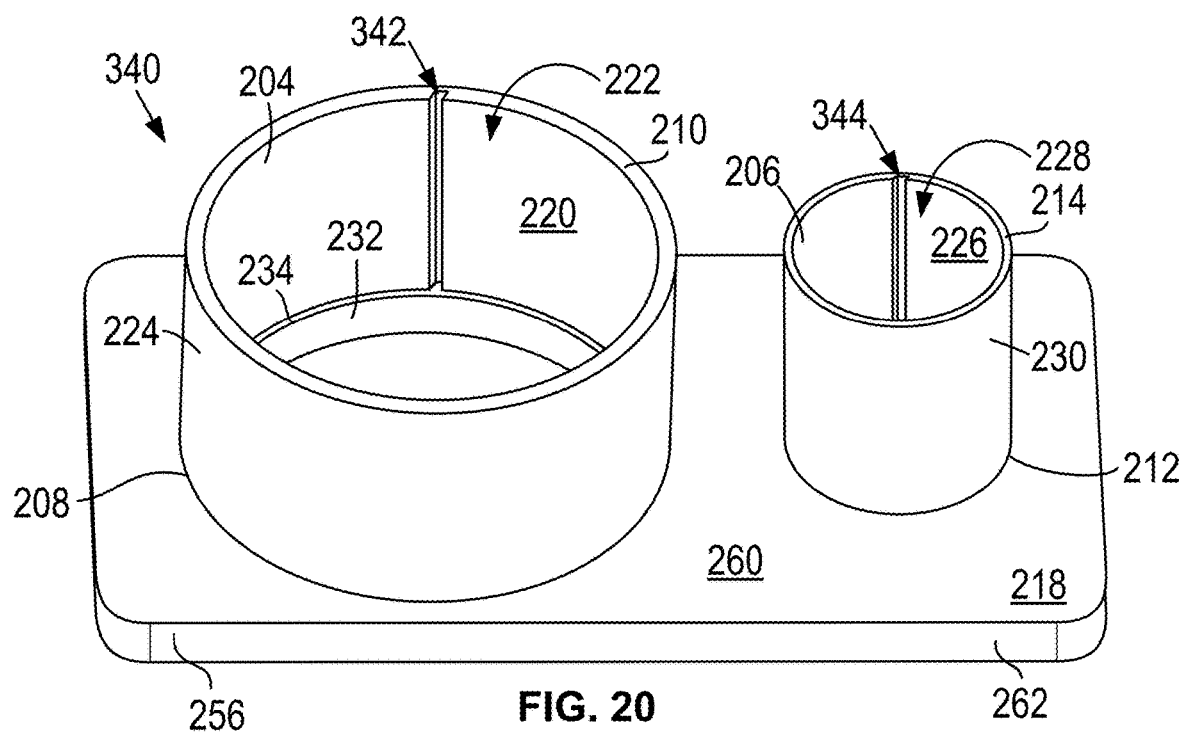

FIG. 20 shows a component aligner 340 in accordance with an example implementation. The component aligner 340 is another variation of the component aligner 200. In this variation, the first wall 204 includes a slot 342 instead of the slot 248 and the second wall 206 includes a slot 344 instead of the slot 250. The slot 342 is open at the interior wall surface 220 and at the second end 210 of the first wall 204. The slot 342 does not extend all the way through the first wall 204. Similarly, the slot 344 is open at the interior wall surface 226 and the second end 214 of the second wall 206. The slot 344 does not extend all the way through the second wall 206. In other words, the slot 342 and the slot 344 extend only partially into the first wall 204 and the second wall 206, respectively. A bottom view of the component aligner 340 is identical to the bottom view of the component aligner 200 shown in FIG. 13. A top view of the component aligner 340 is identical to the top view of the component aligner 200 shown in FIG. 14 except that the component aligner 340 includes the slots 342 and 344 and does not include the slots 248, 250.

Advantageously, the slot 342 is configured for receiving a tab of a component such that the component can be slid within the first bore 222. Positioning the component tab within the slot 342 can prevent or limit rotation of that component while installed in the first bore 222 and allows for expansion of the first wall 204 where the component contacts the interior wall surface 220. For walls made of the same size (e.g., thickness) and the same material, the first wall 204 of the component aligner 340 can be sturdier as compared to the first wall 204 in implementations in which a slot extends completely through the first wall 204. Furthermore, since the slot 342 extends only partially through the first wall 204, a component installed in the first bore 222 of the component aligner 340 is not subject to dust or other materials passing through a slot in the first wall 204.

Similarly, the slot 344 is configured for receiving a tab of a component such that the component can be slid within the second bore 228. Positioning the component tab within the slot 344 can prevent or limit rotation of that component while installed in the second bore 228 and allows for expansion of the second wall 206 where the component contacts the interior wall surface 226. For walls made of the same size (e.g., thickness) and the same material, the second wall 206 of the component aligner 340 can be sturdier as compared to the second wall 206 in implementations in which a slot extends completely through the second wall 206. Furthermore, since the slot 344 extends only partially through the second wall 206, a component installed in the second bore 228 of the component aligner 340 is not subject to dust or other materials passing through a slot in the second wall 206.

In yet another example implementation, a variation of the component aligner 200 could include the first wall 204 with a slot, such as the first wall 204 shown in FIG. 15, and the second wall without a slot, such as the second wall 206 shown in FIG. 19. In still yet another example implementation, a variation of the component aligner 200 could include the first wall 204 without a slot, such as the first wall 204 shown in FIG. 19, and the second wall with a slot, such as the second wall 206 shown in FIG. 15.

Figure 21:
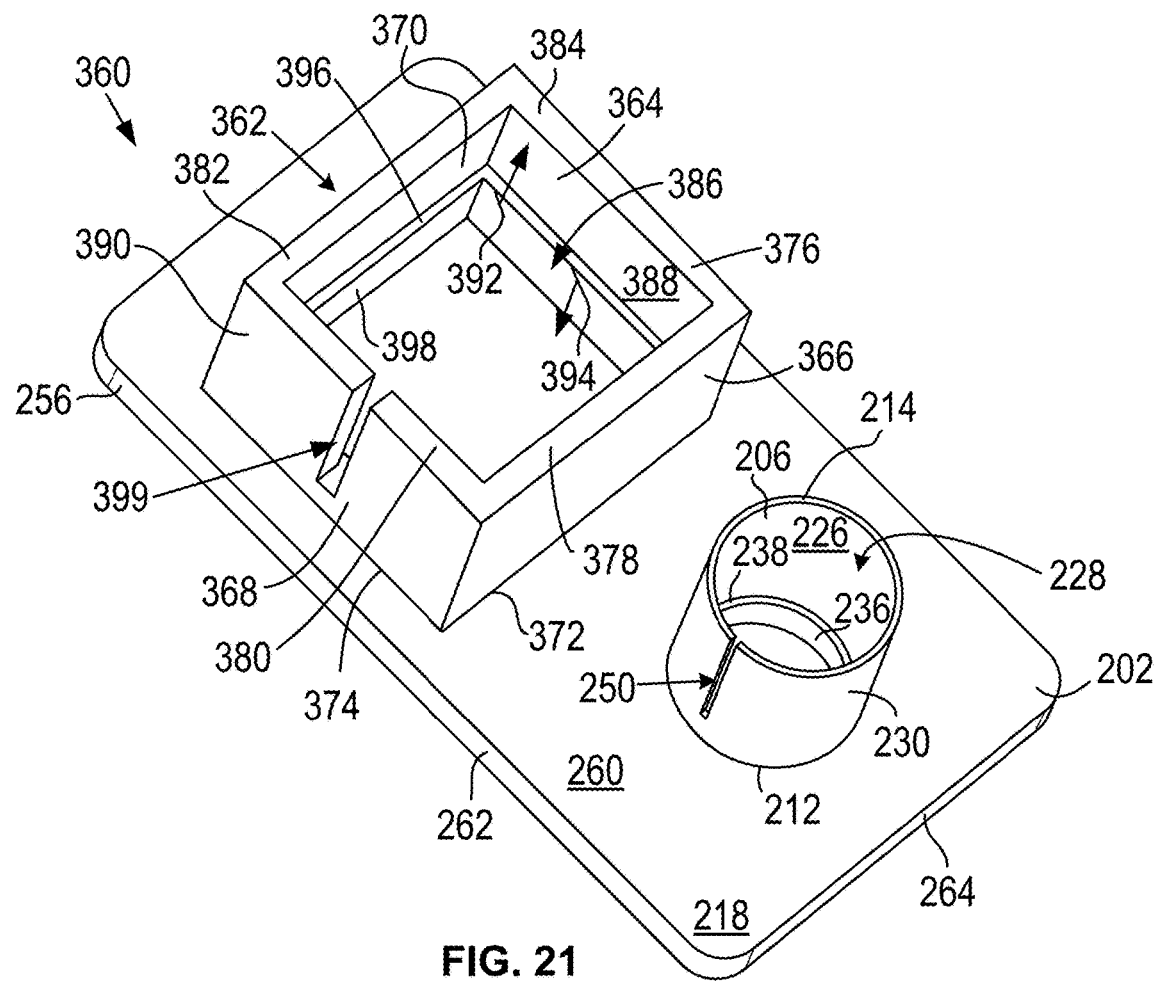
Figure 22:
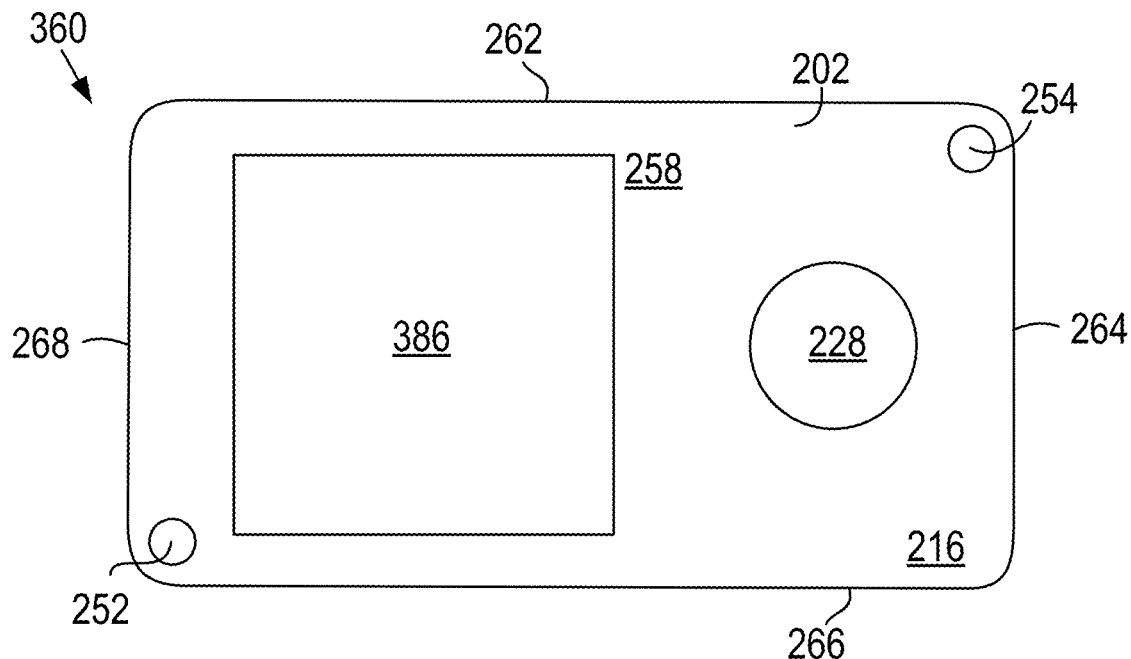
Figure 23:
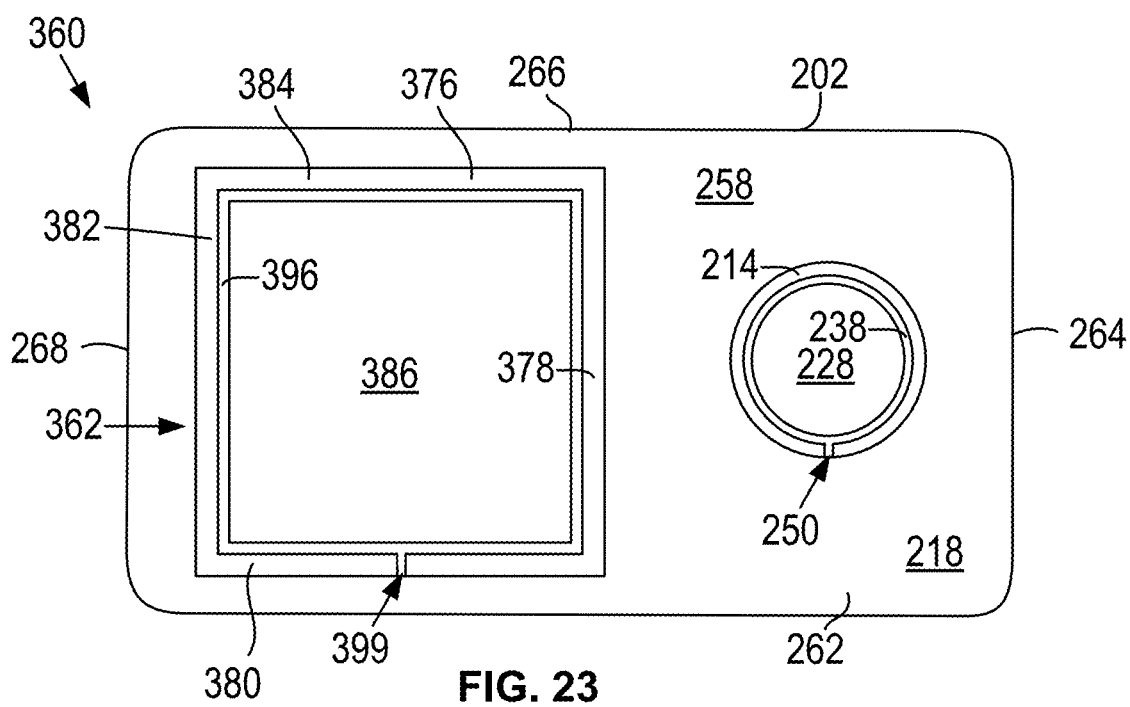
Figure 24:
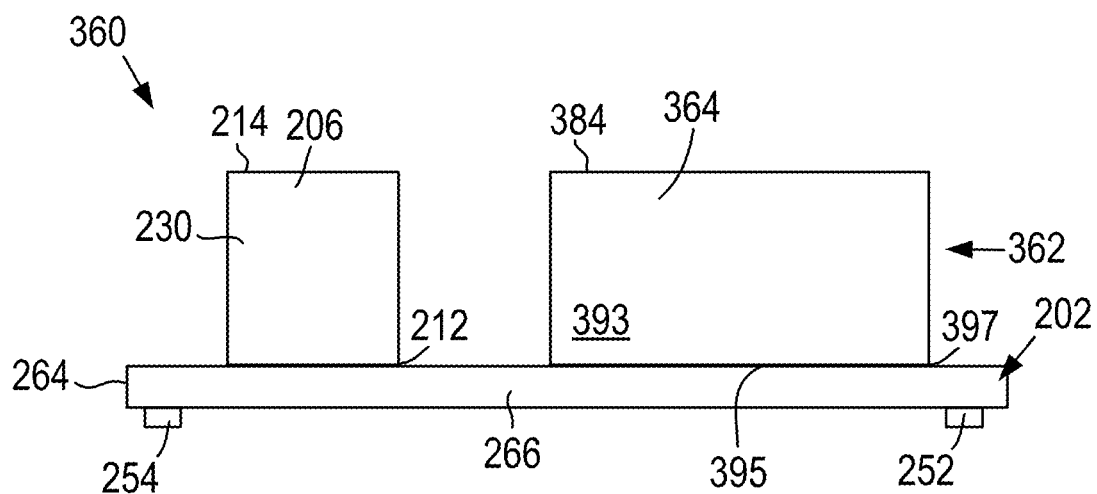

Next, FIG. 21, FIG. 22, FIG. 23, and FIG. 24 show multiple views of a component aligner 360 in accordance with an example implementation. In particular, FIG. 21 shows a perspective view, FIG. 22 shows a bottom view, FIG. 23 shows a top view, and FIG. 24 shows an elevation view. The component aligner 360 is another variation of the component aligner 200. In this variation, the component aligner 360 includes the first wall 362 and the second wall 206 instead of the first wall 204 and the second wall 206. The first wall 362 is rectangular and is made up of multiples walls including wall 364, 366, 368, 370. The first wall 362 and each wall 364, 366, 368, 370 include a first end adjacent the second side 218 of the base 202. FIG. 21 shows the first end 372 of the wall 366 and the first end 374 of the wall 368. FIG. 24 shows the first end 395 of the wall 364 and the first end 397 of the wall 370. The wall 364, 366, 368, 370 include a second end 376, 378, 380, 382, respectively. The second end 376, 378, 380, 382 make up a second end 384 of the first wall 362.

The first wall 362 as well as the wall 364, 366, 368, 370 that make up the first wall, as well as the second wall 206, extend from the second side 218 of the base 202. In this example implementation, the first wall 362 and the second wall 206 do not directly contact one another or having any common portion that is part of both the first wall 362 and the second wall 206.

A first bore 386 passes through the base 202 and is defined, in part, by the first wall 362. The first wall 362 includes an interior wall surface 388 and an exterior wall surface 390. The interior wall surface 388 defines a first portion 392 of the first bore 386. The first bore 386 is configured for fixed placement of a first component. The exterior wall surface 390 includes an exterior wall surface 393 (shown in FIG. 24) that is part of the wall 364.

The first portion 392 of the first bore 386 can be referred to as an upper portion of the first bore 386. The first bore 386 also includes a second portion 394 of the first bore 386. The first portion 392 of the first bore 386 extends from second end 384 of the first wall 362 to a top surface 396 of a ledge 232. The second portion 394 of the first bore 386 extends from the first side 216 of the base 202 to the top surface 396 of the ledge 398. A cross section of the first portion 392 of the first bore 386 is larger than a cross section of the second portion 394 of the first bore 386. A size of the cross section of the first portion 392 of the first bore 386 can permit a component to be disposed into the first bore 386, but the ledge 398 can prevent the component from passing entirely through the second portion 394 of the first bore 386. At least a portion of electrical leads of a component disposed in the first bore 386 can pass through the second portion 394 of the first bore 386 so that those leads can contact the substrate 120.

In some implementations, a distance from the top surface 396 of the ledge 398 to the first side 216 of the base 202 is equal to a distance from the top surface 238 of the ledge 236 to the first side 216 of the base 202. In other implementations, the distance from the top surface 396 of the ledge 398 to the first side 216 of the base 202 is greater than or less than a distance from the top surface 238 of the ledge 236 to the first side 216 of the base 202. In these latter implementations, the components to be installed into the first bore 386 and the second bore 228 may have different heights, but have sub-components such as a lens that are preferably disposed at a common distance above the first side 216 of the base 202. Accordingly, a shorter component can be installed within the bore having a top surface of a ledge further away from first side 216 of the base 202, and a longer component can be installed within the bore having a top surface of a ledge closer to the first side 216 of the base 202.

The first wall 362, in particular the wall 368, includes a slot 399. The slot 399 is open at the interior wall surface 388 of the wall 368, the second end 380 of the first wall 362, and at the exterior wall surface 390. As shown in FIG. 21, the slot 399 and the slot 250 are on a common side of the component aligner 360, namely, a side of the component aligner 200 including the side 262. In other implementations, a slot in the first wall 362 and a slot in the second wall 206 are on different sides of the component aligner 360.

Figure 25:
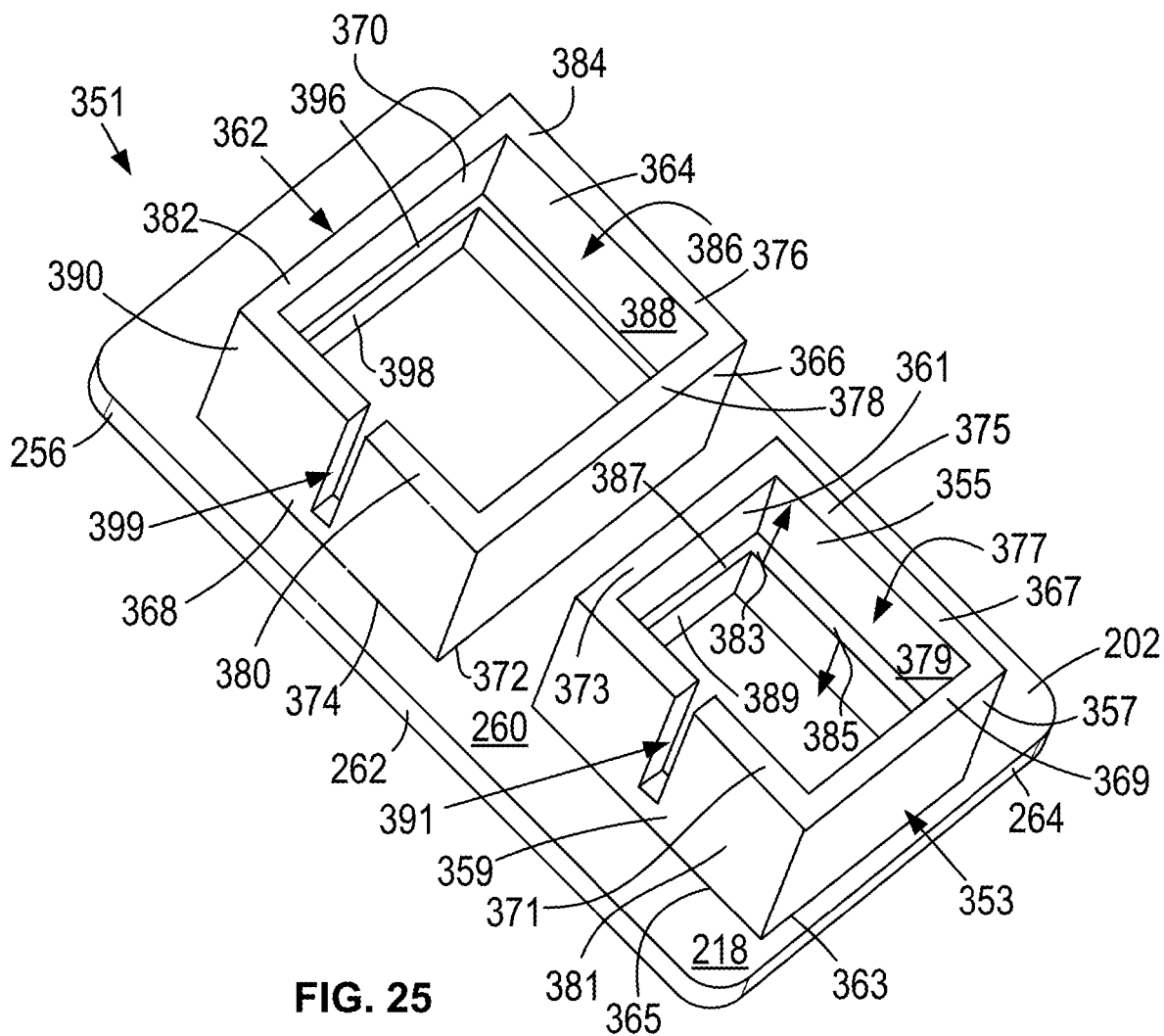
Figure 26:
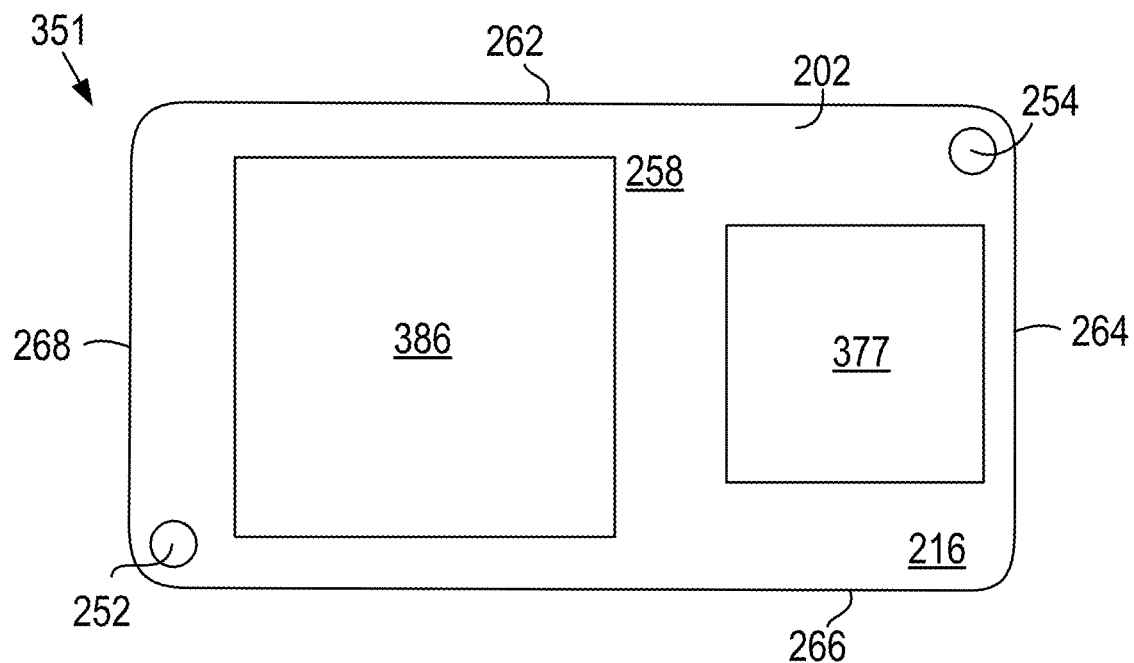
Figure 27:
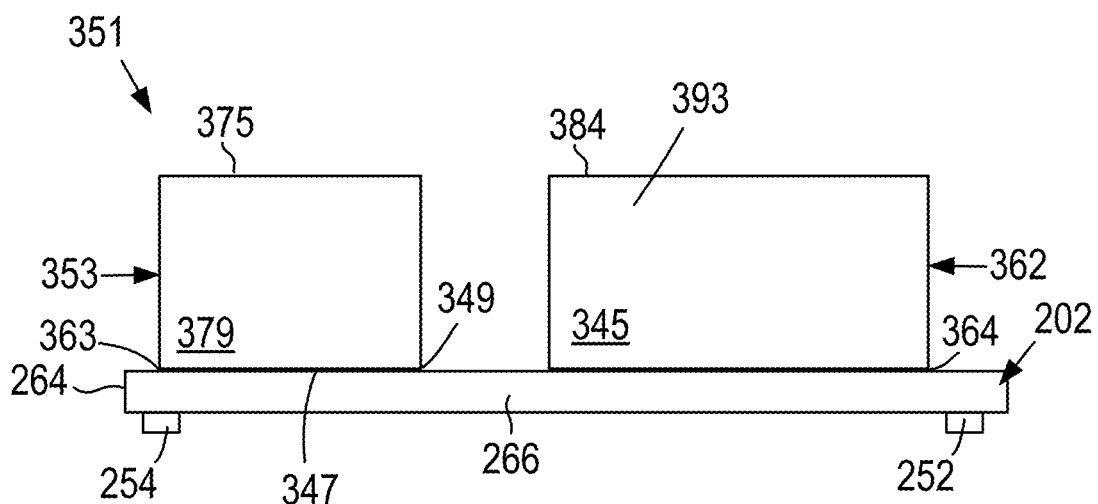
Figure 28:
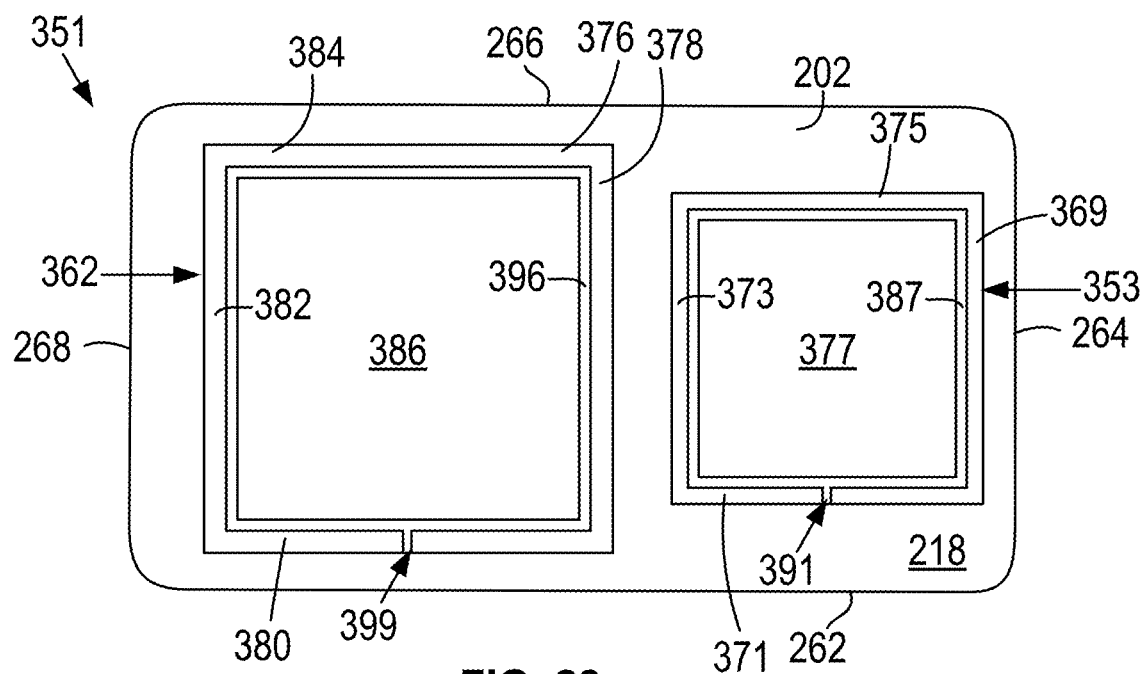

Next, FIG. 25, FIG. 26, FIG. 27, and FIG. 28 show multiple views of a component aligner 351 in accordance with an example implementation. In particular, FIG. 25 shows a perspective view, FIG. 26 shows a bottom view, FIG. 27 shows an elevation view, and FIG. 28 shows a top view. The component aligner 351 is a variation of the component aligner 360. In this variation, the component aligner 351 includes the first wall 362 and a second wall 353 instead of the first wall 362 and the second wall 206. The first wall 362 is rectangular. Similarly, the second wall 353 is also rectangular.

The first wall 362 is described above. The second wall 353 is rectangular and is made up of multiples walls including wall 355, 357, 359, 361. The second wall 353 and each wall 355, 357, 359, 361 include a first end adjacent the second side 218 of the base 202. FIG. 25 shows the first end 363 of the wall 355 and the first end 365 of the wall 359. FIG. 27 shows the first end 363 of the wall 357, the first end 347 of the wall 355, and the first end 349 of the wall 361. The wall 355, 357, 359, 361 include a second end 367, 369, 371, 373, respectively. The second end 367, 369, 371, 373 make up a second end 375 of the second wall 353.

The second wall 353, as well as the wall 355, 357, 359, 361 that make up the second wall 353, and the first wall 362, extend from the second side 218 of the base 202. In this example implementation, the first wall 362 and the second wall 353 do not directly contact one another or having any common portion that is part of both the first wall 362 and the second wall 353.

A second bore 377 passes through the base 202 and is defined, in part, by the second wall 353. The second wall 353 includes an interior wall surface 379 and an exterior wall surface 381. The interior wall surface 379 defines a first portion 383 of the second bore 377. The second bore 377 is configured for fixed placement of a second component. The exterior wall surface 381 includes an exterior wall surface 345 (shown in FIG. 27) that is part of the wall 355.

The first portion 383 of the second bore 377 can be referred to as an upper portion of the second bore 377. The second bore 377 also includes a second portion 385 of the second bore 377. The first portion 383 of the second bore 377 extends from second end 375 of the second wall 353 to a top surface 387 of a ledge 389. The second portion 385 of the second bore 377 extends from the first side 216 of the base 202 to the top surface 387 of the ledge 389. A cross section of the first portion 383 of the second bore 377 is larger than a cross section of the second portion 385 of the second bore 377. A size of the cross section of the first portion 383 of the second bore 377 can permit a component to be disposed into the second bore 377, but the ledge 389 can prevent the component from passing entirely through the second portion 385 of the second bore 377. At least a portion of electrical leads of a component disposed in the second bore 377 can pass through the second portion 385 of the second bore 377 so that those leads can contact the substrate 120.

In some implementations, a distance from the top surface 396 of the ledge 398 to the first side 216 of the base 202 is equal to a distance from the top surface 387 of the ledge 389 to the first side 216 of the base 202. In other implementations, the distance from the top surface 396 of the ledge 398 to the first side 216 of the base 202 is greater than or less than a distance from the top surface 387 of the ledge 389 to the first side 216 of the base 202. In these latter implementations, the components to be installed into the first bore 386 and the second bore 377 may have different heights, but have sub-components such as a lens that are preferably disposed at a common distance above the first side 216 of the base 202. Accordingly, a shorter component can be installed within the bore having a top surface of a ledge further away from first side 216 of the base 202, and a longer component can be installed within the bore having a top surface of a ledge closer to the first side 216 of the base 202.

The second wall 353, in particular the wall 359, includes a slot 391. The slot 391 is open at the interior wall surface 379 of the wall 359, the second end 371 of the wall 359, and at the exterior wall surface 381 of the wall 359. As shown in FIG. 25, the slot 399 and the slot 391 are on a common side of the component aligner 351, namely, a side of the component aligner 351 including the side 262. In other implementations, a slot in the first wall 362 and a slot in the second wall 353 are on different sides of the component aligner 351.

Figure 29:
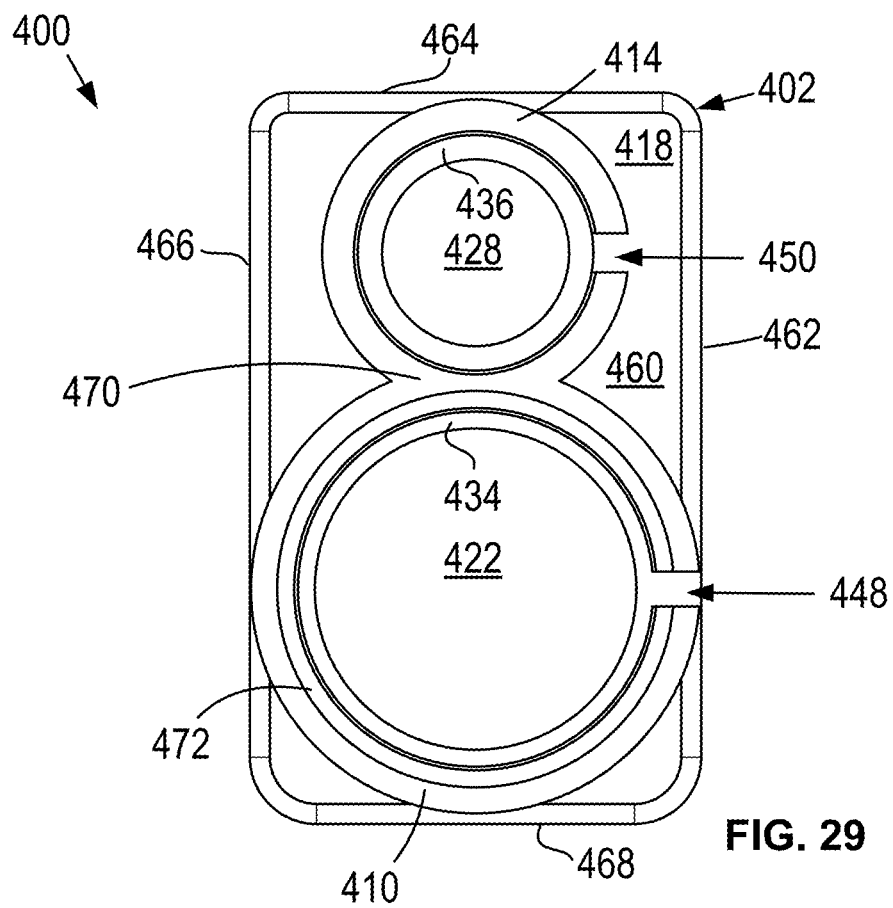
Figure 30:
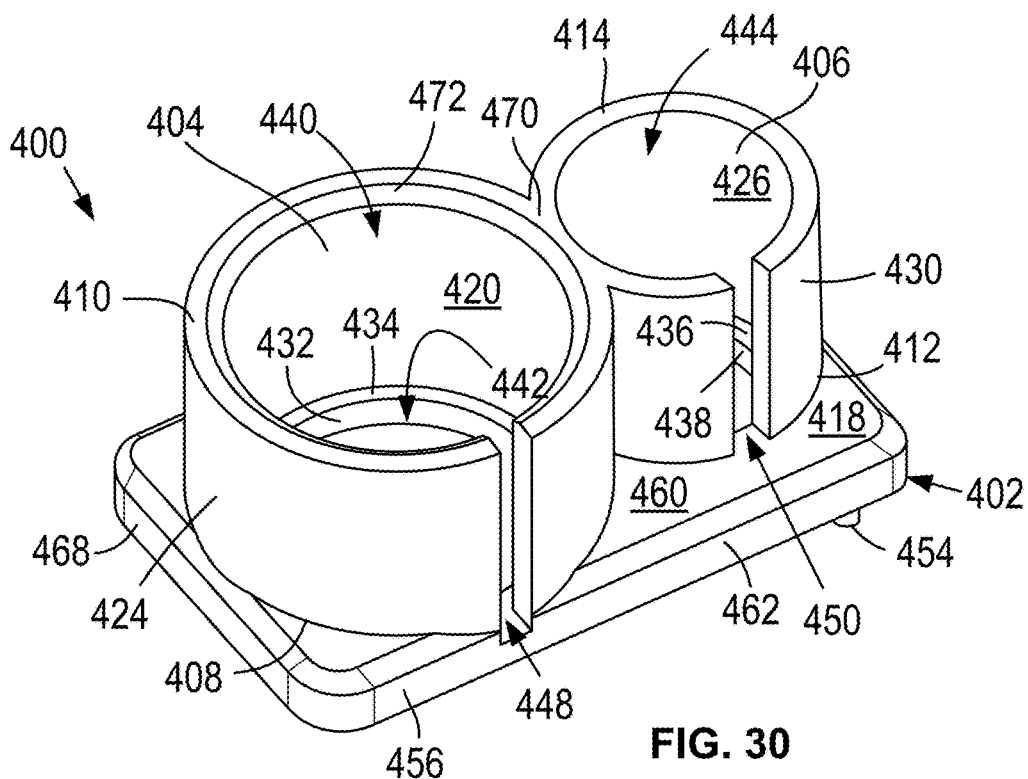
Figure 31:
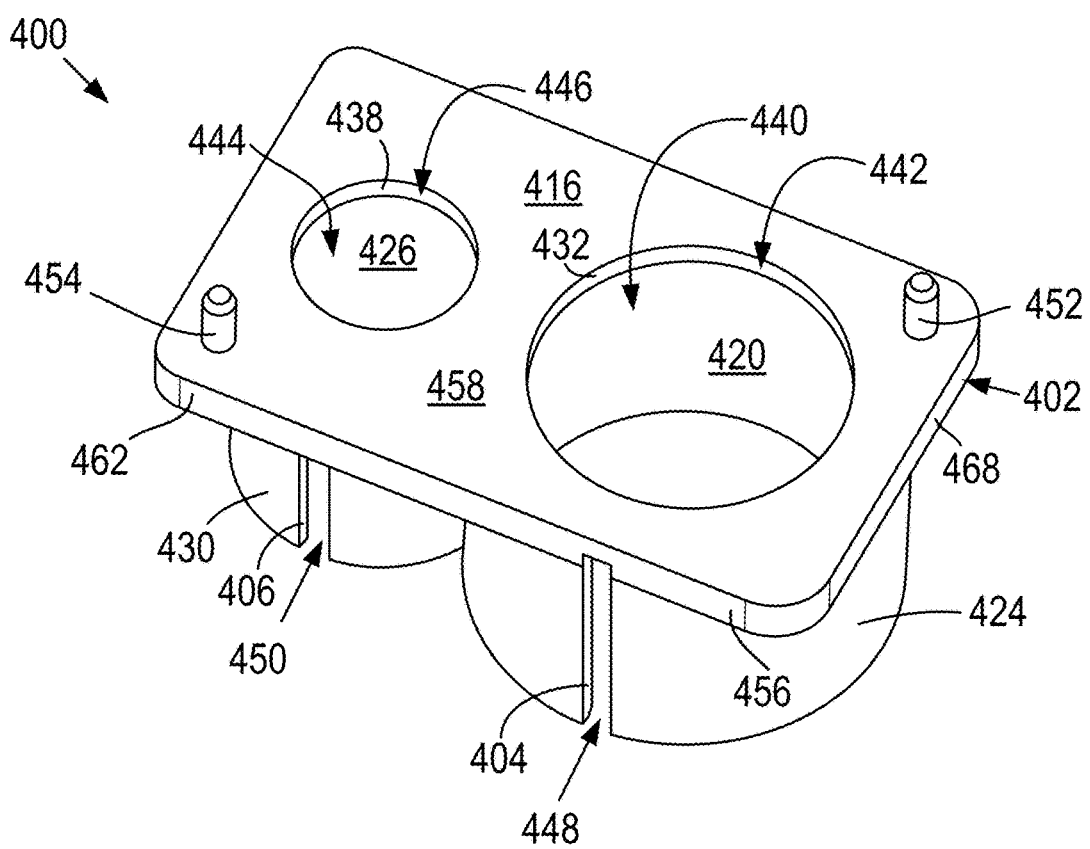
Figure 32:
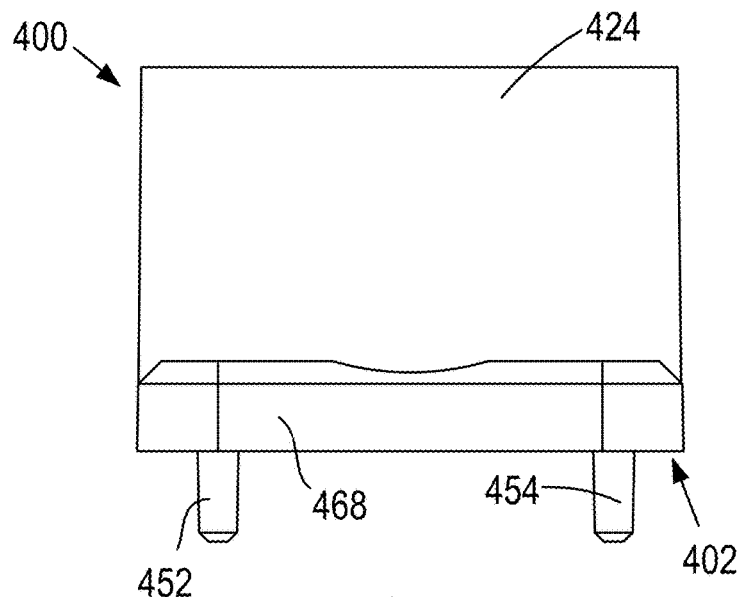
Figure 33:
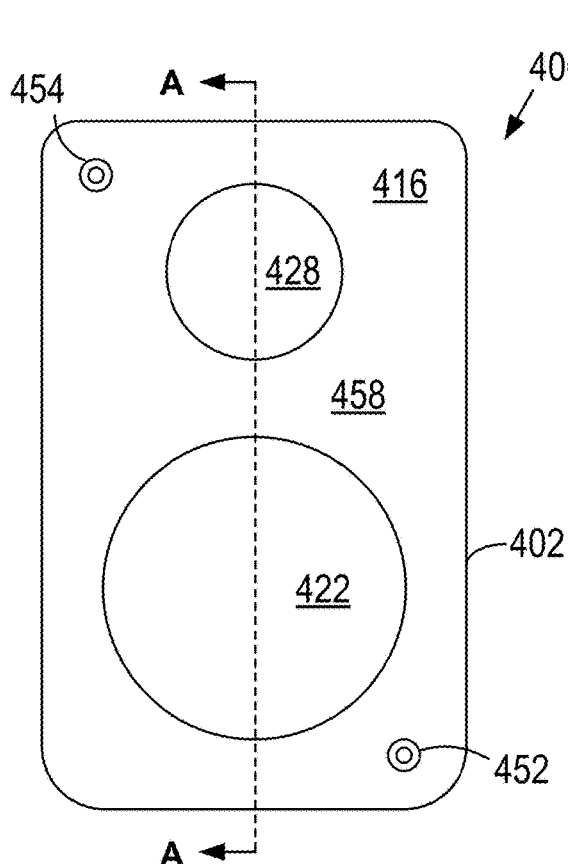
Figure 34:
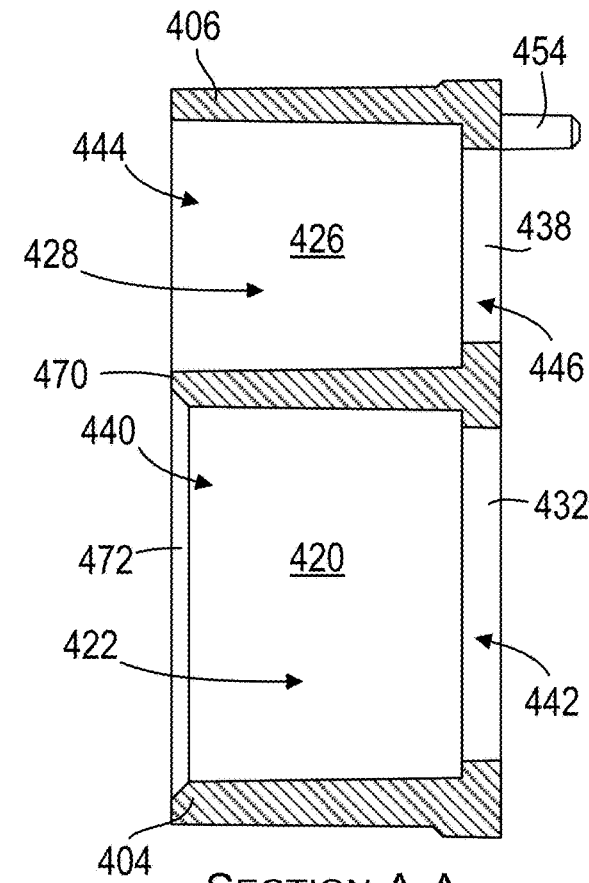

Next, FIG. 29, FIG. 30, FIG. 31, FIG. 32, FIG. 33, and FIG. 34 show multiple views of a component aligner 400 in accordance with an example implementation. In particular, FIG. 29 shows a top view, FIG. 30 and FIG. 31 are perspective views, FIG. 32 is a side view, FIG. 33 is a bottom view, and FIG. 34 is a section view. The component aligner 400 is another variation of the component aligner 200, but is described with reference numbers starting with four instead of two.

The component aligner 400 includes a base 402, a first wall 404, and a second wall 406. The first wall 404 includes a first end 408 and a second end 410. The second wall 406 includes a first end 412 and a second end 414. The base 402 includes a first side 416 and a second side 418. The first wall 404 and the second wall 406 extend from the second side 418 of the base 402. The first end 408 of the first wall 404 is adjacent to the second side 418 of the base 402 and opposite the second end 410 of the first wall 404. The first end 412 of the second wall 406 is adjacent to the second side 418 of the base 402 and opposite the second end 414 of the second wall 406. The first side 416 of the base 402 includes a surface 458 of the base 402. The second side 418 of the base 402 includes a surface 460 of the base 402. The first side 416 is opposite the second side 418. In this example implementation, the first wall 404 and the second wall 406 do directly contact one another and/or include a common portion 470 that is part of both the first wall 404 and the second wall 406.

A first bore 422 passes through the base 402 and is defined, in part, by the first wall 404. The first wall 404 includes an interior wall surface 420 and an exterior wall surface 424. The interior wall surface 420 defines a first portion 440 of the first bore 422. The first bore 422 is configured for fixed placement of a first component. A second bore 428 passes through the base 402 and is defined, in part, by the second wall 406. The second wall 406 includes an interior wall surface 426 and an exterior wall surface 430. The interior wall surface 426 defines a first portion 444 of the second bore 428. The second bore 428 is configured for fixed placement of a second component.

The first portion 440 of the first bore 422 can be referred to as an upper portion of the first bore 422. The first bore 422 also includes a second portion 442 of the first bore 422. The first portion 440 of the first bore 422 extends from second end 410 of the first wall 404 to a top surface 434 of a ledge 432. The second portion 442 of the first bore 422 extends from the first side 416 of the base 402 to the top surface 434 of the ledge 432. As shown in FIG. 32, a cross section of the first portion 440 of the first bore 422 is larger than a cross section of the second portion 442 of the first bore 422. A size of the cross section of the first portion 440 of the first bore 422 can permit a component to be disposed into the first bore 422, but the ledge 432 can prevent the component from passing entirely through the second portion 442 of the first bore 422. At least a portion of electrical leads of a component disposed in the first bore 422 can pass through the second portion 442 of the first bore 422 so that those leads can contact the substrate 120.

The first portion 444 of the second bore 428 can be referred to as an upper portion of the second bore 428. The second bore 428 also includes a second portion 446 of the second bore 428. The first portion 444 of the second bore 428 extends from second end 414 of the second wall 406 to a top surface 438 of a ledge 436. The second portion 446 of the second bore 428 extends from the first side 416 of the base 402 to the top surface 438 of the ledge 436. As shown in FIG. 32, a cross section of the first portion 444 of the second bore 428 is larger than a cross section of the second portion 446 of the second bore 428. A size of the cross section of the first portion 444 of the second bore 428 can permit a component to be disposed into the second bore 428, but the ledge 436 can prevent the component from passing entirely through the second portion 446 of the second bore 428. At least a portion of electrical leads of a component disposed in the second bore 428 can pass through the first portion 444 of the second bore 428 so that those leads can contact the substrate 120.

In some implementations, a distance from the top surface 434 of the ledge 432 to the first side 416 of the base 402 is equal to a distance from the top surface 438 of the ledge 436 to the first side 416 of the base 402. In other implementations, the distance from the top surface 434 of the ledge 432 to the first side 416 of the base 402 is greater than or less than a distance from the top surface 438 of the ledge 436 to the first side 416 of the base 402. In these latter implementations, the components to be installed into the first bore 422 and the second bore 428 may have different heights, but have sub-components such as a lens that are preferably disposed at a common distance above the first side 416 of the base 402. Accordingly, a shorter component can be installed within the bore having a top surface of a ledge further away from first side 416 of the base 402, and a longer component can be installed within the bore having a top surface of a ledge closer to the first side 416 of the base 402.

The component aligner 400 includes a protrusion 452 and a protrusion 454, both extending from the first side 416 of the base 402 and/or the surface 458 of the base 402. The protrusions 452, 454 are configured for placement within holes within a substrate, such as the holes 150, 152 within the substrate 120. The protrusions 452, 454 can keep the component aligner 400 from sliding across the substrate 120 once the protrusions 452, 454 are disposed within the holes 150, 152. In some implementations, the protrusions 452, 454 are arranged non-symmetrically on the first side 416 and/or the surface 458 of the base 402 so that the protrusions 452, 454 cannot be improperly installed into the holes 150, 152 and to improve the likelihood that the component aligner 400 is properly attached to the substrate 120. In some implementations, the component aligner 400 includes a different quantity of protrusions on the first side 416 and/or surface 458 of the base 402. In yet other implementations, no protrusions extend from the first side 416 and/or surface 458.

In some implementations, the first side 416 of the base 402, other than protrusions 452, 454 extending from the first side 416 of the base 402 is flat. In some implementations, a portion of the base 402 is tapered from the first side 416 of the base 402 to the ledge 432 and/or a portion of the base 402 is tapered from the first side 416 of the base 402 to the ledge 436. Those tapered portions of the base can ease removal of the component aligner 400 from a mold in which the component aligner 400 is formed.

The base 402 includes a wall 456 extending from the first side 416 of the base 402 to the second side 418 of the base 402. The wall 456 includes sides 462, 464, 466, 468.

The first wall 404 includes a slot 448. The slot 448 is open at the interior wall surface 420, the second end 410 of the first wall 404, and at the exterior wall surface 424. Similarly, the second wall 406 includes a slot 450. The slot 450 is open at the interior wall surface 426, the second end 414 of the second wall 406, and at the exterior wall surface 430. As shown in FIG. 29, the slot 448 and the slot 450 are on a common side of the component aligner 400, namely, a side of the component aligner 400 including the side 462. In other implementations, a slot in the first wall 404 and a slot in the second wall 406 are on different sides of the component aligner 400 and/or extend only part way into the first wall 404 and the second wall 406.

An interior surface of a wall of a component aligner can be tapered. As an example, the interior surface of the first wall 404 could taper from the second end 410 of the first wall 404 to the top surface 434 of the ledge 432. As another example, and as shown in FIG. 29, FIG. 30, and FIG. 34, a tapered portion 472 of the first wall 404 can taper downward from the second end 410 of the first wall 404. The tapered portion 472 can ease installation of a component into the first bore 422.

Next, in accordance with a second example implementation, the component aligner 122 includes a base, a top opposite the base, a body, and a first slot within the body.

The body includes one or more exterior wall surfaces extending from the base to the top, a first bore configured for fixed placement of a first component, and a second bore configured for fixed placement of a second component. The first bore extends between and through both the top and the base. The first bore is defined at least in part by a first interior wall surface of the body. The second bore extends between and through both the top and the base. The second bore is defined at least in part by a second interior wall surface of the body. The first slot is open at the first interior wall surface and at the top.

In at least some of the second example implementations of the component aligner 122, the base includes a first side of the base and a second side of the base opposite the first side of the base, and the second side of the base, rather than the first side of the base, is closer to the top.

In at least some the aforementioned implementations, the body includes a first wall and a second wall. The first wall includes: a first exterior wall surface of the one or more exterior wall surfaces, a first end of the first wall, and a second end of the first wall opposite the first end of the first wall. The first wall extends from the second side of the base to the second end of the first wall. Moreover, the second wall includes: a second exterior wall surface of the one or more exterior wall surfaces, a first end of the second wall, and a second end of the second wall opposite the first end of the second wall. The second wall extends from the second side of the base to the second end of the second wall. Furthermore, in at least some of these implementations, (1) a portion of the first wall is a portion of the second wall, or (2) a portion of the first wall surrounds an entire cross section of the first bore, a portion of the second wall surrounds an entire cross section of the second bore, and the first wall does not contact the second wall, or (3) at least a portion of the first wall is cylindrical, rectangular, elliptical, oval, or stadium-shaped, and/or at least a portion of the second wall is cylindrical, rectangular, elliptical, oval, or stadium-shaped.

In at least some of the second example implementations of the component aligner 122, the base includes one or more exterior wall surfaces extending from the first side of the base to the second side of the base, and the one or more exterior wall surfaces extending from the base to the top includes one or more exterior wall surfaces extending from the second side of the base to the top. Moreover, in at least some of those implementations, a first portion of the second side of the base provides a first ledge within the first bore, and/or a second portion of the second side of the base provides a second ledge within the second bore. In at least some of these implementations, the first ledge, rather than the second ledge, is closer to the top.

In at least some of the second example implementations of the component aligner 122, the first bore includes a first portion of the first bore and a second portion of the first bore, the second bore includes a first portion of the second bore and a second portion of the second bore. Moreover, the first portion of the first bore extends from top to the second side of the base, and the second portion of the first bore extends from the first side of the base to the second side of the base. Additionally, the first portion of the second bore extends from top to the second side of the base, and the second portion of the second bore extends from the first side of the base to the second side of the base. Furthermore, a cross-section of the first portion of the first bore is larger than a cross-section of the second portion of the first bore, and a cross-section of the first portion of the second bore is larger than a cross-section of the second portion of the second bore.

In at least some of the example second implementations of the component aligner 122, a cross-section of at least a portion of the body is rectangular, elliptical, oval, or stadium-shaped.

In at least some of the example second implementations of the component aligner 122, at least a portion of the first bore is tapered, and/or at least a portion of the second bore is tapered.

In at least some of the second example implementations of the component aligner 122, the component aligner includes a second slot within the body. The second slot is open at the second interior wall surface and at the top. In at least some of the aforementioned implementations, the second slot is further open at an exterior wall surface of the one or more exterior wall surfaces. Additionally or alternatively, in at least some of those aforementioned implementations, the body includes a least a first side in the body and a second side in the body that is different than the first side of the body, and the first slot is in the first side of the body and the second slot is in the second side of the body.

In at least some of the example second implementations of the component aligner 122, the first slot is further open at an exterior wall surface of the one or more exterior wall surfaces.

In at least some of the example second implementations of the component aligner 122, the base includes a first side of the base and a second side of the base opposite the first side of the base, and the second side of the base, rather than the first side of the base, is closer to the top. Moreover, an apparatus including this component aligner also includes a substrate and one or more protrusions extending from a surface of the first side of the base into a respective hole within the substrate.

In at least some of the example second implementations of the component aligner 122, the first interior wall surface includes an upper end of the first interior wall surface, the second interior wall surface includes an upper end of the second interior wall surface, and at least a portion of the body is tapered from the top to the upper end of the first interior wall surface or from the top to the upper end of the second interior wall surface.

Figures 35, 36:
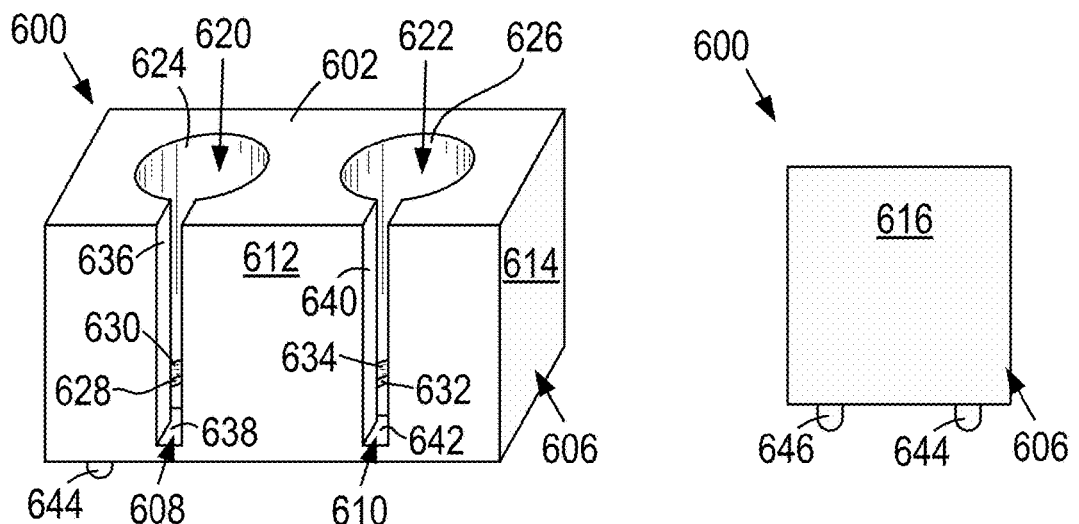
Figures 37, 38:
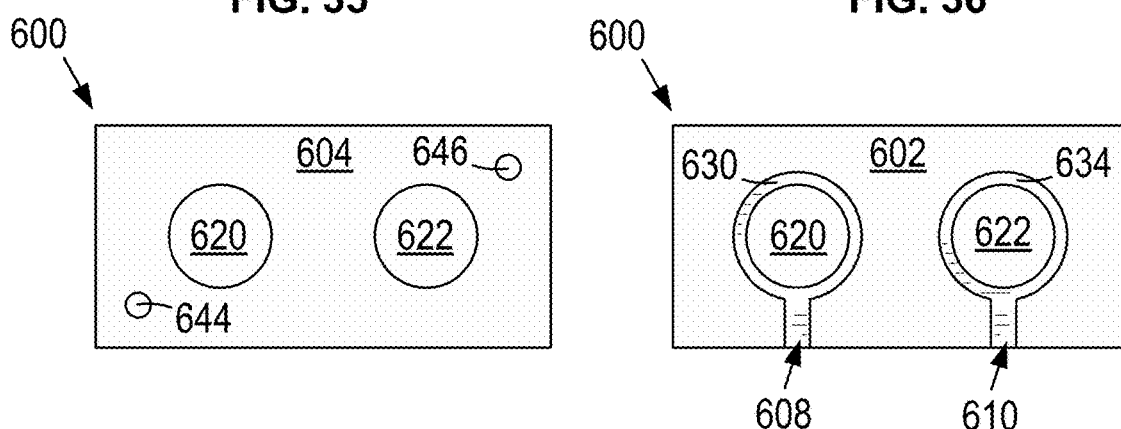
Figures 39, 40:
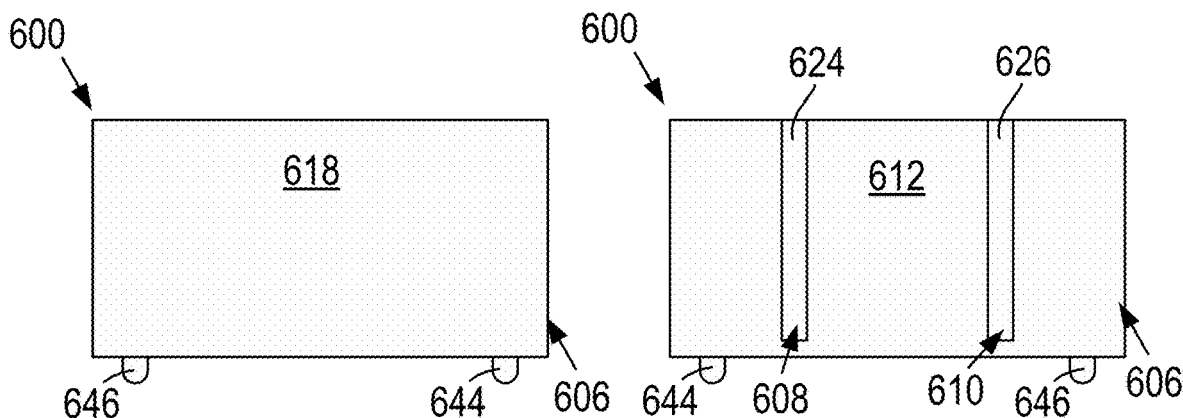

Next, FIG. 35, FIG. 36, FIG. 37, FIG. 38, FIG. 39 and FIG. 40 show multiple views of a component aligner 600 in accordance with the second example implementations of the component aligner 122. In particular, FIG. 35 shows a perspective view, FIG. 36 shows an elevation view, FIG. 37 shows a bottom view, FIG. 38 shows a top view, and FIG. 39 and FIG. 40 show elevation views.

As shown in one or more of the aforementioned multiple views, the component aligner 600 includes a top 602, a base 604, a body 606, a slot 608, and a slot 610. The top 602 is opposite the base 604. The body 606 includes exterior wall surface 612, 614, 616, 618. The exterior wall surface 612 extends vertically from the base 604 to the top 602 except at the slots 608, 610, and horizontally from the exterior wall surface 616 to the exterior wall surface 614 except at the slots 608, 610. The exterior wall surface 614 extends vertically from the base 604 to the top 602, and horizontally from the exterior wall surface 612 to the exterior wall surface 618. The exterior wall surface 616 extends vertically from the base 604 to the top 602, and horizontally from the exterior wall surface 612 to the exterior wall surface 618. The exterior wall surface 618 extends vertically from the base 604 to the top 602, and horizontally from the exterior wall surface 614 to the exterior wall surface 616.

The body 606 includes a bore 620 configured for fixed placement of a first component. The bore 620 extends between and through the top 602 and the base 604. The bore 620 is defined at least in part by an interior wall surface 624 of the body 606. Similarly, the body 606 also includes a bore 622 configured for fixed placement of a second component. The bore 622 extends between and through the top 602 and the base 604. The bore 622 is defined at least in part by an interior wall surface 626 of the body 606. Fixedly placing a first component within the bore 620 and a second component within the bore 622 provides for alignment of those components.

The bore 620 can be configured with a ledge 628. The ledge 628 includes a top surface 630. The bore 622 can be configured with a ledge 632. The ledge 632 includes a top surface 634. In some implementations, a distance from the top surface 630 of the ledge 628 to the base 604 is equal to a distance from the top surface 634 of the ledge 632 to the base 604. In other implementations, the distance from the top surface 630 of the ledge 628 to the base 604 is greater than or less than a distance from the top surface 634 of the ledge 632 to the base 604. In these latter implementations, the components to be installed into the bore 620 and the bore 622 may have different heights, but have sub-components such as a lens that are preferably disposed at a common distance above the base 604. Accordingly, a shorter component can be installed within the bore having a top surface of a ledge further away from the base 604, and a longer component can be installed within the bore having a top surface of a ledge closer to the base 604.

In the implementation shown in FIG. 35, the slot 608 is open at the interior wall surface 624, at the top 602, and at the exterior wall surface 612. The body 606 includes a slot wall 636, a slot floor 638, and another slot wall across the slot 608 opposite the slot wall 636. The slot 608 is defined at least in part by the slot wall 636, the opposing slot wall in the body 606, and the slot floor 638. Similarly, the slot 610 is open at the interior wall surface 626, at the top 602, and at the exterior wall surface 612. The body 606 includes a slot wall 640, a slot floor 642, and another slot wall across the slot 610 opposite the slot wall 640. The slot 610 is defined at least in part by the slot wall 640, the opposing slot wall in the body 606, and the slot floor 642. In another implementation, the slot 608 and/or the slot 610 extend only partially through the body 606 such that the slot 608 and/or the slot 610 is not open at the exterior wall surface 612.

The component aligner 600 includes a protrusion 644 and a protrusion 646, both extending from the base 604. The protrusions 644, 646 are configured for placement within holes within a substrate, such as the holes 150, 152 within the substrate 120. The protrusions 644, 646 can keep the component aligner 600 from sliding across the substrate 120 once the protrusions 644, 646 are disposed within the holes 150, 152. In some implementations, the protrusions 644, 646 are arranged non-symmetrically on the base 604 so that the protrusions 644, 646 cannot be improperly installed into the holes 150, 152 and to improve the likelihood that the component aligner 600 is properly attached to the substrate 120. In some implementations, the component aligner 600 includes a different quantity of protrusions on the base 604. In yet other implementations, no protrusions extend from the base 604. In some implementations, the base 604, other than protrusions 644, 646 extending from the base 604 is flat.

Figure 41:
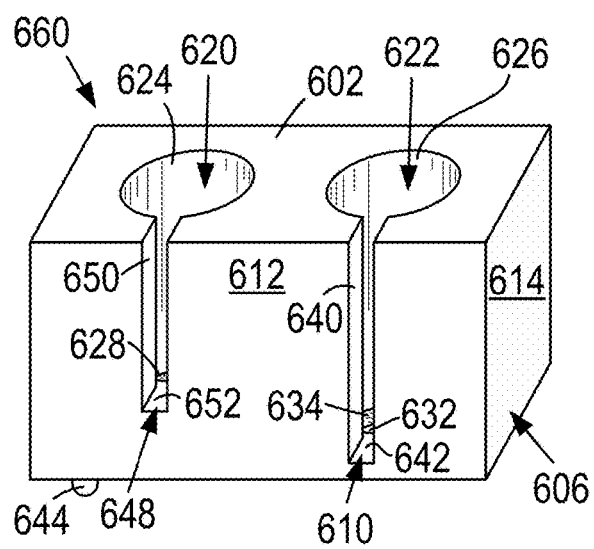
Figure 42:
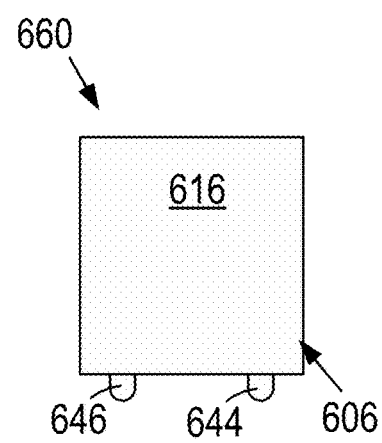
Figure 43:
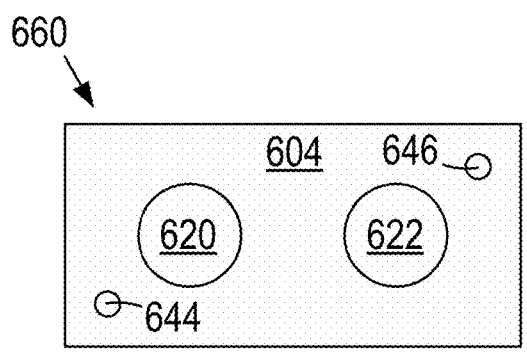
Figure 44:
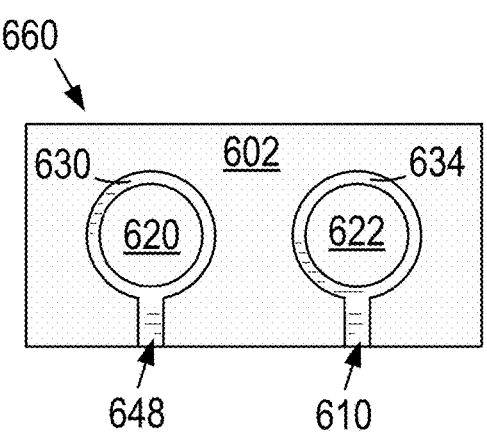
Figure 45:
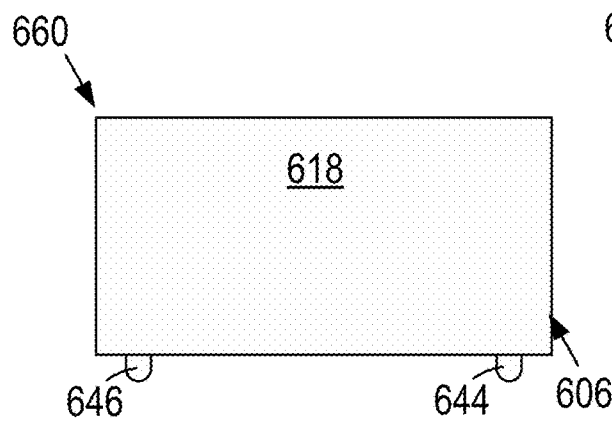
Figure 46:
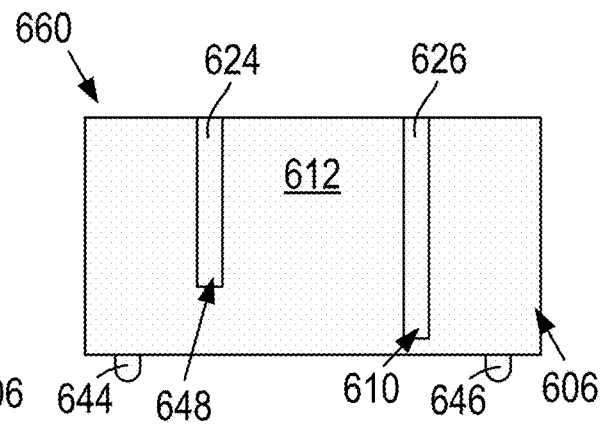

Next, FIG. 41, FIG. 42, FIG. 43, FIG. 44, FIG. 45, and FIG. 46 show multiple views of a component aligner 660 in accordance with an example implementation. In particular, FIG. 41 shows a perspective view, FIG. 42 shows an elevation view, FIG. 43 shows a bottom view, FIG. 44 shows a top view, and FIG. 45 and FIG. 46 show elevation views.

The component aligner 660 is a variation of the component aligner 600. In this variation, the body 606 includes different length slots. As shown in FIG. 41, the body 606 includes a slot 648 that is shorter than the slot 610, a slot wall 650, another slot wall across the slot 648 opposite the slot wall 650, and a slot floor 652. A distance of the slot floor 652 from the base 604 is longer than a distance of the slot floor 642 from the base 604. In an alternative implementation, the slot 610 is shorter than the slot 648. In yet an alternative implementation, the slot 648 and/or the slot 610 is open at the exterior wall surface 614, the exterior wall surface 616, or the exterior wall surface 618 instead of being open at the exterior wall surface 612.

Next, FIG. 47, FIG. 48, FIG. 49, FIG. 50, FIG. 51, and FIG. 52 show multiple views of a component aligner 800 in accordance with the second example implementations of the component aligner 122. In particular, FIG. 47 shows a perspective view, FIG. 48 shows an elevation view, FIG. 49 shows a bottom view, FIG. 50 shows a top view, and FIG. 51 and FIG. 52 show elevation views. The component aligner 800 is a variation of the component aligner 600 and a variation of the component aligner 660, but is described with reference numbers starting with eight instead of six.

As shown in one or more of the aforementioned multiple views, the component aligner 800 includes a top 802, a base 804, a body 806, a slot 848, and a slot 810. The top 802 is opposite the base 804. The body 806 includes exterior wall surface 812, 814, 816, 818 and has a stadium shape. The exterior wall surface 812 extends vertically from the base 804 to the top 802 except at the slots 848, 810, and horizontally from the exterior wall surface 816 to the exterior wall surface 814 except at the slots 848, 810. The exterior wall surface 814 extends vertically from the base 804 to the top 802, and horizontally from the exterior wall surface 812 to the exterior wall surface 818. The exterior wall surface 816 extends vertically from the base 804 to the top 802, and horizontally from the exterior wall surface 812 to the exterior wall surface 818. The exterior wall surface 818 extends vertically from the base 804 to the top 802, and horizontally from the exterior wall surface 814 to the exterior wall surface 816.

Unlike the component aligner 600, 660 as shown in the drawings, in this variation the exterior wall surface 814, 816 are round instead of straight. The material disposed with a mold for a component aligner with a rounded wall can flow more easily within the mold as compared to a mold for a component aligner with straight walls. Additionally or alternatively, less material may need to be added to a mold to make a component aligner with a round wall as compared to a component aligner with straight walls. Unlike the component aligner 600 shown in FIG. 35, but rather like the component aligner 660 shown in FIG. 41, the slots 810, 848 have different lengths. In an alternative arrangement, the slots 810, 848 can have a common length.

The body 806 includes a bore 820 configured for fixed placement of a first component. The bore 820 extends between and through the top 802 and the base 804. The bore 820 is defined at least in part by an interior wall surface 824 of the body 806. Similarly, the body 806 also includes a bore 822 configured for fixed placement of a second component. The bore 822 extends between and through the top 802 and the base 804. The bore 822 is defined at least in part by an interior wall surface 826 of the body 806. Fixedly placing a first component within the bore 820 and a second component within the bore 822 provides for alignment of those components.

The bore 820 can be configured with a ledge 828. The ledge 828 includes a top surface 830. The bore 822 can be configured with a ledge 832. The ledge 832 includes a top surface 834. In some implementations, a distance from the top surface 830 of the ledge 828 to the base 804 is equal to a distance from the top surface 834 of the ledge 832 to the base 804. In other implementations, the distance from the top surface 830 of the ledge 828 to the base 804 is greater than or less than a distance from the top surface 834 of the ledge 832 to the base 804. In these latter implementations, the components to be installed into the bore 820 and the bore 822 may have different heights, but have sub-components such as a lens that are preferably disposed at a common distance above the base 804. Accordingly, a shorter component can be installed within the bore having a top surface of a ledge further away from the base 804, and a longer component can be installed within the bore having a top surface of a ledge closer to the base 804.

In the implementation shown in FIG. 47, the slot 848 is open at the interior wall surface 824, at the top 802, and at the exterior wall surface 812. The body 806 includes a slot wall 850, a slot floor 852, and another slot wall across the slot 848 opposite the slot wall 850. The slot 848 is defined at least in part by the slot wall 850, the opposing slot wall in the body 806, and the slot floor 852. Similarly, the slot 810 is open at the interior wall surface 826, at the top 802, and at the exterior wall surface 812. The body 806 includes a slot wall 840, a slot floor 842, and another slot wall across the slot 810 opposite the slot wall 840. The slot 810 is defined at least in part by the slot wall 840, the opposing slot wall in the body 806, and the slot floor 842. In another implementation, the slot 848 and/or the slot 810 extend only partially through the body 806 such that the slot 848 and/or the slot 810 is not open at the exterior wall surface 812.

The component aligner 800 includes a protrusion 844 and a protrusion 846, both extending from the base 804. The protrusions 844, 846 are configured for placement within holes within a substrate, such as the holes 150, 152 within the substrate 120. The protrusions 844, 846 can keep the component aligner 800 from sliding across the substrate 120 once the protrusions 844, 846 are disposed within the holes 150, 152. In some implementations, the protrusions 844, 846 are arranged non-symmetrically on the base 804 so that the protrusions 844, 846 cannot be improperly installed into the holes 150, 152 and to improve the likelihood that the component aligner 800 is properly attached to the substrate 120. In some implementations, the component aligner 800 includes a different quantity of protrusions on the base 804. In yet other implementations, no protrusions extend from the base 804. In some implementations, the base 804, other than protrusions 844, 846 extending from the base 804 is flat.

Next, FIG. 53, FIG. 54, FIG. 55, FIG. 56, FIG. 57, and FIG. 58 show multiple views of a component aligner 860 in accordance with the second example implementations of the component aligner 122. In particular, FIG. 53 shows a perspective view, FIG. 54 shows an elevation view, FIG. 55 shows a bottom view, FIG. 56 shows a top view, and FIG. 57 and FIG. 58 show elevation views. The component aligner 860 is a variation of the component aligner 600.

As shown in one or more of the aforementioned multiple views, the component aligner 860 includes a top 862, a base 864, a body 870, a slot 872, and a slot 874. The base 864 includes a first end 868 and a second end 866. The top 862 is opposite the first end 868 of the base 864. The body 870 includes exterior wall surface 876, 878, 880, 882. The exterior wall surface 876 extends vertically from the base 864 to the top 862 except at the slots 872, 874, and horizontally from the exterior wall surface 880 to the exterior wall surface 878 except at the slots 872, 874. The exterior wall surface 878 extends vertically from the base 864 to the top 862, and horizontally from the exterior wall surface 876 to the exterior wall surface 882. The exterior wall surface 880 extends vertically from the base 864 to the top 862, and horizontally from the exterior wall surface 876 to the exterior wall surface 882. The exterior wall surface 882 extends vertically from the base 864 to the top 862, and horizontally from the exterior wall surface 878 to the exterior wall surface 880.

The body 870 includes a bore 884 configured for fixed placement of a first component. The bore 884 extends between and through the top 862 and the first end 868 of the base 864. The bore 884 is defined at least in part by an interior wall surface 888 of the body 870. Similarly, the body 870 also includes a bore 886 configured for fixed placement of a second component. The bore 886 extends between and through the top 862 and the base 864. The bore 886 is defined at least in part by an interior wall surface 890 of the body 870. Fixedly placing a first component within the bore 884 and a second component within the bore 886 provides for alignment of those components.

The bore 884 can be configured with a ledge 896. The ledge 896 includes a top surface 898. The bore 886 can be configured with a ledge 883. The ledge 883 includes a top surface 885. In some implementations, a distance from the top surface 898 of the ledge 896 to the first end 868 of the base 864 is equal to a distance from the top surface 885 of the ledge 883 to the first end 868 of the base 864. In other implementations, the distance from the top surface 898 of the ledge 896 to the first end 868 of the base 864 is greater than or less than a distance from the top surface 885 of the ledge 883 to the first end 868 of the base 864. In these latter implementations, the components to be installed into the bore 884 and the bore 886 may have different heights, but have sub-components such as a lens that are preferably disposed at a common distance above the first end 868 of the base 864. Accordingly, a shorter component can be installed within the bore having a top surface of a ledge further away from the first end 868 of the base 864, and a longer component can be installed within the bore having a top surface of a ledge closer to the first end 868 of the base 864.

In the implementation shown in FIG. 53, the slot 872 is open at the interior wall surface 888, at the top 862, and at the exterior wall surface 876. The body 870 includes a slot wall 892, a slot floor 894, and another slot wall across the slot 872 opposite the slot wall 892. The slot 872 is defined at least in part by the slot wall 892, the opposing slot wall in the body 870, and the slot floor 894. Similarly, the slot 874 is open at the interior wall surface 890, at the top 862, and at the exterior wall surface 876. The body 870 includes a slot wall 881, a slot floor 887, and another slot wall across the slot 874 opposite the slot wall 881. The slot 874 is defined at least in part by the slot wall 881, the opposing slot wall in the body 870, and the slot floor 887. In another implementation, the slot 872 and/or the slot 874 extend only partially through the body 870 such that the slot 872 and/or the slot 874 is not open at the exterior wall surface 876.

The component aligner 860 includes a protrusion 889 and a protrusion 891, both extending from the first end 868 of the base 864. The protrusions 889, 891 are configured for placement within holes within a substrate, such as the holes 150, 152 within the substrate 120. The protrusions 889, 891 can keep the component aligner 860 from sliding across the substrate 120 once the protrusions 889, 891 are disposed within the holes 150, 152. In some implementations, the protrusions 889, 891 are arranged non-symmetrically on the first end 868 of the base 864 so that the protrusions 889, 891 cannot be improperly installed into the holes 150, 152 and to improve the likelihood that the component aligner 860 is properly attached to the substrate 120. In some implementations, the component aligner 860 includes a different quantity of protrusions on the base 864. In yet other implementations, no protrusions extend from the base 864. In some implementations, the base 864, other than protrusions 889, 891 extending from the base 864 is flat.

FIG. 10 to FIG. 18 and FIG. 20 to FIG. 58 show example implementations of a component aligner having two slots, namely a first slot open to an interior surface of a first bore and a second slot open to an interior surface of a second bore. In alternative implementations, those example component aligners include the first slot, but not the second slot or the second slot, but not the first slot.

The slots shown in the aforementioned implementations can, but need not necessarily, be defined by a slot walls and a slot floor within a body of the component aligner. Moreover, the aforementioned implementations are described as having ledges within the bores. Each ledge has a top surface that can contact a component installed with the bore in which that ledge is located. In some implementations, the top surface of the ledge is even with the slot floor of the slot that is open to the bore including the ledge. Such implementations are particularly useful when a tab of a component to be installed with a bore is even with a bottom of a package of that component. In other implementations, the top surface of the ledge is below the slot floor of the slot that is open to the bore including the ledge. Such implementations are particularly useful when a tab of a component to be installed with a bore extends below the rest of a bottom of a package of that component. In some implementations, the top surface of the ledge is above the slot floor of the slot that is open to the bore including the ledge. Such implementations are particularly useful when a tab of a component to be installed with a bore is offset upwards from a bottom of a package of that component.

IV. Further Example System Components

1. Processor

A processor, such as the processor 102 or any other processor discussed in this description, can include one or more processors. Any processor discussed in this description can thus be referred to as "at least one processor" or "one or more processors." Furthermore, any processor discussed in this description can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore still, any processor discussed in this description can include and/or be operatively connected to a memory controller that controls a flow of data going to and from a memory, such as the memory 104. In at least some implementations of the remote computing system 80, the INTEL® multicore microprocessor can include one or more INTEL® XEON® processors having between four and twenty-eight cores.

Any processor discussed in this description can be configured to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. Any processor discussed in this description can be configured to execute hard-coded functionality in addition to or as an alternative to software-coded functionality (e.g., via CRPI). In at least some implementations of the computing system 100, the processor 102 can be programmed to perform any function(s) described in this description as being performed by the imaging system 10 and/or the computing system 90.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can, but need not necessarily, include (a) an advanced RISC (reduced instruction set computer) machine (ARM) processor (e.g., an AT91SAM4E ARM processor provided by the Atmel Corporation, San Jose, Calif.), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

2. Memory

A memory, such as the memory 104 or any other memory discussed in this description, can include one or more memories. Any memory discussed in this description can thus be referred to as "at least one memory" or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be configured as a removable storage device, a non-removable storage device, or a combination thereof. A removable storage and/or a non-removable storage device can, but need not necessarily, include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI provided over a communication network, such as the communication network 85.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Infrared Array Sensor

An infrared array sensor, such as the infrared array sensor 106 or any other infrared array sensor discussed in this description, can include a thermal array sensor to capture infrared radiation and output a thermal image. In accordance with at least some example implementations, the infrared array sensor can include a thermal array sensor configured to detect intensities and wavelengths of infrared radiation (e.g., 750 nm to 1 millimeter (mm)). As an example, the infrared array sensor can include a bolometer array sensor (e.g., an uncooled microbolometer) or an infrared thermopile array sensor. The infrared array sensor 106 can include a lens. The infrared array sensor 106 can include or be part of a thermal camera. An output of the infrared array sensor 106 can be stored in the memory 104 as an image file or a video file.

In accordance with at least some example implementations, the thermal array sensor can include an enclosure with a tab, such as a TO5 enclosure, a TO18 enclosure, a TO39 enclosure, a TO46 enclosure, or another type of enclosure with a tab. The tab of the enclosure can be disposed within a slot of the component aligner 122.

In at least some of those implementations, the thermal array sensor can include four electrical pins operatively connectable to the substrate 120. Those four pins can, but need not necessarily, include a serial data pin, a positive supply voltage pin, a negative supply voltage pin, and a clock pin. In other implementations, the thermal array sensor can have a number of pins other than four pins.

The thermal array sensor can output radiometry to provide a thermal image with a temperature measurement. The temperature measurement can indicate a temperature of a portion of a target at which dot generated by laser pointer 114 is shown on a thermal image of the target.

4. Visible light Camera

A visible light camera, such as the visible light camera 108 or any other visible light camera described in this description, can include an image array sensor and a lens. In accordance with at least some example implementations, the image array sensor of the visible light camera can be configured to detect intensities and wavelengths (e.g., 380 nanometers (nm) to 750 nm) of visible light radiation that is visible to a human eye. The array sensor of the visible light camera can include a charge-coupled device (CCD) image array sensor, a complementary metal oxide semi-conductor (CMOS) imager array sensor, and/or one or more other optical elements that is/are known in the art. An output of the image array sensor of the visible light camera can be stored in the memory 104 as an image file or a video file.

In at least some of the example implementations, the visible light camera can include a filter and/or lens cover. In those and/or other example implementations, the visible light camera can an image sensor driver, a shutter, and/or output signal processing circuitry. In at least some of the aforementioned limitations, the processor 102 can, but need not necessarily, include the image sensor driver, the shutter, and/or the output signal processing circuitry 5. User Interface A user interface, such as user interface 110 or any other user interface described in this description, can include one or more user interface components. A user interface component can be configured for use by a user to enter data and/or a selection to the computing system 100 and/or to present an output, such as a visual, audible, or haptic output.

In at least some implementations, the user interface 110 includes a keyboard having one or more components configured for entering data and/or a selection into the computing system 100. The keyboard can include one or more keys. In at least some implementations, each key includes a push button, such as a press-and-hold button or a press-and-release button. In at least some implementations, at least a portion of the keyboard is implemented as part of a touch screen display that includes soft keys, such as capacitive or resistive keys of a touch screen display. In still other implementations, the soft keys of the keyboard on the touch screen display can include a power on/off key, a yes key and a no key, and/or four directional cursor keys (such as left, up, right, down keys). The keyboard can, but need not necessarily, include a QWERTY keyboard.

In accordance with an implementation in which the computing system 100 is configured like the imaging system 10, the user interface components of the user interface 110 include the user interface components 12, 20. In accordance with at least some of the example implementations, the display 112 includes a touch screen display configured for entering data and/or user selections.

6. Display

A display, such as the display 112 or any other display described in this description, can include one or more displays. As an example, a display can include a capacitive touch screen display, a resistive touch screen display, a plasma display, a light emitting diode (LED) display, a cathode ray tube display, an organic light-emitting diode (OLED) display, or a liquid crystal display (LCD). An OLED display can include an active-matrix OLED or a passive-matrix OLED. The LCD can include a backlit, color LCD. The display 112 can include a touch screen display with the LCD. For instance, the display 112 can include a capacitive or resistive touch screen display. Other examples of the display 112 are also possible.

The display 112 can display a still image, such as a visible light image, a thermal image, and/or a blended image. The display 112 can also display a video. The display 112 can display a text file, such as a text file with a PDF file extension or an XML, file extension. The display 112 can display a hypertext markup language file. The display 112 can display a web page. In at least some implementations, the display 112 can display a graphical user interface (GUI). Other examples of content displayable by the display 112 are also possible.

7. Laser Pointer

A laser pointer, such as a laser pointer 114 or any other laser pointer described in this description, can include a laser diode (e.g., a Fabry Perot (FP) laser diode) and a laser diode package. In at least some implementations, the laser pointer includes a lens and a lens cap. In those or in other implementations, the laser diode package can include a TO can package. As an example, a TO can package could include a thin, flat base having a tab, and a hollow cylindrical cap affixed to the base. The base can, but need not necessarily, be cylindrical except for the tab extending from the base. A diameter of the base can be larger than a diameter to the cylindrical can. The laser pointer can include multiple electrical leads extending from within the cylindrical cap and through and beyond the base.

In accordance with the aforementioned implementations, the laser pointer 114 can be disposed within a bore of a component aligner with its electrical leads first. At least a portion of the electrical leads can pass through the base of the component aligner (e.g., the base 202 of the component aligner 200). A top surface of a ledge (e.g., the top surface 234 of the ledge 232) within a bore (e.g., the first bore 222) can stop the laser pointer 114 from proceeding further into the bore when a base of the laser diode package contacts the top surface of the ledge. Other example implementations of the laser pointer 114 are also possible.

8. Communication Network Interface

A communication network interface, such as the communication network interface 116 or any other communication network interface described in this description, can include one or more communication network interface configured for transmitting data to the communication network 85 and/or receiving data from the communication network 85. The communication network interface can include one or more transceivers. Each transceiver includes one or more transmitters configured to transmit data onto a network, such as the communication network 85, a data bus, and/or some other type of connection mechanism. Each transceiver includes one or more receivers configured to receive data or a communication carried over a network, such as the communication network 85, a data bus, and/or some other type of connection mechanism. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, 802.11n or 802.11ac), (ii) an IEEE® 802.15 standard (e.g., 802.15.1, 802.15,3, 802.15.4 (ZIG-BEE®), or 802.15.5) for wireless personal area networks (PANs), (iii) a BLUETOOTH® version 4.1 or 4.2 standard developed by the Bluetooth Special Interest Group (SIG) of Kirkland, Wash., (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a network, such as the communication network 85, or a data bus, such as the data bus 128. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a universal serial bus (USB) specification, or some other wired communication standard. In accordance with at least some implementations, an electrical circuit can include a wire, a printed circuit on a substrate, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". As an example, transmission of data over the conductor can occur electrically and/or optically.

A transceiver that is configured to carry out communications over the communication network 85 can include a modem, a network interface card, a local area network (LAN) on motherboard (LOM), and/or a chip mountable on a circuit board. As an example the chip can include a CC3100 Wi-Fi® network processor available from Texas Instruments, Dallas, Tex., a CC256MODx Bluetooth® Host Controller Interface (HCI) module available from Texas instruments, or a different chip for communicating via Wi-Fi®, Bluetooth® or another communication protocol.

A network device within and/or coupled to the communication network 85 and/or that communicates via the communication network 85 using a packet-switched technology can be locally configured for a next 'hop' in the communication network 85 (e.g., a device or address where to send data to, and where to expect data from). As an example, a device (e.g., a transceiver) configured for communicating using an IEEE® 802.11 standard can be configured with a network name, a network security type, and a password. Some devices auto-negotiate this information through a discovery mechanism (e.g., a cellular phone technology).

The data transmitted by a communication network interface can include a destination identifier or address of a computing system to which the data is to be transmitted. The data or communication transmitted by a communication network interface can include a source identifier or address of the computing system including the communication network interface. The source identifier or address can be used to send a response to the computing system that includes the communication network interface that transmitted the data.

9. Light

A light, such as the light 126, can be configured to illuminate areas of low light during use of the visible light camera 108. The light 126 can have one or more different output levels, such as 7.0 lumens, 12.0 lumens, and/or 22.0 lumens. In accordance with at least some example implementations, the light 126 can include an LED.

10. Power Supply

A power supply, such as the power supply 118 or any other power supply described in this description can be arranged in various configurations. As an example, the power supply 118 can include circuitry to receive AC current from an AC electrical supply (e.g., electrical circuits operatively connected to an electrical wall outlet) and a converter to convert the AC current to a DC current for supplying to one or more of the components of the computing system 100. As another example, the power supply 118 can include a battery or be battery operated. As yet another example, the power supply 118 can include a solar cell or be solar operated. The power supply 118 can include and/or operatively connect to electrical circuits arranged to distribute electrical current throughout the power supply 118 and/or the computing system 100. Other examples of the power supply 118 are also possible.

11. Substrate

A substrate, such as the substrate 120 or any other substrate described in this description, is a substrate configured for mounting and operatively connecting two more components of the computing system 100. In accordance with at least some example implementations, the substrate comprises a fiberglass circuit board with copper foil bonded to the circuit board. In accordance with at least some other example implementations, the substrate comprises a ceramic printed circuit board, such as a ceramic circuit board having a metal core. The described substrate can comprise a single-sided circuit board, a double-sided circuit board, or a multi-layered circuit board.

12. Housing

A housing, such as the housing 124 or any other housing described in this description, can be configured in any of a variety of configurations. For example, the housing 124 can surround at least a portion of the following: the processor 102, the memory 104, the infrared array sensor 106, the visible light camera 108, the user interface 110, the display 112, the laser pointer 114, the communication network interface 116, the power supply 118, the substrate 120, the component aligner 122, and/or the light 126. The housing 124 can support the substrate 120. In at least some example implementations, at least a portion of the following: the processor 102, the memory 104, the infrared array sensor 106, the visible light camera 108, the user interface 110, the display 112, the laser pointer 114, the communication network interface 116, the power supply 118, the substrate 120, the component aligner 122, and/or the light 126 can be mounted on and/or connect to the substrate 120. The housing 124 can be configured like the housing 16. The housing 124 can be made from various materials. In some example implementations, the housing 124 is made from a plastic material (e.g., acrylonitrile butadiene styrene (ABS)). In the example implementations in which the housing 124 includes a handle, such as the handle 18, a portion of the housing including the handle can be made from a thermoplastic elastomer to form a grip on the handle.

13. Memory Content

The memory 104 contains computer-readable data. As an example, the memory 104 contains computer-readable programming instructions (CRPI) executable by the processor 102. In accordance with this example, the CRPI can include program instructions executable by the processor 102 to cause the computing system 100 to perform the functions shown in FIG. 59 and/or any function of an example implementation described in connection with the functions shown in FIG. 59. Similarly, the CRPI can include program instructions executable by the processor 102 to cause the computing system 100 to perform the functions shown in FIG. 67 and/or any function of an example implementation described in connection with the functions shown in FIG. 67.

In at least some of the example implementations, the memory 104 contains data representing the output of the VLC 108, the output of the infrared array sensor 106, a scaled VLC output generated by processor 102, a scaled thermal output generated by the processor 102, and/or coordinates of one or more coordinates of the infrared array sensor to calibrate the computing system 100. In at least some of the example implementations, the memory 104 contains a temperature determined by the processor 102 based on temperature values represented by one or more sensors of the infrared array sensor 106. In at least some of the example implementations, the memory 104 contains an image, such as a visible light image based on output of the visible light camera 108, a thermal image based on output of the infrared array sensor 106, or a blended image based on the visible light image and the thermal image.

In at least some of the example implementations, the CRPI are executable by the processor 102 to provide one or more of the following operating modes: a visible light mode, an overlay mode, a full thermal mode, and a laser mode, and to provide for selection of one of the operating modes. In the visible light mode, the processor 102 causes the display 112 to display an output of the visible light camera 108. In the overlay mode, the processor 102 causes the display 112 to display an output based on an output of the visible light camera 108 with a transparent thermal image overlay based on an output of the infrared array sensor 106. In the full thermal mode, the processor 102 causes the display 112 to display a full thermal image based on an output of the infrared array sensor 106. In the laser mode, the processor 102 causes the laser pointer 114 to output a laser and the display 112 to display an output of the visible light camera 108. The user interface 110 can be used to select the operating mode.

In at least some of the example implementations, the CRPI are executable by the processor 102 to configure the computing system 100 for operating at different distances from a target. The user interface 110 can be used to select a distance from a target, such as a near operating distance or a far operating distance. In response to selecting the distance from the target, the processor 102 can cause the system to use a calibration based on a position of the laser pointer the infrared array sensor, as described in this description.

The memory 104 can include a pixel map for the infrared array sensor 106. In an example, implementation in which the infrared array sensor 106 includes a 32×32 infrared array sensor, the pixel map for the infrared array sensor 106 can include a map with 32 columns and 32 rows, where the pixels in a top row are associated with consecutive integers 0 through 31 from left to right and each next row downwards, from left to right is numbered sequentially starting with the next integer following the integer associated with the right-most pixel in the preceding row. The right-most pixel of the bottom row is associated with the integer 1,023.

The memory 104 can include a pixel map for the visible light camera 108. In an example, implementation in which the visible light camera 108 includes a 640×480 image sensor, the pixel map for the visible light camera 108 can include a map with 640 columns and 480 rows, where the pixels in a top row are associated with consecutive integers 0 through 639 from left to right and each next row downwards, from left to right is numbered sequentially starting with the next integer following the integer associated with the right-most pixel in the preceding row. The right-most pixel of the bottom row is associated with the integer 307,199.

The memory 104 can include a pixel map for the display 112. In an example, implementation in which the display 112 is a 240×240 pixel display, the pixel map for the display 112 can include a map with 240 columns and 240 rows, where the pixels in a top row are associated with consecutive integers 0 through 239 from left to right and each next row downwards, from left to right is numbered sequentially starting with the next integer following the integer associated with the right-most pixel in the preceding row. The right-most pixel of the bottom row is associated with the integer 57,599.

The memory 104 can store one or more scaling factors. At least some of the scaling factors can be associated with upscaling the output of the infrared array sensor 106 for displaying on the display 112. For example, the output of a 32×32 infrared array sensor can be upscaled by a scaling factor of five to result in a 160×160 scaled output of the infrared array sensor. At least some of the scaling factors can be associated with distance between the computing system 100 and a target, such as the scaling factors applied to an output of the visible light camera 108 so that outputs of the visible light camera 108 and the infrared array sensor 106 are aligned. The scaling factors for the infrared array sensor 106 and/or the visible light camera 108 can be an integer or fraction value The memory 104 can store alignment values, such as any alignment value described in this description. The stored alignment values can indicate a number of pixels the output of the visible light camera 108 needs to be shifted up or down and/or left or right to be in alignment with an output of the infrared array sensor 106 when both are displayed on the display 112. Those alignment values can be stored as signed integers, such as int16 signed integers.

The memory 104 can also include, in non-volatile memory, alignment values pertaining to the laser pointer 114. In at least some implementations, the alignment values pertaining to the laser pointer 114 include coordinates regarding the laser pointer 114 with respect to the infrared array sensor 106. Those alignment values can include a row coordinate and a column coordinate of a laser dot in the infrared array sensor 106. Those alignment values can be stored as unsigned integers, such as uint16 unsigned integers. The processor 102 can use those alignment values for the laser pointer 114 to determine which specific pixels, e.g., four, nine or sixteen pixels surrounding, adjacent, and/or in proximity the alignment values, are designated for determining an average temperature of a target surface where the laser pointer 114 is pointing to produce the laser dot. The row and column coordinates of the infrared array sensor 106 for use as alignment values for the laser pointer 114 can be determined as the corresponding row and column coordinates of the output of the visible light camera 108 that overlay or are overlaid upon the row and column coordinates of the output of the infrared array sensor 106.

The alignment values pertaining to the laser pointer 114 can also include values indicating a row coordinate and a column coordinate of the laser dot in an output of the VLC 108 and values indicating a width of the laser dot in pixels and a height of the laser dot in pixels. These alignment values can be stored as unsigned integers, such as uint16 unsigned integers. The memory 104 can include a checksum with respect to one or more alignment values.

V. Example Operation

Figure 59:
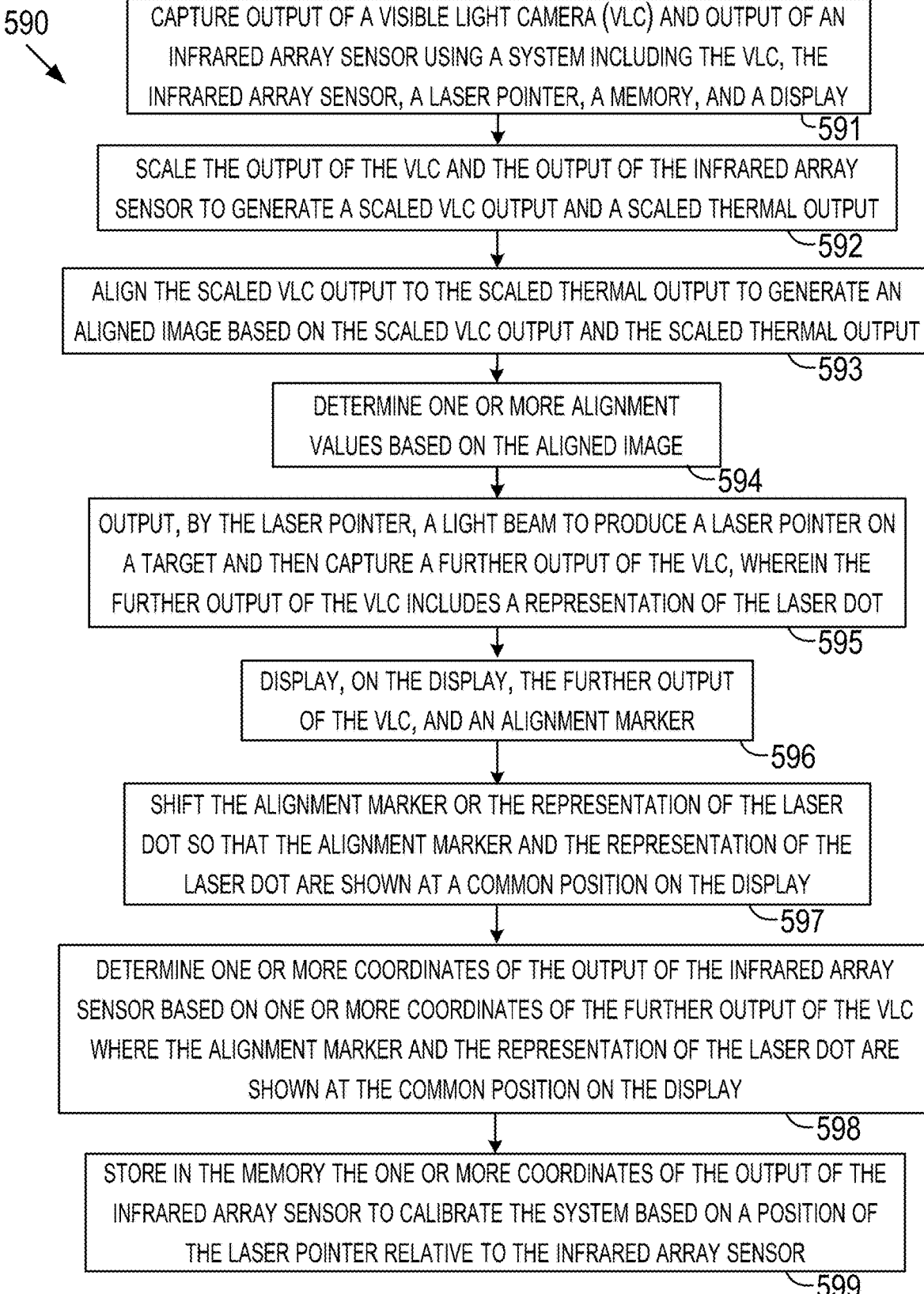
FIG. 59 depicts a flow chart showing an example method in accordance with the example implementations described herein.

Next, FIG. 59 shows a flowchart depicting a set of functions 590 (or more simply "the set 590") that can be carried out in accordance with at least some of the example implementations described in this description. The set 590 includes the functions shown in block 591 through block 599. The following description of the set 590 includes references to elements shown in other figures described in this description, but the functions of the set 590 are not limited to being carried out only by the referenced elements. A variety of methods can be performed using all of the functions shown in the set 590 or any proper subset of the functions shown in the set 590. Any of those methods can be performed with other functions such as one or more of the other functions described in this description. At least a portion of two or more functions of the set 590 can occur simultaneously.

Block 591 includes capturing output of the VLC 108 and output of the infrared array sensor 106 using a system including the VLC 108, the infrared array sensor 106, the laser pointer 114, the memory 104, and the display 112. In at some implementations, the system includes the imaging system 10, the computing system 90, and/or the computing system 100. Capturing the output of the VLC 108 can include detecting intensities and wavelengths of visible light radiation that is visible to a human eye and storing representations of the detected intensities and wavelengths of visible light radiation within the memory 104. Capturing the output of the infrared array sensor 106 can include detecting intensities and wavelengths of infrared radiation and storing representations of the detected intensities and wavelengths of infrared radiation within the memory 104.

Next, block 592 includes scaling the output of the VLC 108 and the output of the infrared array sensor 106 to generate a scaled VLC output and a scaled thermal output, respectively. Scaling an output can include upscaling or downscaling the output. Scaling the output of the VLC 108 and/or the output of the infrared array sensor 106 can result in scaled outputs that have the same scale such that both scaled outputs include the same or overlapping field-of-view and/or can be aligned.

In at least some implementations, the output of the infrared array sensor 106 is upscaled by an integer scaling factor, such as 3, 4, 5, or 6. Alternatively, the output of the infrared array sensor 106 is upscaled by a fractional scaling factor. In at least some of those implementations, the processor 102 scales the output of the infrared array sensor 106 using bilinear scaling.

In at least some implementations, the output of the visible light camera 108 is scaled to the same scale as the scaled thermal output or is already at the same scale as the scaled thermal output. To achieve that common scaling, the output of the VLC 108 could be scaled using an integer or fractional scale. In at least some implementations, the processor 102 down-scales the output of the VLC 108 using bilinear scaling and decimation.

Next, block 593 includes aligning the scaled VLC output to the scaled thermal output to generate an aligned image based on the scaled VLC output and the scaled thermal output. Aligning the scaled VLC output and the scaled thermal output can result in scaled outputs that have the same or overlapping field-of-view at a certain distance. In at least some implementations, the display 112 displays the scaled VLC output and the scaled thermal output with a blending factor between twenty percent and one hundred percent, where the blending factor indicates an opacity level of the scaled thermal output, although the blending factor for other implementations could be any range between zero and one hundred percent. The blending factor can be selected by a user of the device using the user interface 110. In at least some of those implementations, the processor 102 can be configured to change the blending factor in linear steps, such as linear steps of one percent, twenty percent, or some other percentage.

Figure 60:
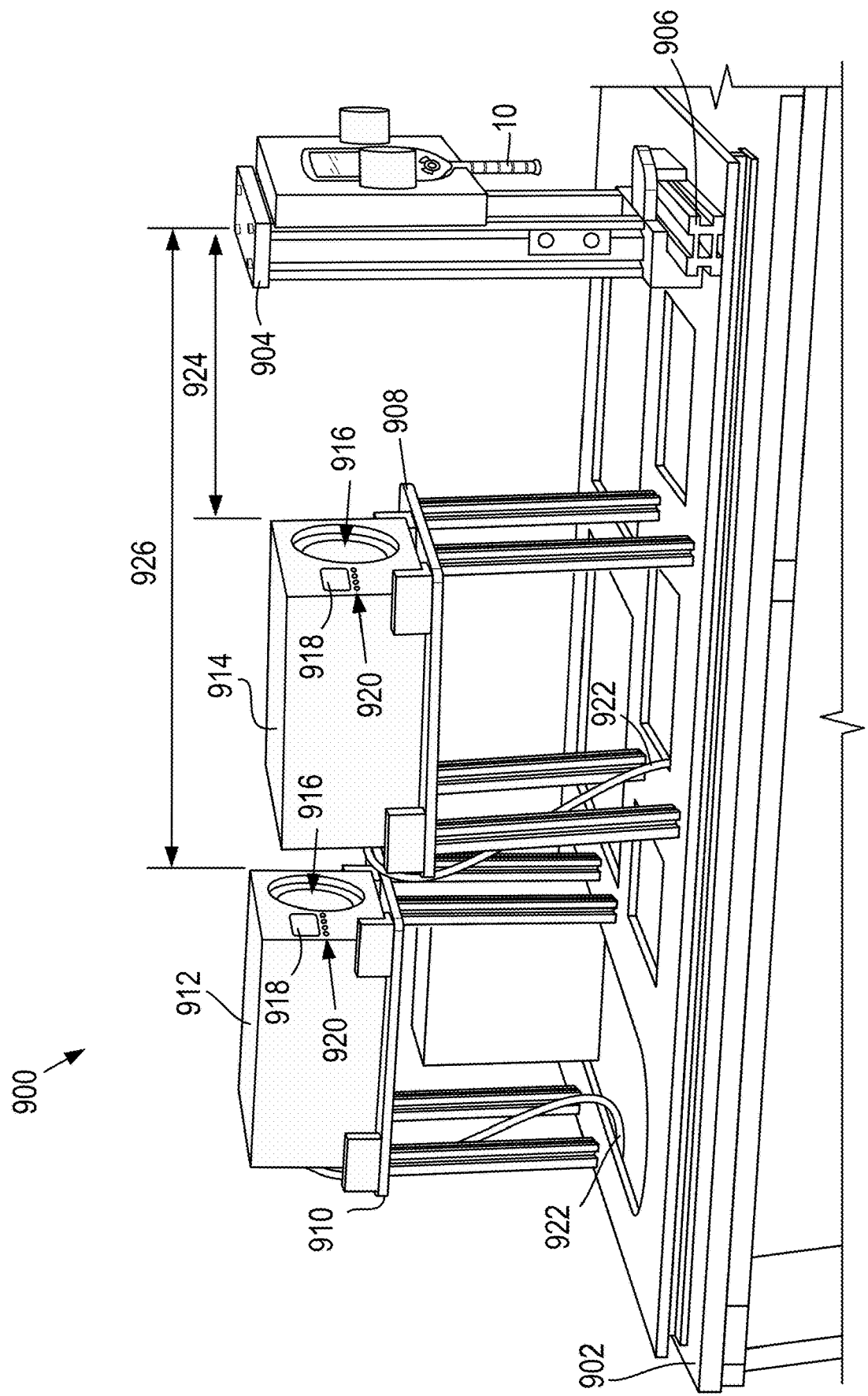
FIG. 60 shows an alignment fixture for calibrating a computing system in accordance with the example implementations described herein.

In at least some implementations, aligning the scaled VLC output to the scaled thermal output occurs while the system is held by an alignment fixture, such as the alignment fixture 900 shown in FIG. 60. In those or in other implementations, a target of the scaled VLC output and of the scaled thermal output is a blackbody and/or an infrared source of a blackbody calibrator.

In at least some example implementations, positions of the output of the infrared array sensor and the scaled thermal output are fixed such that aligning the scaled VLC output includes repositioning the scaled VLC output with respect to the scaled thermal output. In those implementations, fixing the scaled thermal output can occur because the output of the infrared array sensor 106 is smaller than an output of the visible light camera 108 and none of the scaled thermal output needs to be omitted when generating the aligned image. The output of the infrared array sensor 106 is typically smaller than an output of the visible light camera 108 because infrared array sensors are typically more expensive than visible light cameras.

In alternative implementations, aligning the scaled VLC output includes repositioning the scaled thermal output with respect to the scaled VLC output, or repositioning both the scaled VLC output and the scaled thermal output with respect to each other.

In at least some of the example implementations, aligning the scaled VLC output to the scaled thermal output can include use of a move left button, a move up button, a move right button, and/or a move down button as shown in FIG. 1 to move the scaled VLC output in alignment with the scaled thermal output.

Figure 61:
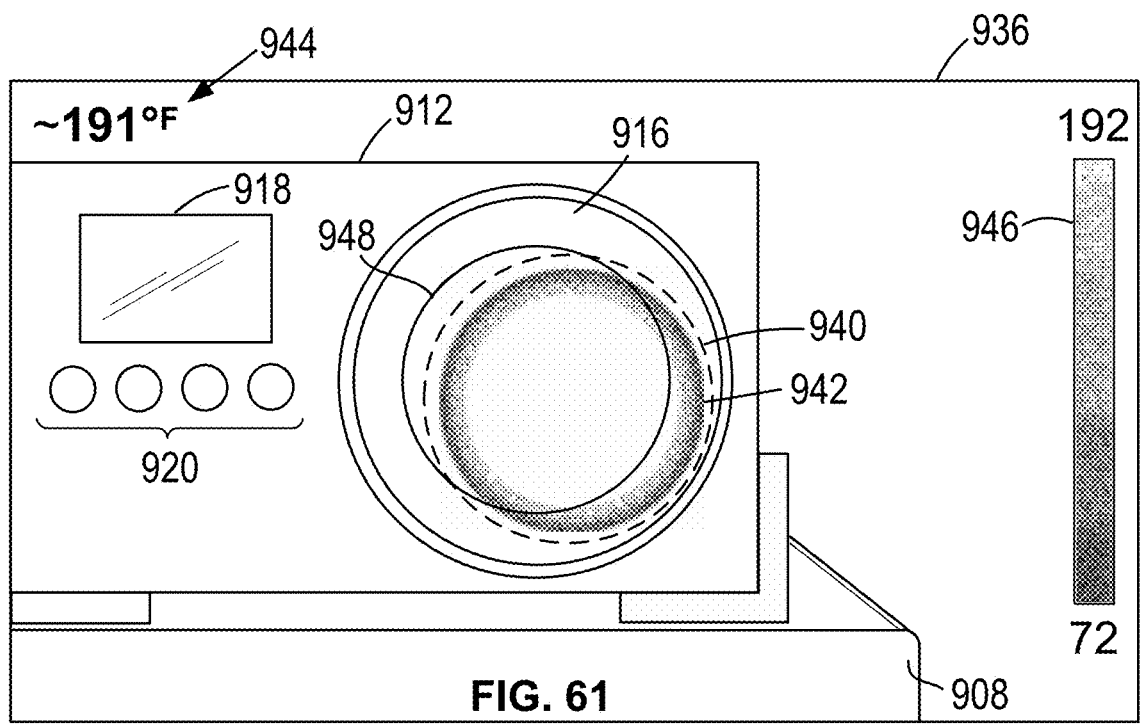
FIG. 61 and FIG. 62 show screenshots captured during alignment of the computing system in accordance with the example implementations described herein.
Figure 62:
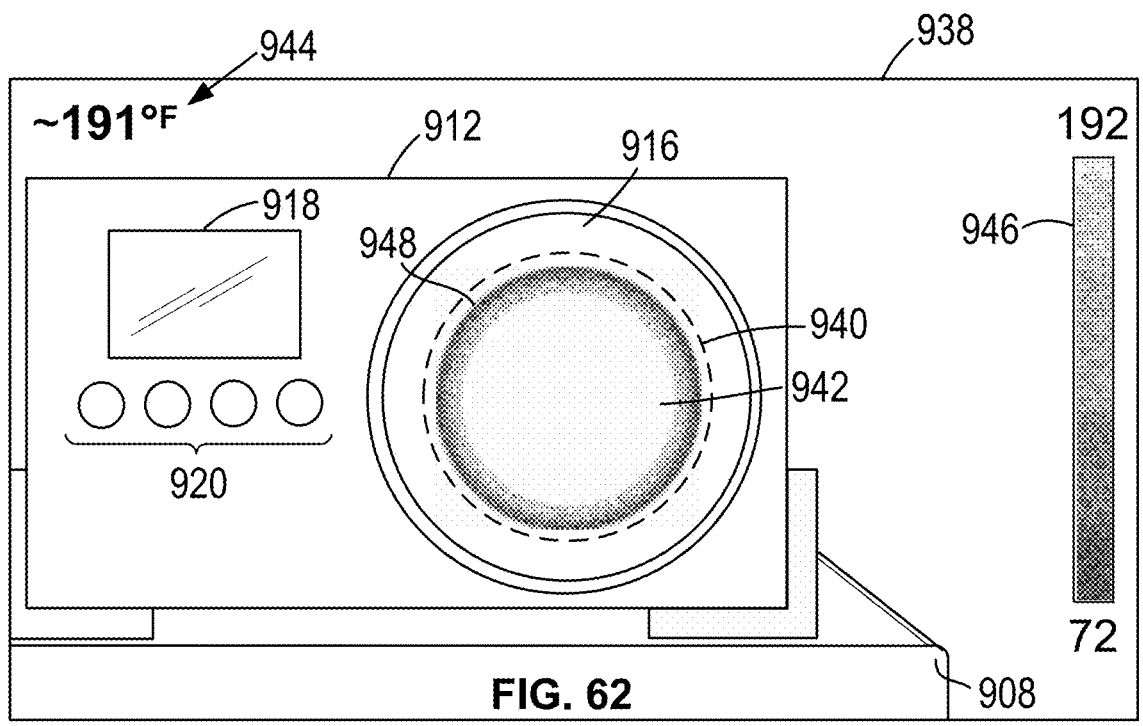

FIG. 61 shows a screenshot 936 of the display 112 and FIG. 62 shows a screenshot 938 of the display 112, both captured during alignment of the computing system 100 in accordance with an example implementation. In this implementation, the computing system 100 is affixed to the alignment fixture 900 such that the infrared array sensor 106 and the visible light camera 108 can capture images of the blackbody calibrator 912. The screenshot 936 represents that the scaled VLC output is not aligned with the scaled thermal output. In this implementation, the processor 102 outputs an alignment marker 940, such as a line or a cross-hair, centered on the display 112. The alignment marker 940 is centered for implementations in which the scaled output of the infrared array sensor 106 is centered on the display 112. The line of the alignment marker 940 can match a shape of a target plate in the blackbody calibrator 912. As shown in FIGS. 61 and 62 the line of the alignment marker 940 is circular. Furthermore, the line of the alignment marker 940 can, but need not necessarily, be a dotted line, as shown in FIG. 61 and FIG. 62.

In an implementation in which a size and shape of an infrared source (such as a target plate) of a blackbody calibrator is known, the alignment marker 940 can be configured as a dotted line corresponding to that known size and shape. In such implementations, the dotted line can be shown on the display as the same size or slightly larger than the infrared source within the blackbody calibrator for a particular distance between the computing system 100 and the blackbody calibrator.

The screenshot 936 shows an infrared representation 942 of a target plate of the blackbody calibrator 912, a temperature value 944 calculated by the processor 102, a temperature scale 946, and a visible light camera representation 948 of the target plate of the blackbody calibrator 912. The alignment marker 940, the temperature value 944, and the temperature scale 946 can be overlaid upon the scaled VLC output displayed on the display 112 or the scaled VLC output displayed on the display 112 can be overlaid upon the alignment marker 940, the temperature value 944, and the temperature scaled 946. The alignment marker 940, when arranged as a cross-hair, can appear like the cross-hair 60 shown in FIG. 4. The alignment marker 940, when arranged as a dotted line, can be configured for a selected alignment distance and for a known blackbody calibrator, as a size of the target plate of the blackbody calibrator 912 visible on the display 112 can be determined for different distances.

The screenshot 938 also shows the infrared representation 942 of the target plate of the blackbody calibrator 912, the temperature value 944 calculated by the processor 102, the temperature scale 946, the alignment marker 940, and the visible light camera representation 948 of the target plate of the blackbody calibrator 912, except that unlike the screenshot 936, the scaled VLC output displayed on the display 112 and the scaled thermal output are in alignment. This could result from use of the user interface 110 to move the scaled VLC output so that the target plate is shown centered within the target plate window 916. A quantity of pixels the scaled VLC output is moved in a horizontal direction and a quantity of pixels the scaled VLC output is moved in a vertical direction can be stored in the memory 104 as calibration and/or alignment values for the aligned computing system.

Next, block 594 includes determining one or more alignment values based on the aligned image. The alignment value(s) can be stored in non-volatile memory. The alignment value(s) can be associated with a distance between the computing system 100 and a target. The alignment values stored in the memory can include alignment values for a near distance and other alignment values for a far distance.

In at least some implementations, an alignment value of the one or more alignment values can include an alignment value indicative of a quantity of pixels the scaled VLC output was shifted to align with the scaled thermal output. The alignment value can further indicate a shift direction, such as shift up, shift down, shift left or shift right. An alignment value can equal zero (0) if the output of the VLC does not have be shifted up or down, or shifted left or right. As an example, the alignment value representing a number of pixels can be configured as an int16 value between −32768 and 32767. A negative value could indicate shift up or shift left. Other example data type(s) of the alignment value representing a number of pixels are also possible.

In at least some of implementations, an alignment value of the one or more alignment values can include a coordinate, such as a corner coordinate, of the scaled VLC output where the scaled VLC output and the scaled thermal output are aligned. The coordinate can indicate a row and column within a pixel map, such as a pixel map 730. A corner coordinate of the scaled VLC output, such as a top left corner coordinate of the scaled VLC output, can be in alignment with an upper left corner pixel of the scaled thermal output. With the number of rows and columns of pixels of the scaled thermal output known and a coordinate of the scaled VLC output known, the processor 102 can programmatically determine which rows and columns of the scaled VLC output should be used retained and which rows and columns of the scaled VLC output can be discarded when outputting a blended image with the scaled VLC output aligned with the scaled thermal output.

Figure 64:
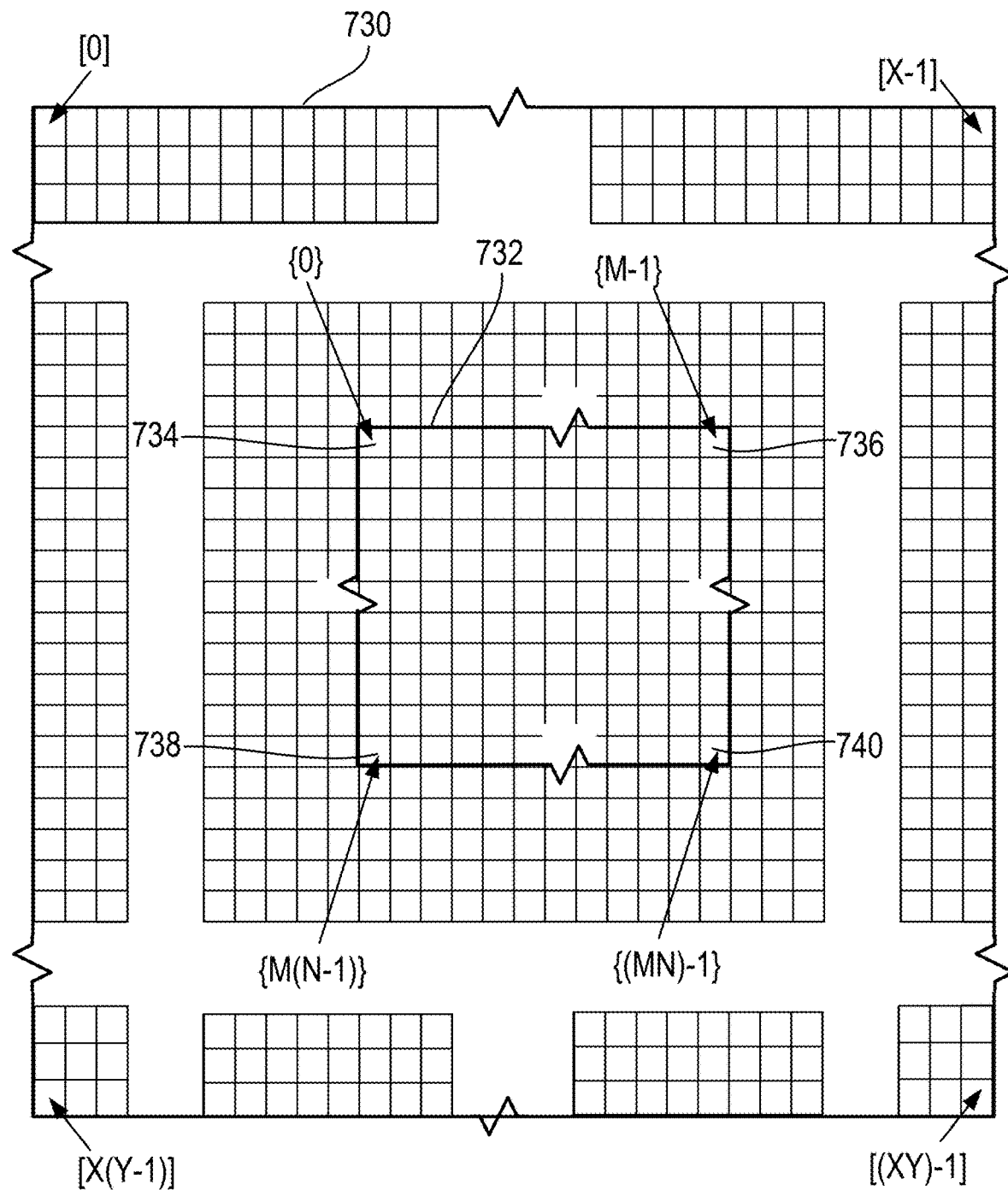
FIG. 64 shows pixel maps in accordance with the example implementations described herein.

Turning to FIG. 64, a pixel map 730 and a pixel map 732 are shown. As an example, the pixel map 730 is for the scaled VLC output and the pixel map 732 is for the scaled thermal output. The pixel map 732 can represent pixels centered on the display 112, such that a common number of pixels of the display 112 are above, below, and on both the left and right sides of the pixels that are represented by the pixel map 732.

The pixel map 730 includes X times Y pixels. The pixel map 730 includes X columns and Y rows, where the pixels in a top row of the pixel map 730 are associated with consecutive integers 0 through (X−1) from left to right and each next row downwards, from left to right is numbered sequentially starting with the next integer following the integer associated with the right-most pixel in the preceding row. The right-most pixel of the bottom row is associated with the integer (X×Y−1). For an implementation in which the visible light camera 108 includes a 640×480 image sensor, X equals 640 and Y equals 480. Examples of integers or formulas to determine integers associate with four corner pixels of the pixel map 730 are shown in FIG. 64 within square brackets. Those integers can represent pixel numbers and/or coordinates.

The pixel map 732 includes M times N pixels. The pixel map 732 includes M columns and N rows, where the pixels in a top row of the pixel map 732 are associated with consecutive integers 0 through (M−1) from left to right and each next row downwards, from left to right is numbered sequentially starting with the next integer following the integer associated with the right-most pixel in the preceding row. The right-most pixel of the bottom row is associated with the integer (M×N−1). For an implementation in which the infrared array sensor 106 includes a 32×32 infrared array sensor and the scaled thermal output is upscaled by 5, M equals 160 and Y equals 160. Examples of integers or formulas to determine integers associate with four corner pixels of the pixel map 732 are shown in FIG. 64 within squiggly brackets. Those integers can represent pixel numbers and/or coordinates.

In at least some implementations, determining the one or more coordinates of the scaled thermal output in relation to one or more coordinates of the scaled VLC output can include determining the coordinates of pixels 734, 736, 738, and/or 740 of the pixel map 730 that correspond to the corner pixels of the pixel map 732. In at least some implementations, the coordinates are defined by row and column numbers of the pixel map 730. In alternative implementations, the coordinates are defined by a pixel number of the pixel map 730.

Returning to FIG. 59, block 595 includes outputting, by the laser diode, a light beam to produce a laser dot on a target and then capturing a further output of the VLC. The further output of the VLC includes a representation of the laser dot. The further output of the VLC can further include a representation of at least a portion of the target. In at least some implementations, outputting the light beam can occur in response to the processor 102 determining the laser mode of the system 100 has been selected by the user interface 110.

Next, block 596 includes displaying, on the display, the further output of the VLC, and an alignment marker. In at least some implementations, an identifier corresponding to a field-of-view of the infrared array sensor 106 is also displayed on the display.

Figure 65:
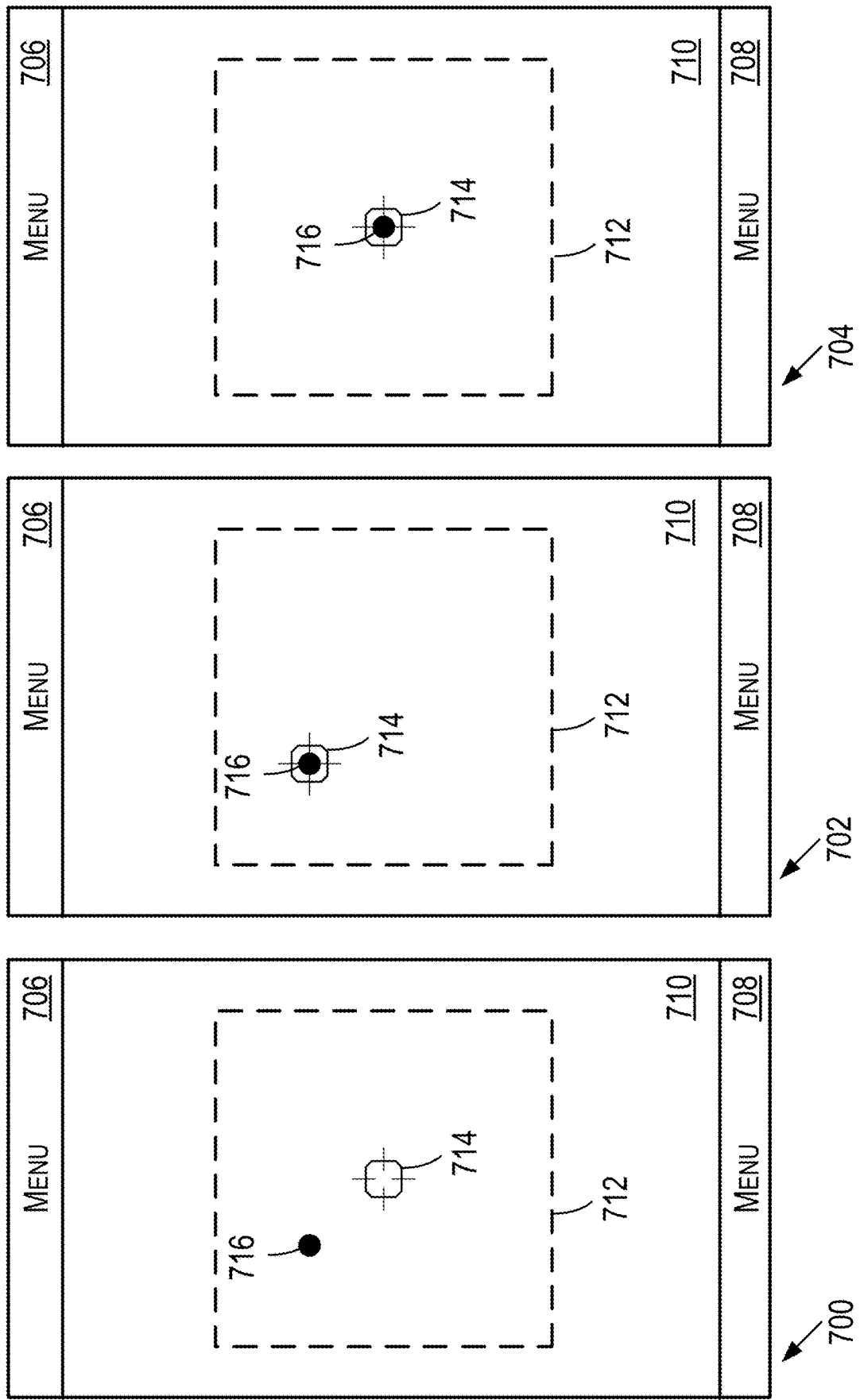
FIG. 65 shows screen shots of an imaging system display during alignment in accordance with the example implementations described herein.

Turning to FIG. 65, a screen shot 700 in accordance with an example implementation is shown. The screen shot 700 could be captured while the display 112 is displaying the further output of the VLC. The screen shot 700 includes a menu 706, a menu 708, a representation 710 of the further output of the VLC, an identifier 712 corresponding to the field-of-view of the infrared array sensor 106, an alignment marker 714, and a representation of the laser dot 716. The alignment marker 714 can, but need not necessarily, be a cross-hair.

Returning to FIG. 59, block 597 includes shifting the alignment marker or the representation of the laser dot so that the alignment marker and the representation of the laser dot are shown at a common position on the display. As an example, showing the alignment marker and the representation of the laser dot at the same position can include displaying the alignment marked overlaid upon the representation of the laser dot or vice versa. In an implementation in which the alignment marker is larger than the representation of the laser dot, showing the alignment marker and the representation of the laser dot at the same position can include displaying the alignment marker except where the representation of the laser dot is displayed within a portion of the alignment marker. In an implementation in which the representation of the laser dot is larger than the alignment marker, showing the alignment marker and the representation of the laser dot at the same position can include displaying the representation of the laser dot except where the alignment marker is displayed within a portion of the representation of the laser dot.

Returning to FIG. 65, a screen shot 702 in accordance with an example implementation is shown. The screen shot 702 is a variation of the screen shot 700. In this variation, the alignment marker 714 has been shifted so that the alignment marker 714 and the representation of the laser dot 716 are shown at a common position on the display 112.

A screen shot 704 is also shown in FIG. 65. The screen shot 704 is another variation of the screen shot 700. In this variation, the representation of the laser dot 716 has been shifted so that the alignment marker 714 and the representation of the laser dot 716 are shown at a common position on the display 112.

Figure 66:
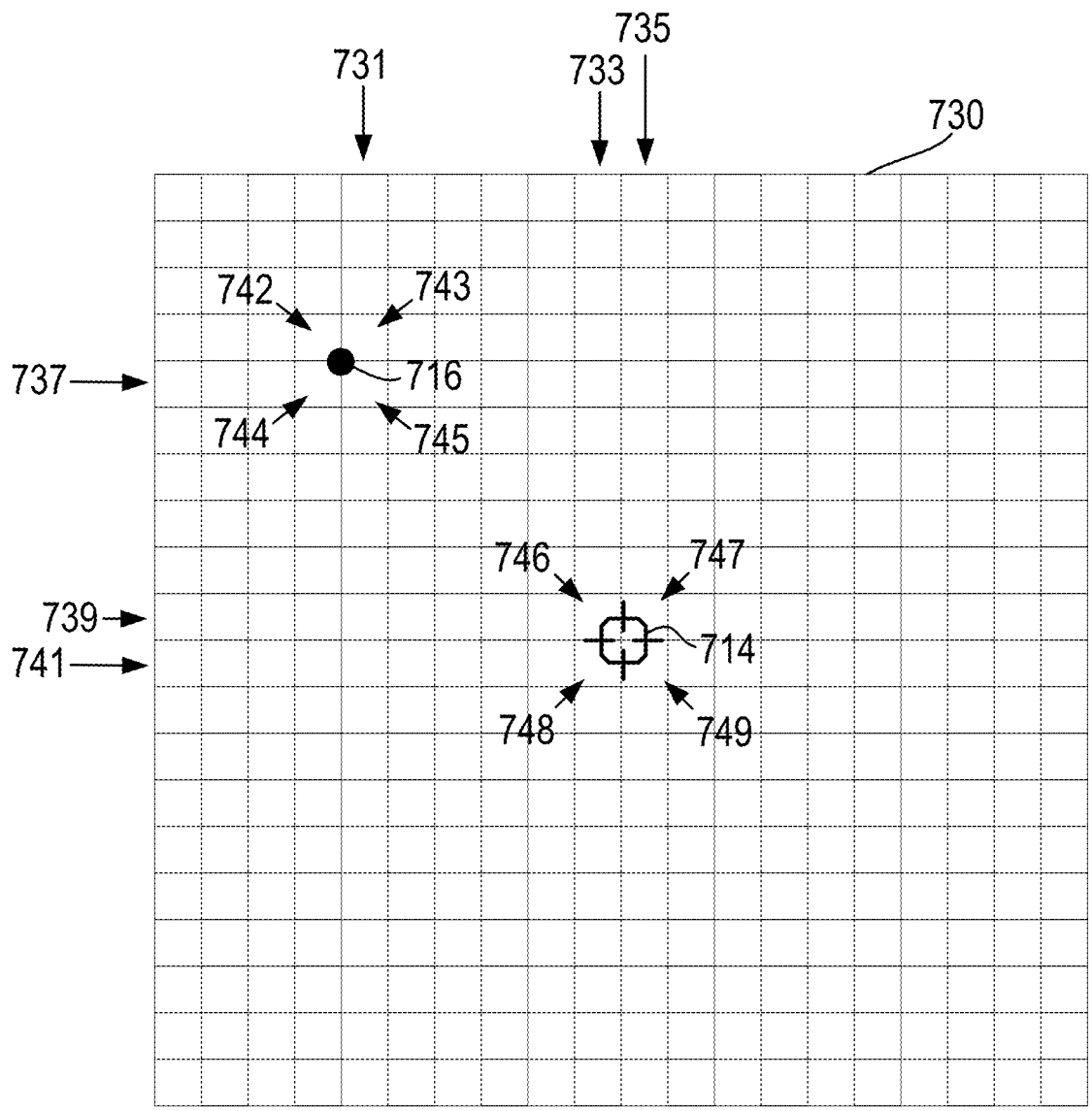
FIG. 66 shows a pixel map with respect to alignment of a laser dot and an alignment marker in accordance with the example implementations described herein.

Next, FIG. 66 shows an example of the alignment marker 714 and the representation of the laser dot 716 with respect to a center portion of the pixel map 730. The pixel map 730 includes multiple columns including columns 731, 733, 735, multiple rows including rows 737, 739, 741, and pixels 742, 743, 744, 745, 746, 747, 748, 749. In FIG. 66, a center of the laser dot 716 is located in pixels 742, 743, 744, 745 and/or a corner where pixels 742, 743, 744, 745 meet. In FIG. 66, a center of the alignment marker 714 is located in pixels 746, 747, 748, 749 and/or a corner where pixels 746, 747, 748, 749 meet.

Shifting the alignment marker 714 to be in a common position with the representation of the laser dot 716 includes shifting the alignment marker 714 horizontally to the left by six pixels and vertically upwards by six pixels. On the other hand, shifting the representation of the laser dot 716 to be in a common position with the alignment marker 714 includes shifting the representation of the laser dot 716 horizontally to the right by six pixels and vertically downwards by six pixels.

Returning to FIG. 59 once again, block 598 includes determining one or more values associated with the output of the infrared array sensor based on one or more values associated with the further output of the VLC where the alignment marker and the representation of the laser dot are shown at the common position on the display.

Next, block 599 includes storing in the memory the one or more coordinates of the output of the infrared array sensor to calibrate the system based on a position of the laser diode relative to the infrared array sensor. That position may be incidental based on the laser diode and the infrared array sensor being disposed within a component aligner, such as any component aligner described in this description. In order to be able to determine a temperature of a target at a location where a laser dot generated by the laser pointer 114 appears on the target, the position of the laser diode relative to the infrared array sensor should be such that the laser dot would appear within a field-of-view of the infrared array sensor.

In accordance with at least some of the aforementioned implementations described in connection with the set 590, determining the one or more coordinates of the scaled thermal output in relation to the one or more coordinates of the scaled VLC output includes determining coordinates of one or more corner points of the scaled thermal output. The one or more coordinates can be used to determine where to display a field-of-view indicator corresponding to the scaled thermal output. The processor 102 can output the field-of-view indicator on the display 112 along with an output of the laser pointer 114 to allow a user to confirm that an output of the laser pointer 114 can be captured in a visible light image within the field-of-view indicator. If the output of the laser pointer 114 is not displayed within the field-of-view indicator, a manufacturer of the computing system 100 can modify the computing system 100 so that the output of the laser pointer 114 can be captured in a visible light image within the field-of-view indicator.

In accordance with at least some of the aforementioned implementations described in connection with the set 590, a target of the scaled VLC output is a blackbody object.

In accordance with at least some of the aforementioned implementations described in connection with the set 590, the output of the VLC and the output of the infrared array sensor are captured at a first operating distance. As an example, the first operating distance consists of a near operating distance. As another example, the first operating distance consists of a far operating distance. In at least some implementations, the near operating distance is a distance between 0.3 and 0.9 meters, and the far operating distance is a distance beyond 0.9 meters. Other examples of the near and/or far operating distances are possible.

In accordance with at least some of the aforementioned implementations described in connection with the set 590, the alignment marker includes a cross-hair.

In accordance with at least some of the aforementioned implementations described in connection with the set 590, the infrared array sensor includes a thermopile array, a long wave infrared sensor array, a short wave infrared sensor array, or a bolometer. The bolometer can, but need not necessarily, be a microbolometer.

In accordance with at least some of the aforementioned implementations described in connection with the set 590, the system further includes a substrate and a component aligner. The component aligner is affixed to the substrate. The infrared array sensor and the laser diode are disposed within the component aligner. A component disposed within the component aligner can be positioned within the component aligner before or after the component aligner is affixed to the substrate.

In accordance with at least some of the aforementioned implementations described in connection with the set 590, capturing the output of the VLC and the output of the infrared array sensor includes capturing, with the system located at a first distance from the target, a first output of the VLC and a first output of the infrared array sensor, respectively. Moreover, the one or more coordinates of the output of the infrared array sensor to calibrate the system are used for operation when the system is located at the first distance from a second target. In accordance with this implementation, the method includes capturing a second output of the VLC and a second output of the infrared array sensor using the system located at a second distance from the target. The method also includes scaling the second output of the VLC and the second output of the infrared array sensor to generate a second scaled VLC output and a second scaled thermal output. Additionally, the method includes aligning the second scaled VLC output to the second scaled thermal output to generate a second aligned image based on the second scaled VLC output and the second scaled thermal output. The method also includes determining, based on the second aligned image, one or more coordinates of the second scaled thermal output in relation to one or more coordinates of the second scaled VLC output. Also, the method includes outputting, by the laser diode, a second light beam to produce a second laser dot on the target and then capturing a second further output of the VLC. The second further output of the VLC includes a representation of the second laser dot. Even more, the method includes displaying, on the display, the second further output of the VLC, and the alignment marker. Furthermore, the method also includes shifting the alignment marker or the representation of the second laser dot so that the alignment marker and the representation of the second laser dot are shown at a second common position on the display. Furthermore still, the method also includes determining one or more coordinates of the second output of the infrared array sensor based on one or more coordinates of the second further output of the VLC where the alignment marker and the representation of the second laser dot are shown at the second common position on the display. Finally, the method also includes storing in the memory the one or more coordinates of the second output of the infrared array sensor to calibrate the system for operation when the system is located at the second distance from the second target. In accordance with this implementation, the first distance differs from the second distance.

In accordance with at least some of the aforementioned implementations described in connection with the set 590, displaying the identifier includes displaying an outline or matrix associated with the output of the infrared array sensor, the scaled thermal output, or both the output of the infrared array sensor and the scaled thermal output.

In accordance with at least some of the aforementioned implementations described in connection with the set 590, the method also includes receiving directional input entered via a user control of the system. In accordance with this implementation, shifting the alignment marker or the representation of the laser dot onto the other of the alignment marker and the representation of the laser dot is based on the directional input.

In accordance with at least some of the aforementioned implementations described in connection with the set 590, the method also includes determining a position of the representation of the laser dot on the display. In accordance with this implementation, shifting the alignment marker or the representation of the laser dot includes shifting the alignment marker so that the alignment marker is shown at the position of the representation of the laser dot on the display. In at least some of these implementations, determining the position of the representation of the laser dot on the display occurs programmatically.

As an example, determining the position of the representation of the laser dot on the display programmatically can include determining a large contrast in pixel values representing the position of the representation of the laser dot with respect to pixel values representing all other pixels of the display. In a particular implementation, a white target can be disposed on the table 902 or the stand 908. The white target can, but need not necessarily, be metallic, plastic, or paper-based. The laser pointer 114 can generate a laser dot on the white target. The processor 102 can detect the laser dot within a visible light image of the white target and the laser dot by detecting pixels that have certain levels of an RGB color space.

For at least some implementations, the RGB color space uses the values (0, 0, 0) to represent the color black, and the values (255, 255, 255) to represent the color white. The numbers within those parentheses represent the following components of the RGB color space: (red component, green component, and blue component).

As an example, the processor 102 can detect the pixels that have certain levels of the example RGB color space using the following equations:

Color-component$_1$>Color-threshold$_1$   Equation 1:

Color-component$_1$−Color-component$_2$>Color-threshold$_2$; and   Equation 2:

Color-component$_1$−Color-component$_3$>Color-threshold$_3$.   Equation 3:

For an implementation in which the laser dot is red, the Color-component$_1$ is red, the Color-component$_2$ is green, and the Color-component$_3$ is blue. Moreover, the Color-threshold$_1$ is large enough to be considered to include a sufficient level of the Color-component$_1$. As an example, the Color-threshold$_1$ can be a value of 80 as used within the example RGB color space. The Color-threshold$_2$ and the Color-threshold$_3$ can be an equivalent value, such as a value of 40 as used within the example RGB color space. One or more of the Color-threshold$_1$, Color-threshold$_2$ and Color-threshold$_3$ can be adjusted based on ambient light conditions of an environment in which the detection of the laser dot is performed.

With reference to FIG. 66, the representation of the laser dot 716 can represent a center of a red laser dot appearing on the white target such that at least the pixels 742, 743, 744, 745 have color components that meet Equation 1, Equation 2, and Equation 3 and example Color-threshold$_1$, Color-threshold$_2$, and Color-threshold$_3$ described above. As an example, the color components in the RGB space for the pixels 742, 743, 744, 745 can be (240, 20, 15), (243, 18, 16), (239, 19, 17), (244, 20, 16), respectively. In this case, the processor 102 can detect a center pixel or pixels that represent a center of the red laser dot appearing on the white target and then determine an amount of shifting left, right, up, and/or down required to shift the output of the VLC so that the laser dot in the output of the VLC is displayed at the center of the display 112.

In accordance with at least some of the aforementioned implementations described in connection with the set 590, the method also includes removably affixing the system to an alignment fixture configured to hold the system a particular distance from a target including a blackbody.

Next, FIG. 60 shows an alignment fixture 900 of an example implementation that can, but need not necessarily, be used to perform at least one function of the set 590. The alignment fixture 900 includes a table 902, a jig 904, a jig track 906, a stand 908, a stand 910, a blackbody calibrator 912 positioned on the stand 910, and a blackbody calibrator 914 positioned on the stand 908. The blackbody calibrator 912, 914 includes a blackbody source or a near ideal blackbody source. The blackbody source can include a target plate. The blackbody calibrator 912, 914 can, but need not necessarily, include a target plate window 916 that provides visual access to the target plate, a display 918, user controls 920, and/or a power cord 922. The user controls 920 for each blackbody calibrator 912, 914 can be used to set or modify a setpoint temperature desired for a target plate of each blackbody calibrator 912, 914.

The jig 904 is configured to hold a computing system to be calibrated, such as the imaging system 10 and/or the computing system 100. The jig track 906 is configured to move the jig 904 and the computing system to be calibrated in relation to the blackbody calibrator 912, 914. A distance 924 between the blackbody calibrator 914 and the jig 904 is a first calibration distance and a distance 926 between the blackbody calibrator 912 and the jig 904 is a second calibration distance. In an implementation in which the alignment fixture 900 includes two blackbodies, the distance 924 can be referred to as a near distance and the distance 926 can be referred to as a far distance. In other implementations, the alignment fixture 900 includes a different number of blackbodies. The jig track 906 can be configured to position the computing system to be calibrated to have a line-of-sight of each blackbody of the alignment fixture 900.

Figure 67:
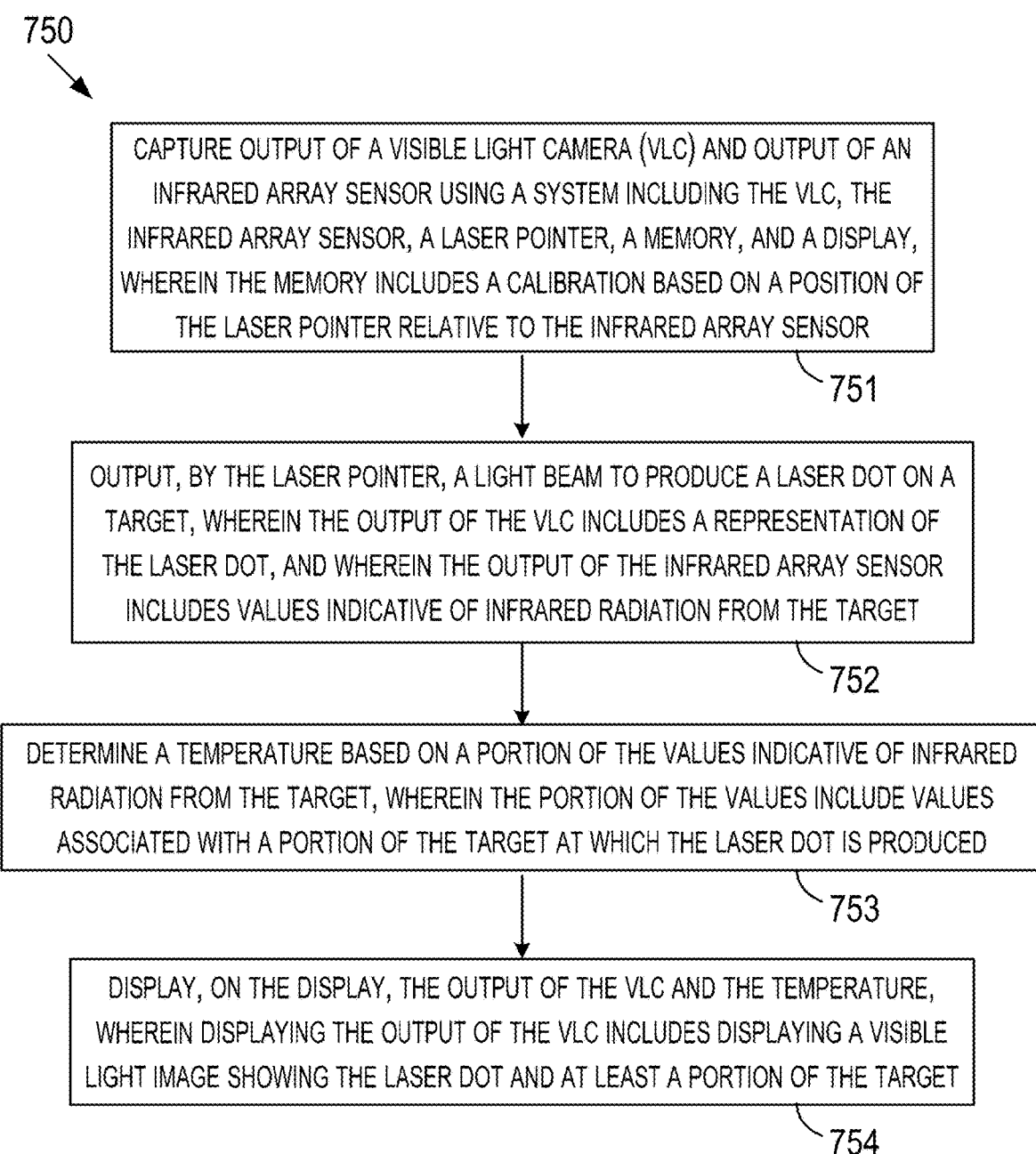
FIG. 67 depicts a flow chart showing an example method in accordance with the example implementations described herein.

Next, FIG. 67 shows a flowchart depicting a set of functions 750 (or more simply "the set 750") that can be carried out in accordance with the example implementations described in this description. The set 750 includes the functions shown in block 751 through block 754. The following description of the set 750 includes references to elements shown in other figures described in this description, but the functions of the set 750 are not limited to being carried out only by the referenced elements. A variety of methods can be performed using all of the functions shown in the set 750 or any proper subset of the functions shown in the set 750. Any of those methods can be performed with other functions such as one or more of the other functions described in this description. At least a portion of two or more functions of the set 750 can occur simultaneously.

Block 751 includes capturing output of the VLC 108 and output of the infrared array sensor 106 using a system including the VLC 108, the infrared array sensor 106, the laser pointer 114, the memory 104, and the display 112. The memory 104 includes a calibration based on a position of the laser diode relative to the infrared array sensor. In accordance with the example implementations, the calibration stored in the memory can include the coordinates of the output of the infrared array sensor discussed above with respect to block 599.

In at least some implementations, the processor 102 scales the output of the VLC 108 to produce a scaled VLC output and scales the output of the infrared array sensor to produce a scaled output of the infrared array sensor 106. As described elsewhere in this description, scaling of the output of the VLC 108 can include bi-linear scaling and decimation, and scaling of the output of the infrared array sensor 106 can include bi-linear scaling.

In at least some implementations, the processor 102 shifts the scaled VLC output so that the scaled VLC output is aligned with the scaled output of the infrared array sensor 106. That shifting allows for the display 112 to display a blended image where the target shown in the visible light image is aligned with a representation of the target shown in the output of the infrared array sensor.

In at least some implementations, the processor 102 shifts the scaled VLC output based on a prior alignment of an output of the laser pointer 114 and an alignment marker overlaid on the display 112 during an alignment procedure of the imaging system 10 and/or the computing system 100. The processor 102 can refer to values stored in the memory 104, where the values are indicative of how many pixels the scaled VLC output should be shifted in a positive or negative x-direction and/or a positive or negative y-direction. As indicated elsewhere in this description, those values can be stored as uint16 unsigned integers.

Next, block 752 includes outputting, by the laser pointer 114, a light beam to produce a laser dot on a target. The target can be any object whose temperature is to be measured. The laser dot can cover at least a portion of a surface area of the target. The laser dot on the target can, but need not necessarily, be circular. The output of the VLC 108 includes a representation of the laser dot. In some implementations, the representation of the laser dot covers a square area including one or more pixels. In at least some of those implementations, the laser dot can, but need not necessarily, be two, three, four, five, six, seven or eight pixels wide. Other example widths of the laser dot represented in the output of the VLC 108 are also possible.

In accordance with a particular example implementation in which the infrared array sensor 106 includes a 32×32 sensor and the output of the infrared array sensor 106 is up-scaled by five and a size of the laser dot in a displayed representation of the laser dot is 8×8 pixels. In such implementation, the laser dot is represented by 64 pixels from the scaled VLC output. Those 64 pixels correspond to 64 pixels of the scaled output of the infrared array sensor 106. Since the output of infrared array sensor 106 is up-scaled by five, a single pixel of the infrared array sensor 106 covers the laser dot best. The output of the infrared array sensor 106 includes values indicative of infrared radiation from the target.

Next, block 753 includes determining a temperature based on a portion of the values indicative of infrared radiation from the target. The portion of the values includes values associated with a portion of the target at which the laser dot is produced. In accordance with at least some implementations, determining the temperature includes determining an average value of the portion of the values indicative of infrared radiations from the target, such as infrared radiation from a surface of the target. As an example, the average value can include a mean value, a mode value, or a median value.

In a particular implementation, the laser dot covers a square area that pertains to a number of pixels in the infrared array sensor 106. As an example, the laser dot covers five to six pixels from the up-scaled output of the infrared array sensor 106. Those five to six pixels could pertain to a single thermal sensor of the infrared array sensor 106. Alternatively, those pixels could indicate the laser dot is between two sensors of the infrared array sensor 106. In order to improve the results of determining the temperature, multiple pixels around a center of the laser dot are sampled and used to determine an average temperature of those multiple pixels, or a subset of those multiple pixels, such as an average temperature based on the two pixels having the highest values. Temperature values based on other pixels of the infrared array sensor 106 are discarded with respect to determining the temperature.

Next, block 754 includes displaying, on the display 112, the output of the VLC 108 and the temperature. Displaying the output of the VLC 108 includes displaying a visible light image showing the laser dot and at least a portion of the target. In at least some implementations, the output of the VLC 108 includes a scaled output of the VLC, where the scaled output of the VLC includes an output scaled using bi-linear scaling and decimation and the scaled output of the VLC has been aligned with a scaled output of the infrared array sensor 106 as described elsewhere in this description even though the display 112 does not display a blended image for block 754. In those or in other implementations, the output of the VLC 108 displayed on the display 112 is shifted so that the laser dot is shown as being centered horizontally and vertically in the display 112.

Figure 63:
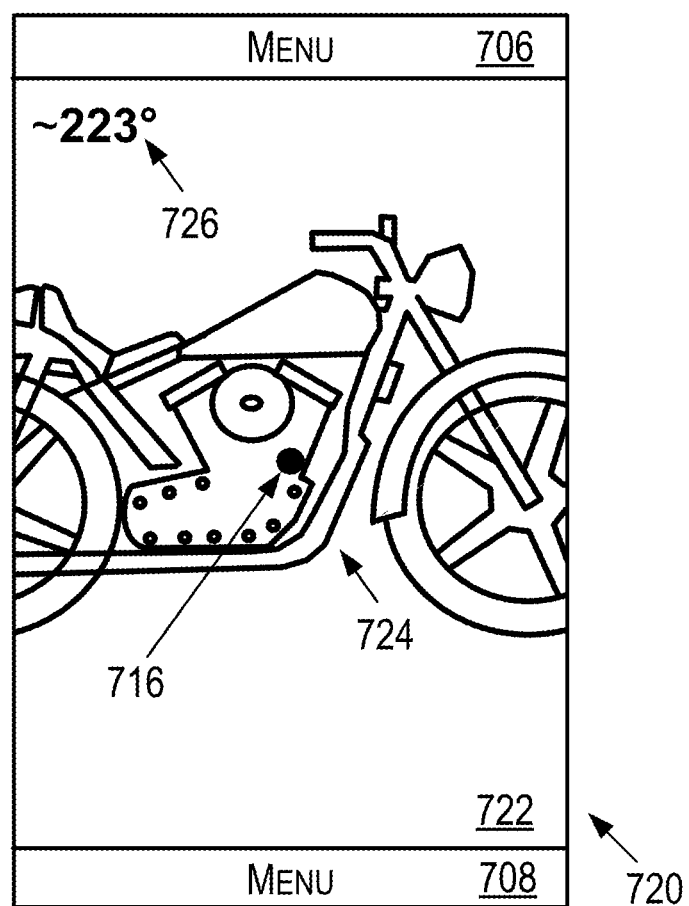
FIG. 63 shows a screen shot of an imaging system display during a laser mode in accordance with the example implementations described herein.

Turning to FIG. 63, a screen shot 720 of the display 112 in accordance with the example implementations is shown. The screen shot 720 includes the menus 706, 708, an image 722 output by the VLC 1018, and the laser dot 716. The laser dot 716 is shown on the screen shot 720 showing a target 724. The target 724 can, but need not necessarily, be a vehicle, such as a motorcycle, or a non-vehicle target. The screen shot 720 also includes a temperature 726, such as a determined temperature based on a portion of the values indicative of infrared radiation from the target 724. The processor 102 can shift the output of the VLC 108 such that the laser dot 716 is shown in a center of the display 112.

In accordance with at least some of the aforementioned implementations described in connection with the set 750, the system also includes a substrate 120 and a component aligner 122. The component aligner 122 is affixed to the substrate 120. The infrared array sensor 106 and the laser pointer 114 are disposed within the component aligner 122.

In accordance with at least some of the aforementioned implementations described in connection with the set 750, each value of the portion of values indicative of infrared radiation from the target is associated with a respective pixel of the output of the infrared array sensor.

In accordance with at least some of the aforementioned implementations described in connection with the set 750, the method also includes stopping the outputting of the light beam, and displaying, on the display when the light beam is not being output, a blended output based on the output of the VLC and the output of the infrared array sensor. Displaying the blended output based on the output of the VLC and the output of the infrared array sensor includes producing a non-opaque output in which the output of the VLC or the output of the infrared array sensor is less than one hundred percent opaque.

In accordance with at least some of the aforementioned implementations described in connection with the set 750, the method also includes determining a distance between the system and the target. The calibration is further based on distance between the system and the target. In accordance with at least some of those embodiments, determining the distance between the system and the target includes determining a user input indicative of the distance between the system and the target. As an example, the user input can include a selection of a near operating distance or a selection of a far operating distance.

In accordance with at least some of the aforementioned implementations described in connection with the set 750, the calibration based on the position of the laser diode relative to the infrared array sensor is indicative of one or more coordinates of the output of the infrared array sensor determined by the an additional set of functions. The additional set of functions includes capturing output of the VLC and output of the infrared array sensor using the system. The additional set of functions includes scaling the output of the VLC and the output of the infrared array sensor to generate a scaled VLC output and a scaled thermal output. The additional set of functions also includes aligning the scaled VLC output to the scaled thermal output to generate an aligned image based on the scaled VLC output and the scaled thermal output. The additional set of functions includes determining, based on the aligned image, one or more coordinates of the scaled thermal output in relation to one or more coordinates of the scaled VLC output. Moreover, the additional set of functions includes outputting, by the laser diode, a light beam to produce a laser dot on a target and then capturing a further output of the VLC. The further output of the VLC includes a representation of the laser dot. Furthermore, the additional set of functions includes displaying, on the display, the further output of the VLC, and an alignment marker. Furthermore still, the additional set of functions includes shifting the alignment marker or the representation of the laser dot so that the alignment marker and the representation of the laser dot are shown at a common position on the display. Finally, the additional set of functions includes determining the one or more coordinates of the output of the infrared array sensor based on one or more coordinates of the further output of the VLC where the alignment marker and the representation of the laser dot are shown at the common position on the display.

In accordance with at least some of the aforementioned implementations described in connection with the set 750, the method also includes shifting the output of the VLC so that displaying the output of the VLC includes displaying the representation of the laser dot in a center of the display 112. In at least some of those implementations, shifting the output of the VLC is based on a second calibration stored in the memory 104. The second calibration indicates a quantity of pixels to move the output of the VLC horizontally and a quantity of pixels to move the output of the VLC vertically. The second calibration can be determined by execution of program instructions that count the quantity of pixels to move the output of the VLC horizontally and the quantity of pixels to move the output of the VLC vertically such that a representation of the laser dot and an alignment marker are shown at a common position on the display. In accordance with example implementation shown in FIG. 66, the second calibration can be six pixels horizontally to the right and six pixels vertically downward.

VI. Example Vehicle

In accordance with an example implementation, a component aligner can be included within a vehicle component (i.e., a component within a vehicle). A vehicle component can include a computing system, such as an electronic control unit (ECU) manufactured by and/or for an original equipment manufacturer (OEM) of a vehicle. A vehicle component can include a sensor manufactured by or for an original equipment manufacturer (OEM) of a vehicle. In accordance with another example implementation, a component aligner can be included with a vehicle service tool (e.g., a vehicle scan tool or an imaging system).

A vehicle is a mobile machine that can be used to transport a person, people, and/or cargo. A vehicle can, but need not necessarily, be driven and/or otherwise guided along a path (e.g., a paved road or otherwise) on land, in water, in the air, and/or outer space. A vehicle can, but need not necessarily, be wheeled, tracked, railed, and/or skied. A vehicle can, but need not necessarily, include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a drone, and/or a farm machine. A vehicle can, but need not necessarily, include and/or use any appropriate voltage and/or current source, such as a battery, an alternator, a fuel cell, and the like, providing any appropriate current and/or voltage, such as about 12 volts, about 42 volts, and the like. A vehicle can, but need not necessarily, include and/or use any system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. A vehicle can, but need not necessarily, include an ECU, a data link connector (DLC), and a vehicle communication bus that connects the DLC to the ECU. A vehicle can be configured to operate as an autonomous vehicle.

Some vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. An example Y shown in the drawings is 2019/Toyota/Camry/4Cyl, in which "2019" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Mich. In some example implementations, the tag array(s) associated with a content file include one or more characteristic identifiers of a vehicle.

Some vehicles, such as automobiles, are associated with a unique vehicle identification number (VIN). Some VIN include seventeen alpha-numeric characters. Some of the characters for at least some VIN represent a YMME or a YMM. In some instances, a vehicle includes a one dimensional bar code indicative of a VIN associated with that vehicle. In some example implementations, the tag array(s) associated with a content file include one or more VIN characters and data representative of positions of the VIN characters in a VIN.

A vehicle communication bus within a vehicle can include one or more conductors (e.g., copper wire conductors) and/or can be wireless. As an example, a vehicle communication bus can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle.

The DLC can include an on-board diagnostic (OBD) connector, such as an OBD II connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Aptiv LLC of Dublin, Ireland. The DLC can include conductor terminals that connect to a conductor in a vehicle. For instance, the DLC can include connector terminals that connect to conductors that respectively connect to positive and negative terminals of a vehicle battery. The DLC can include one or more conductor terminals that connect to a conductor of the vehicle communication bus such that the DLC is operatively connected to the ECU. The data carried in a VDM can, but need not necessarily, include a parameter identifier (PID) and data (PID data) parameters associated with the PID. The data carried in the VDM can, but need not necessarily, include a diagnostic trouble code (DTC).

An ECU can control various aspects of vehicle operation and/or components within a vehicle. For example, the ECU can include a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a DTC to a particular state (such as active or history).

VII. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

This application incorporates by reference U.S. patent application Ser. No. 16/459,233, which was filed on Jul. 1, 2019, and which is entitled "Apparatus with component aligner".

This application incorporates by reference U.S. patent application Ser. No. 16/459,315, which was filed on Jul. 1, 2019, and which is entitled "Apparatus with component aligner".

This application incorporates by reference U.S. patent application Ser. No. 16/459,340, which was filed on Jul. 1, 2019, and which is entitled "Method and system for calibrating imaging system".

Implementations of the present disclosure may thus relate to one of the enumerated example embodiments (EEEs) listed below.

EEE 1 is a method comprising: capturing output of a visible light camera (VLC) and output of an infrared array sensor using a system including the VLC, the infrared array sensor, a laser pointer, a memory, and a display. The method includes scaling the output of the VLC and the output of the infrared array sensor to generate a scaled VLC output and a scaled thermal output. The method also includes aligning the scaled VLC output to the scaled thermal output to generate an aligned image based on the scaled VLC output and the scaled thermal output. The method also includes determining one or more alignment values based on the aligned image. The method further includes outputting, by the laser pointer, a light beam to produce a laser dot on a target and then capturing a further output of the VLC. The further output of the VLC includes a representation of the laser dot.

The method includes displaying, on the display, the further output of the VLC, and an alignment marker. Furthermore, the method includes shifting the alignment marker or the representation of the laser dot so that the alignment marker and the representation of the laser dot are shown at a common position on the display. Furthermore still, the method includes determining one or more coordinates of the output of the infrared array sensor based on one or more coordinates of the further output of the VLC where the alignment marker and the representation of the laser dot are shown at the common position on the display. Finally, the method includes storing in the memory the one or more coordinates of the output of the infrared array sensor to calibrate the system based on a position of the laser pointer relative to the infrared array sensor.

EEE 2 is the method of EEE 1, wherein determining the one or more coordinates of the scaled thermal output in relation to the one or more coordinates of the scaled VLC output includes determining coordinates of one or more corner points of the scaled thermal output.

EEE 3 is the method of EEE 1 or 2, wherein a target of the scaled VLC output is a blackbody object.

EEE 4 is the method of any one EEE 1 to 3, wherein the output of the VLC and the output of the infrared array sensor are captured at a first operating distance.

EEE 5 is the method of EEE 4, wherein the first operating distance consists of a near operating distance.

EEE 6 is the method of EEE 4, wherein the first operating distance consists of a far operating distance.

EEE 7 is the method of anyone of EEE 1 to 6, wherein the alignment marker includes a cross-hair.

EEE 8 is the method of any one of EEE 1 to 7, wherein the infrared array sensor includes a thermopile array, a long wave infrared sensor array, a short wave infrared sensor array, a bolometer, or a microbolometer.

EEE 9 is the method of any one of EEE 1 to 8, wherein the system further includes a substrate and a component aligner. The component aligner is affixed to the substrate. The infrared array sensor and the laser pointer are disposed within the component aligner.

EEE 10 is the method of any one of EEE 1 to 9, further comprising: displaying, on the display, an identifier corresponding to a field-of-view of the infrared array sensor for confirming the representation of the laser dot is shown with an area defined by the identifier.

EEE 11 is the method of any one of EEE 1 to 10, wherein capturing the output of the VLC and the output of the infrared array sensor includes capturing, with the system located at a first distance from the target, a first output of the VLC and a first output of the infrared array sensor, respectively. The one or more coordinates of the output of the infrared array sensor to calibrate the system are used for operation when the system is located at the first distance from a second target. The method further includes: capturing a second output of the VLC and a second output of the infrared array sensor using the system located at a second distance from the target. The method further includes scaling the second output of the VLC and the second output of the infrared array sensor to generate a second scaled VLC output and a second scaled thermal output. The method also includes aligning the second scaled VLC output to the second scaled thermal output to generate a second aligned image based on the second scaled VLC output and the second scaled thermal output. The method further includes determining, based on the second aligned image, one or more coordinates of the second scaled thermal output in relation to one or more coordinates of the second scaled VLC output. The method also includes outputting, by the laser pointer, a second light beam to produce a second laser dot on the target and then capturing a second further output of the VLC. The second further output of the VLC includes a representation of the second laser dot. The method also includes displaying, on the display, the second further output of the VLC, and the alignment marker. The method also includes shifting the alignment marker or the representation of the second laser dot so that the alignment marker and the representation of the second laser dot are shown at a second common position on the display. Furthermore, the method includes determining one or more coordinates of the second output of the infrared array sensor based on one or more coordinates of the second further output of the VLC where the alignment marker and the representation of the second laser dot are shown at the second common position on the display. Furthermore still, the method includes storing in the memory the one or more coordinates of the second output of the infrared array sensor to calibrate the system for operation when the system is located at the second distance from the second target. The first distance differs from the second distance.

EEE 12 is the method of EEE 11, further comprising: displaying, on the display, an identifier corresponding to a field-of-view of the infrared array sensor for confirming the representation of the second laser dot is shown with an area defined by the identifier.

EEE 13 is the method of EEE 12, wherein displaying the identifier includes displaying an outline or matrix associated with the output of the infrared array sensor, the scaled thermal output, or both the output of the infrared array sensor and the scaled thermal output.

EEE 14 is the method of any one of EEE 1 to 13, further comprising receiving directional input entered via a user control of the system. Shifting the alignment marker or the representation of the laser dot onto the other of the alignment marker and the representation of the laser dot is based on the directional input.

EEE 15 is the method of any one of EEE 1 to 14, further comprising determining a position of the representation of the laser dot on the display. Shifting the alignment marker or the representation of the laser dot includes shifting the alignment marker so that the alignment marker is shown at the position of the representation of the laser dot on the display.

EEE 16 is the method of EEE 15, wherein determining the position of the representation of the laser dot on the display occurs programmatically.

EEE 17 is the method of EEE 16, wherein determining the position of the representation of the laser dot on the display programmatically includes determining a large contrast in pixel values representing the position of the representation of the laser dot with respect to pixel values representing all other pixels of the display.

EEE 18 is the method of EEE 16, wherein the pixels on the display have a first color component of an red-green-blue (RGB) color space, a second color component of the RGB color space, and a third color component of the RGB color space, wherein determining the position of the representation of the laser dot on the display programmatically includes determining which pixels on the display have (1) a value of the first color component is above a first color threshold value, (2) the value of the first color component minus a value of the second color component is greater than a second color threshold, and (3) the value of the first color component minus a color value of the third color component is greater than a third color threshold. Optionally, the second color threshold equals the third color threshold.

EEE 19 is the method of any one of EEE 1 to 18, further comprising: removably affixing the system to an alignment fixture configured to hold the system a particular distance from a target including a blackbody.

EEE 20 is a computing system comprising one or more processors configured to: capture output of a VLC and output of an infrared array sensor using a system including the VLC, the infrared array sensor, a laser pointer, a memory, and a display. The one or more processors are also configured to scale the output of the VLC and the output of the infrared array sensor to generate a scaled VLC output and a scaled thermal output. The one or more processors are also configured to align the scaled VLC output to the scaled thermal output to generate an aligned image based on the scaled VLC output and the scaled thermal output. The one or more processors are also configured to determine one or more alignment values based on the aligned image. The one or more processors are also configured to output, by the laser pointer, a light beam to produce a laser dot on a target and then capturing a further output of the VLC. The further output of the VLC includes a representation of the laser dot. The one or more processors are also configured to display, on the display, the further output of the VLC, and an alignment marker. The one or more processors are also configured to shift the alignment marker or the representation of the laser dot so that the alignment marker and the representation of the laser dot are shown at a common position on the display. The one or more processors are also configured to determine one or more coordinates of the output of the infrared array sensor based on one or more coordinates of the further output of the VLC where the alignment marker and the representation of the laser dot are shown at the common position on the display. The one or more processors are also configured to store in the memory the one or more coordinates of the output of the infrared array sensor to calibrate the system based on a position of the laser pointer relative to the infrared array sensor.

EEE 21 is a computing system configured to perform the method of any one of EEE 1 to 19.

EEE 22 is a non-transitory computer readable medium having stored therein instructions executable by one or more processors to cause a computing system to perform functions comprising capturing output of a visible light camera (VLC) and output of an infrared array sensor using a system including the VLC, the infrared array sensor, a laser pointer, a memory, and a display. The functions further comprise scaling the output of the VLC and the output of the infrared array sensor to generate a scaled VLC output and a scaled thermal output. The functions further comprise aligning the scaled VLC output to the scaled thermal output to generate an aligned image based on the scaled VLC output and the scaled thermal output. The functions further comprise determining one or more alignment values based on the aligned image. The functions further comprise outputting, by the laser pointer, a light beam to produce a laser dot on a target and then capturing a further output of the VLC. The further output of the VLC includes a representation of the laser dot. The functions further comprise displaying, on the display, the further output of the VLC, and an alignment marker. The functions further comprise shifting the alignment marker or the representation of the laser dot so that the alignment marker and the representation of the laser dot are shown at a common position on the display. The functions further comprise determining one or more coordinates of the output of the infrared array sensor based on one or more coordinates of the further output of the VLC where the alignment marker and the representation of the laser dot are shown at the common position on the display. The functions further comprise storing in the memory the one or more coordinates of the output of the infrared array sensor to calibrate the system based on a position of the laser pointer relative to the infrared array sensor.

EEE 23 is a non-transitory computer readable medium having stored therein instructions executable by one or more processors to cause a computing system to perform the method of any one of EEE 1 to 19.

EEE 24 is a method comprising: capturing output of a visible light camera (VLC) and output of an infrared array sensor using a system including the VLC, the infrared array sensor, a laser pointer, a memory, and a display. The memory includes a calibration based on a position of the laser pointer relative to the infrared array sensor. The method includes outputting, by the laser pointer, a light beam to produce a laser dot on a target, wherein the output of the VLC includes a representation of the laser dot. The output of the infrared array sensor includes values indicative of infrared radiation from the target. The method also includes determining a temperature based on a portion of the values indicative of infrared radiation from the target. The portion of the values includes values associated with a portion of the target at which the laser dot is produced. The method also includes displaying, on the display, the output of the VLC and the temperature, wherein displaying the output of the VLC includes displaying a visible light image showing the laser dot and at least a portion of the target.

EEE 25 is the method of EEE 24, wherein each value of the portion of the values indicative of infrared radiation from the target is associated with a respective pixel of the output of the infrared array sensor.

EEE 26 is the method of EEE 24 or 25, wherein determining the temperature includes determining an average value of the portion of the values indicative of infrared radiation from the target.

EEE 27 is the method of any one of EEE 24 to 26, wherein determining the temperature includes sampling four pixels around a center of the representation of the laser dot and determining an average value of two of the four pixels.

EEE 28 is the method of EEE 27, wherein the two of the four pixels have values greater than two other pixels of the four pixels.

EEE 29 is the method of any one of EEE 24 to 28, wherein the system further includes a substrate and a component aligner. The component aligner is affixed to the substrate. The infrared array sensor and the laser pointer are disposed within the component aligner.

EEE 30 is the method of any one of EEE 24 to 29, further comprising: stopping the outputting of the light beam, and displaying, on the display when the light beam is not being output, a blended output based on the output of the VLC and the output of the infrared array sensor. Displaying the blended output based on the output of the VLC and the output of the infrared array sensor includes producing a non-opaque output in which the output of the VLC or the output of the infrared array sensor is less than one hundred percent opaque.

EEE 31 is the method of any one of EEE 24 to 30, further comprising determining a distance between the system and the target. The calibration is further based on distance between the system and the target.

EEE 32 is the method of EEE 24, wherein determining the distance between the system and the target includes determining a user input indicative of the distance between the system and the target.

EEE 33 is the method of EEE 32, wherein the user input includes a selection of a near operating distance or a selection of a far operating distance.

EEE 34 is the method of any one of EEE 24 to 33, wherein the calibration based on the position of the laser pointer relative to the infrared array sensor is indicative of one or more coordinates of the output of the infrared array sensor.

EEE 35 is the method of EEE 34 wherein the one or more coordinates of the output of the infrared array sensor are determined by: (i) capturing output of the VLC and output of the infrared array sensor using the system; scaling the output of the VLC and the output of the infrared array sensor to generate a scaled VLC output and a scaled thermal output; aligning the scaled VLC output to the scaled thermal output to generate an aligned image based on the scaled VLC output and the scaled thermal output, (ii) determining, based on the aligned image, one or more coordinates of the scaled thermal output in relation to one or more coordinates of the scaled VLC output, (iii) outputting, by the laser pointer, a light beam to produce a laser dot on a target and then capturing a further output of the VLC, wherein the further output of the VLC includes a representation of the laser dot, (iv) displaying, on the display, the further output of the VLC, and an alignment marker, (v) shifting the alignment marker or the representation of the laser dot so that the alignment marker and the representation of the laser dot are shown at a common position on the display, and (vi) determining the one or more coordinates of the output of the infrared array sensor based on one or more coordinates of the further output of the VLC where the alignment marker and the representation of the laser dot are shown at the common position on the display.

EEE 36 is the method of EEE 35, wherein scaling the output of the VLC includes bi-linear scaling and decimation and scaling the output of the infrared array sensor include bi-linear scaling.

EEE 37 is the method of EEE 35, wherein capturing the output of the infrared array sensor includes capturing infrared radiation emitted by a blackbody calibration unit.

EEE 38 is the method of EEE 34, wherein the one or more coordinates of the output of the infrared array sensor include a row coordinate of the infrared array sensor and a column coordinate of the infrared array sensor.

EEE 39 is the method EEE 34 wherein the one or more coordinates of the output of the infrared array sensor include a sensor number assigned to a sensor of the infrared array sensor.

EEE 40 is the method of any one of EEE 24 to 39, further comprising: shifting the output of the VLC so that displaying the output of the VLC includes displaying the representation of the laser dot in a center of the display.

EEE 41 is the method of EEE 40, wherein shifting the output of the VLC is based on a second calibration stored in the memory. The second calibration indicates a quantity of pixels to move the output of the VLC horizontally and a quantity of pixels to move the output of the VLC vertically. The second calibration is determined by execution of program instructions that count the quantity of pixels to move the output of the VLC horizontally and the quantity of pixels to move the output of the VLC vertically such that a representation of the laser dot and an alignment marker are shown at a common position on the display.

EEE 42 is a computing system comprising: one or more processors configured to capture output of a VLC and output of an infrared array sensor using a system including the VLC, the infrared array sensor, a laser pointer, a memory, and a display. The memory includes a calibration based on a position of the laser pointer relative to the infrared array sensor. The one or more processors are also configured to output, by the laser pointer, a light beam to produce a laser dot on a target. The output of the VLC includes a representation of the laser dot. The output of the infrared array sensor includes values indicative of infrared radiation from the target. The one or more processors are also configured to determine a temperature based on a portion of the values indicative of infrared radiation from the target. The portion of the values includes values associated with a portion of the target at which the laser dot is produced. The one or more processors are also configured to display, on the display, the output of the VLC and the temperature. Displaying the output of the VLC includes displaying a visible light image showing the laser dot and at least a portion of the target.

EEE 43 is a computing system configured to perform the method of any one of EEE 24 to 41.

EEE 44 is a non-transitory computer readable medium having stored therein instructions executable by one or more processors to cause a computing system to perform a set of functions. The set of functions includes capturing output of a visible light camera (VLC) and output of an infrared array sensor using a system including the VLC, the infrared array sensor, a laser pointer, a memory, and a display. The memory includes a calibration based on a position of the laser pointer relative to the infrared array sensor. The set of functions includes outputting, by the laser pointer, a light beam to produce a laser dot on a target, wherein the output of the VLC includes a representation of the laser dot. The output of the infrared array sensor includes values indicative of infrared radiation from the target. The set of functions includes determining a temperature based on a portion of the values indicative of infrared radiation from the target. The portion of the values includes values associated with a portion of the target at which the laser dot is produced. The set of functions also includes displaying, on the display, the output of the VLC and the temperature. Displaying the output of the VLC includes displaying a visible light image showing the laser dot and at least a portion of the target.

EEE 45 is a non-transitory computer readable medium having stored therein instructions executable by one or more processors to cause a computing system to perform the method of any one of EEE 24 to 41.

What is claimed is:
1. A method comprising:
  capturing output of a visible light camera (VLC) and output of an infrared array sensor using a system including the VLC, the infrared array sensor, a laser pointer, a memory, a substrate, and a display, wherein the VLC, the infrared array sensor and the laser pointer are attached to the substrate, and a lens of the VLC and a lens of the infrared array sensor are fixed in place with respect to the substrate;
  scaling the output of the VLC and the output of the infrared array sensor using one or more scaling values to generate a scaled VLC image output and a scaled thermal image output;
  aligning the scaled VLC image output to the scaled thermal image output to generate an aligned image based on the scaled VLC image output and the scaled thermal image output;

determining one or more alignment values used to generate the aligned image and pixels of the VLC that correspond to respective pixels of the infrared array sensor;

storing the one or more scaling values and the one or more alignment values in the memory for use in scaling and aligning subsequent output of the VLC and the infrared array sensor;

outputting, by the laser pointer, a light beam to produce a laser dot on a target;

displaying, on the display, an alignment marker and the scaled VLC image output while the scaled VLC image output includes a representation of the laser dot;

shifting the alignment marker without shifting the scaled VLC image output and without shifting a field of view of the infrared array sensor so that the alignment marker and the representation of the laser dot are shown at a common position on the display;

determining one or more pixels of the infrared array sensor that correspond to one or more pixels of the VLC where the alignment marker and the representation of the laser dot are shown at the common position on the display; and storing in the memory the one or more pixels of the infrared array sensor to calibrate the system based on a position of the laser pointer relative to the infrared array sensor for subsequent use in determining a temperature where a laser dot is shown on a target in the subsequent output of the VLC.

2. The method of claim 1, wherein determining the one or more pixels of the infrared array sensor includes determining coordinates of one or more corner points of the scaled thermal image output.

3. The method of claim 1, wherein a target of the scaled VLC image output is a blackbody object.

4. The method of claim 1, wherein the output of the VLC and the output of the infrared array sensor are captured at a first operating distance.

5. The method of claim 4, wherein:
the first operating distance consists of a near operating distance between the system and the target, and
the near operating distance is between 0.3 meters and 0.9 meters.

6. The method of claim 4, wherein;
the first operating distance consists of a far operating distance between the system and the target, and
the far operating distance is greater than 0.9 meters.

7. The method of claim 1, wherein the alignment marker includes a cross-hair.

8. The method of claim 1, wherein the infrared array sensor includes a thermopile array, a long wave infrared sensor array, a short wave infrared sensor array, a bolometer, or a microbolometer.

9. The method of claim 1,
wherein the system further includes a substrate and a component aligner,
wherein the component aligner is affixed to the substrate, and
wherein the infrared array sensor and the laser pointer are disposed within the component aligner.

10. The method of claim 1, further comprising:
displaying, on the display, an identifier corresponding to a field-of-view of the infrared array sensor for confirming the representation of the laser dot is shown with an area defined by the identifier.

11. The method of claim 1,
wherein capturing the output of the VLC and the output of the infrared array sensor includes capturing, with the system located at a first distance from the target, a first output of the VLC and a first output of the infrared array sensor, respectively,
wherein the one or more pixels of the infrared array sensor to calibrate the system are used for operation when the system is located at the first distance from a second target,
wherein the method further includes:
capturing a second output of the VLC and a second output of the infrared array sensor using the system located at a second distance from the target;
scaling the second output of the VLC and the second output of the infrared array sensor to generate a second scaled VLC image output and a second scaled thermal image output;
aligning the second scaled VLC image output to the second scaled thermal image output to generate a second aligned image based on the second scaled VLC image output and the second scaled thermal image output;
outputting, by the laser pointer, a second light beam to produce a second laser dot on the target and then capturing a second further output of the VLC, wherein the second further output of the VLC includes a representation of the second laser dot;
displaying, on the display, the second further output of the VLC, and the alignment marker;
shifting the alignment marker or the representation of the second laser dot so that the alignment marker and the representation of the second laser dot are shown at a second common position on the display;
determining one or more different pixels of the infrared array sensor that correspond to one or more pixels of the VLC where the alignment marker and the representation of the second laser dot are shown at the second common position on the display; and
storing in the memory the one or more different pixels of the infrared array sensor to calibrate the system for operation when the system is located at the second distance from the second target,
wherein the first distance differs from the second distance.

12. The method of claim 11, further comprising:
displaying, on the display, an identifier corresponding to a field-of-view of the infrared array sensor for confirming the representation of the second laser dot is shown with an area defined by the identifier.

13. The method of claim 12, wherein displaying the identifier includes displaying an outline or matrix associated with the output of the infrared array sensor, the scaled thermal image output, or both the output of the infrared array sensor and the scaled thermal image output.

14. The method of claim 1, further comprising:
receiving directional input entered via a user control of the system,
wherein shifting the alignment marker or the representation of the laser dot onto the other of the alignment marker and the representation of the laser dot is based on the directional input.

15. The method of claim 1, further comprising:
determining a position of the representation of the laser dot on the display,
wherein shifting the alignment marker or the representation of the laser dot includes shifting the alignment marker so that the alignment marker is shown at the position of the representation of the laser dot on the display.

16. The method of claim 15, wherein determining the position of the representation of the laser dot on the display occurs programmatically.

17. The method of claim 16, wherein determining the position of the representation of the laser dot on the display programmatically includes determining a large contrast in pixel values representing the position of the representation of the laser dot with respect to pixel values representing all other pixels of the display.

18. The method of claim 16,
wherein pixels on the display have a first color component of a red-green-blue (RGB) color space, a second color component of the RGB color space, and a third color component of the RGB color space, and
wherein determining the position of the representation of the laser dot on the display programmatically includes determining which pixels on the display have (1) a value of the first color component is above a first color threshold value, (2) the value of the first color component minus a value of the second color component is greater than a second color threshold, and (3) the value of the first color component minus a color value of the third color component is greater than a third color threshold.

19. A method according to claim 18, wherein the second color threshold equals the third color threshold.

20. The method of claim 1, further comprising:
removably affixing the system to an alignment fixture configured to hold the system a particular distance from a target including a blackbody.

21. A method according to claim 1, wherein:
aligning the scaled VLC image output to the scaled thermal image output includes shifting the scaled VLC a number of pixels relative to the scaled thermal image output in at least one shift direction, and
each alignment value of the one or more alignment values indicates a number of pixels and a shift direction.

22. A method according to claim 1, wherein:
aligning the scaled VLC image output to the scaled thermal image output includes shifting the scaled VLC image output a number of pixels relative to the scaled thermal image output in at least one shift direction,
the one or more alignment values include a coordinate of a corner pixel of the scaled VLC image output, and
the corner pixel of the scaled VLC image output is aligned to a corner pixel of the scaled thermal image output.

23. A method according to claim 1, further comprising:
determining a temperature based on a portion of values indicative of infrared radiation from the target, wherein the portion of the values include values associated with a portion of the target at which the laser dot is produced; and
displaying, on the display, the scaled VLC image output and the temperature, wherein displaying the scaled VLC image output includes displaying a visible light image including the laser dot and at least a portion of the target.

24. A computing system comprising:
one or more processors configured to:
capture output of a visible light camera (VLC) and output of an infrared array sensor using a system including the VLC, the infrared array sensor, a laser pointer, a memory, a substrate, and a display, wherein the VLC, the infrared array sensor and the laser pointer are attached to the substrate, and a lens of the VLC and a lens of the infrared array sensor are fixed in place with respect to the substrate;
scale the output of the VLC and the output of the infrared array sensor using one or more scaling values to generate a scaled VLC image output and a scaled thermal image output;
align the scaled VLC image output to the scaled thermal image output to generate an aligned image based on the scaled VLC image output and the scaled thermal image output;
determine one or more alignment values used to generate the aligned image and pixels of the VLC that correspond to respective pixels of the infrared array sensor;
store the one or more scaling values and the one or more alignment values in the memory for use in scaling and aligning subsequent output of the VLC and the infrared array sensor;
output, by the laser pointer, a light beam to produce a laser dot on a target;
display, on the display, an alignment marker and the scaled VLC image output while the scaled VLC image output includes a representation of the laser dot;
shift the alignment marker without shifting the scaled VLC image output and without shifting a field of view of the infrared array sensor so that the alignment marker and the representation of the laser dot are shown at a common position on the display;
determine one or more pixels of the infrared array sensor that correspond to one or more pixels of the VLC where the alignment marker and the representation of the laser dot are shown at the common position on the display; and
store in the memory the one or more pixels of the infrared array sensor to calibrate the system based on a position of the laser pointer relative to the infrared array sensor for subsequent use in determining a temperature where a laser dot is shown on a target in the subsequent output of the VLC.

25. The computing system of claim 24, wherein:
the substrate comprises a printed circuit board, and
the visible light camera and the infrared array sensor are soldered to the substrate.

26. The computing system of claim 25, wherein the lens of the visible light camera and the lens of the infrared array sensor are fixed in place at a common distance away from the printed circuit board.

27. A non-transitory computer readable medium having stored therein instructions executable by one or more processors to cause a computing system to perform functions comprising:
capturing output of a visible light camera (VLC) and output of an infrared array sensor using a system including the VLC, the infrared array sensor, a laser pointer, a memory, a substrate, and a display, wherein the VLC, the infrared array sensor and the laser pointer are attached to the substrate, and a lens of the VLC and a lens of the infrared array sensor are fixed in place with respect to the substrate;
scaling the output of the VLC and the output of the infrared array sensor using one or more scaling values to generate a scaled VLC image output and a scaled thermal image output;
aligning the scaled VLC image output to the scaled thermal image output to generate an aligned image based on the scaled VLC image output and the scaled thermal image output;

determining one or more alignment values used to generate the aligned image and pixels of the VLC that correspond to respective pixels of the infrared array sensor;

storing the one or more scaling values and the one or more alignment values in the memory for use in scaling and aligning subsequent output of the VLC and the infrared array sensor;

outputting, by the laser pointer, a light beam to produce a laser dot on a target;

displaying, on the display, an alignment marker and the scaled VLC image output while the scaled VLC image output includes a representation of the laser dot;

shifting the alignment marker without shifting the scaled VLC image output and without shifting a field of view of the infrared array sensor so that the alignment marker and the representation of the laser dot are shown at a common position on the display;

determining one or more pixels of the infrared array sensor that correspond to one or more pixels of the VLC where the alignment marker and the representation of the laser dot are shown at the common position on the display; and storing in the memory the one or more pixels of the infrared array sensor to calibrate the system based on a position of the laser pointer relative to the infrared array sensor for subsequent use in determining a temperature where a laser dot is shown on a target in the subsequent output of the VLC.

\* \* \* \* \*